US012283004B2

(12) United States Patent
Cheng et al.

(10) Patent No.: US 12,283,004 B2
(45) Date of Patent: Apr. 22, 2025

(54) TECHNIQUES TO FACILITATE A CLOUD-BASED VEHICLE XR EXPERIENCE

(71) Applicant: QUALCOMM Incorporated, San Diego, CA (US)

(72) Inventors: Hong Cheng, Basking Ridge, NJ (US); Shailesh Patil, San Diego, CA (US); Arthur Gubeskys, San Diego, CA (US); Gene Wesley Marsh, San Diego, CA (US); Kapil Gulati, Belle Mead, NJ (US); Ahmed Kamel Sadek, San Diego, CA (US); Sivaramakrishna Veerepalli, San Diego, CA (US); Jeremiah Golston, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/811,578

(22) Filed: Jul. 8, 2022

(65) Prior Publication Data

US 2024/0020928 A1 Jan. 18, 2024

(51) Int. Cl.
*G06T 19/00* (2011.01)
*G06Q 20/32* (2012.01)
(Continued)

(52) U.S. Cl.
CPC ......... *G06T 19/006* (2013.01); *G06Q 20/326* (2020.05); *H04W 76/10* (2018.02); *H04W 4/40* (2018.02); *H04W 72/21* (2023.01)

(58) Field of Classification Search
CPC .................. G06T 19/006; B60K 35/00; B60K 2360/5899; B60K 2360/177;
(Continued)

(56) References Cited

U.S. PATENT DOCUMENTS 11,789,533 B2 * 10/2023 Field ....................... G06F 3/011
345/156
11,790,816 B1 * 10/2023 Sadineni ................ G09G 3/003
345/156
(Continued)

FOREIGN PATENT DOCUMENTS

EP 3244591 A1 11/2017

OTHER PUBLICATIONS

International Search Report and Written Opinion—PCT/US2023/025460—ISA/EPO—Oct. 2, 2023.

*Primary Examiner* — Abderrahim Merouan
(74) *Attorney, Agent, or Firm* — Procopio, Cory, Hargreaves & Savitch LLP/QUALCOMM Incorporated

(57) ABSTRACT

Apparatus, methods, and computer-readable media for facilitating a cloud-based vehicle XR user experience are disclosed herein. An example method for wireless communication at a user equipment (UE) includes transmitting a request for a vehicle extended reality (XR) session. The vehicle XR session may be based on a first user XR stream including a vehicle XR component associated with a vehicle and a first user XR component associated with a first user. The first user may have an association with the vehicle. The example method also includes transmitting uplink information associated with the first user XR stream. The example method also includes receiving rendering information associated with the first user XR stream. The rendering information may be based on the uplink information.

49 Claims, 24 Drawing Sheets

(51) Int. Cl.
*H04W 76/10* (2018.01)
*H04W 4/40* (2018.01)
*H04W 72/21* (2023.01)

(58) Field of Classification Search
CPC ........ B60K 2360/592; B60K 2360/589; B60K 2360/5905; G06V 20/56; G06V 20/20; G06V 20/59; H04L 67/131; H04W 76/10; H04W 4/44; H04W 72/21; H04W 4/40; H04W 12/06; G02B 27/0101; G02B 2027/0141; G06Q 20/326; B60W 50/14; B60W 2540/223
See application file for complete search history.

(56) References Cited

U.S. PATENT DOCUMENTS

| | | | | |
|---|---|---|---|---|
| 11,792,693 | B2* | 10/2023 | Ohlsson | H04W 36/0033 370/331 |
| 2017/0330034 | A1* | 11/2017 | Wang | G06V 20/20 |
| 2018/0350144 | A1* | 12/2018 | Rathod | G06Q 20/3224 |
| 2020/0017026 | A1 | 1/2020 | Kumar et al. | |
| 2020/0223444 | A1* | 7/2020 | Bonanni | G06Q 30/0266 |
| 2020/0364901 | A1* | 11/2020 | Choudhuri | G06T 19/006 |
| 2021/0134248 | A1* | 5/2021 | Wan | G09G 5/12 |
| 2021/0248787 | A1* | 8/2021 | Carter | G06V 20/10 |
| 2021/0274526 | A1* | 9/2021 | Shin | H04L 1/1896 |
| 2021/0316167 | A1* | 10/2021 | Keith | A62B 18/08 |
| 2021/0344682 | A1* | 11/2021 | Puglisi | H04L 63/0428 |
| 2022/0043446 | A1* | 2/2022 | Ding | G06N 3/08 |
| 2022/0091671 | A1* | 3/2022 | Field | G06F 3/011 |
| 2022/0137699 | A1* | 5/2022 | Viswanathan | G06F 3/011 345/633 |
| 2022/0264251 | A1* | 8/2022 | Wang | G01S 5/0284 |
| 2022/0400474 | A1* | 12/2022 | Castinado | H04W 72/51 |
| 2023/0280890 | A1* | 9/2023 | Aybar | G06F 3/04842 715/835 |
| 2023/0334866 | A1* | 10/2023 | Kirschner | G07C 5/0825 |
| 2023/0343201 | A1* | 10/2023 | Cheikh | H04W 4/80 |
| 2023/0347938 | A1* | 11/2023 | Malta | G01C 21/30 |
| 2024/0020928 | A1* | 1/2024 | Cheng | G06T 19/006 |

* cited by examiner

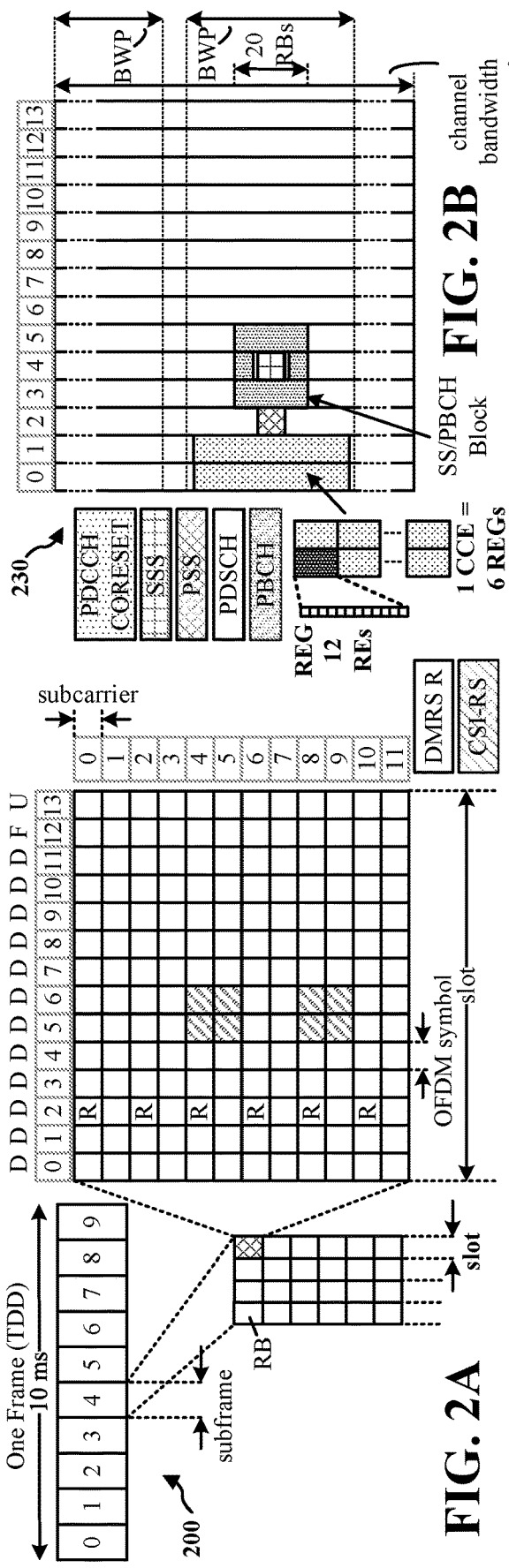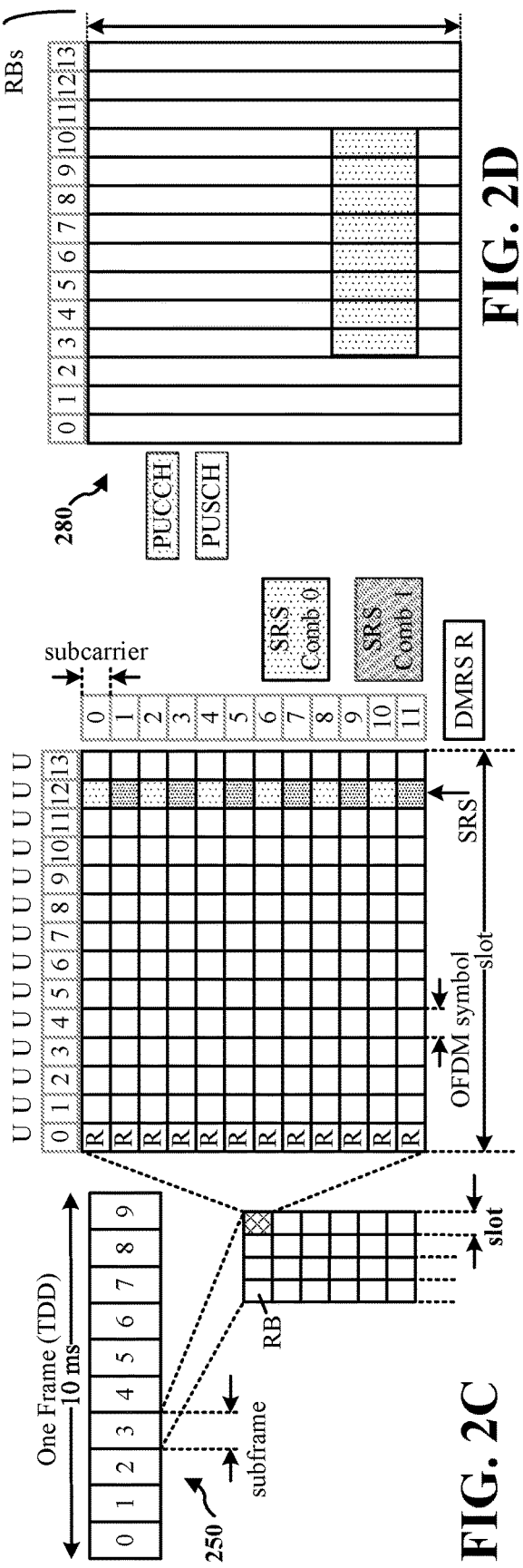
FIG. 2A
FIG. 2B
FIG. 2C
FIG. 2D

TECHNIQUES TO FACILITATE A CLOUD-BASED VEHICLE XR EXPERIENCE

INTRODUCTION

The present disclosure relates generally to communication systems, and more particularly, to wireless communications associated with extended reality (XR) services.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method of wireless communication at a user equipment (UE) is provided. The method may include transmitting a request for a vehicle extended reality (XR) session, the vehicle XR session being based on a first user XR stream including a vehicle XR component associated with a vehicle and a first user XR component associated with a first user, the first user having an association with the vehicle. The example method may also include transmitting uplink information associated with the first user XR stream. The example method may also include receiving rendering information associated with the first user XR stream, the rendering information being based on the uplink information.

In another aspect of the disclosure, an apparatus for wireless communication is provided. The apparatus may be a UE that includes a memory and at least one processor coupled to the memory, the at least one processor configured to transmit a request for a vehicle XR session, the vehicle XR session being based on a first user XR stream including a vehicle XR component associated with a vehicle and a first user XR component associated with a first user, the first user having an association with the vehicle. The at least one processor may also be configured to transmit uplink information associated with the first user XR stream. The at least one processor may also be configured to receive rendering information associated with the first user XR stream, the rendering information being based on the uplink information.

In another aspect of the disclosure, an apparatus for wireless communication at a UE is provided. The apparatus may include means for transmitting a request for a vehicle XR session, the vehicle XR session being based on a first user XR stream including a vehicle XR component associated with a vehicle and a first user XR component associated with a first user, the first user having an association with the vehicle. The example apparatus may also include means for transmitting uplink information associated with the first user XR stream. The example apparatus may also include means for receiving rendering information associated with the first user XR stream, the rendering information being based on the uplink information.

In another aspect of the disclosure, a non-transitory computer-readable storage medium storing computer executable code for wireless communication at a UE is provided. The code, when executed, may cause a processor to transmit a request for a vehicle XR session, the vehicle XR session being based on a first user XR stream including a vehicle XR component associated with a vehicle and a first user XR component associated with a first user, the first user having an association with the vehicle. The example code, when executed, may also cause the processor to transmit uplink information associated with the first user XR stream. The example code, when executed, may also cause the processor to receive rendering information associated with the first user XR stream, the rendering information being based on the uplink information.

In an aspect of the disclosure, a method of wireless communication at a network entity is provided. The method may include obtaining a request for a vehicle XR session. The method may also include authorizing the vehicle XR session, the vehicle XR session being based on a first user XR stream including a vehicle XR component associated with a vehicle and a first user XR component associated with a first user, the first user having an association with the vehicle. The example method may also include obtaining uplink information associated with the first user XR stream. Additionally, the example method may include outputting rendering information associated with the first user XR stream, the rendering information being based on the uplink information.

In another aspect of the disclosure, an apparatus for wireless communication is provided. The apparatus may be a base station that includes a memory and at least one processor coupled to the memory, the at least one processor configured to obtain a request for a vehicle XR session. The at least one processor may also be configured to authorize the vehicle XR session, the vehicle XR session being based on a first user XR stream including a vehicle XR component associated with a vehicle and a first user XR component associated with a first user, the first user having an association with the vehicle. The at least one processor may also be configured to obtain uplink information associated with the first user XR stream. Additionally, the at least one processor may be configured to output rendering information associated with the first user XR stream, the rendering information being based on the uplink information.

In another aspect of the disclosure, an apparatus for wireless communication at a base station is provided. The apparatus may include means for obtaining a request for a vehicle XR session associated. The apparatus may also include means for authorizing the vehicle XR session, the vehicle XR session being based on a first user XR stream including a vehicle XR component associated with a vehicle and a first user XR component associated with a first user, the first user having an association with the vehicle. The example apparatus may also include means for obtaining uplink information associated with the first user XR stream. Additionally, the example apparatus may include means for outputting rendering information associated with the first user XR stream, the rendering information being based on the uplink information.

In another aspect of the disclosure, a non-transitory computer-readable storage medium storing computer executable code for wireless communication at a base station is provided. The code, when executed, may cause a processor to obtain a request for a vehicle XR session. The example code, when executed, may also cause the processor to authorize the vehicle XR session, the vehicle XR session being based on a first user XR stream including a vehicle XR component associated with a vehicle and a first user XR component associated with a first user, the first user having an association with the vehicle. The example code, when executed, may also cause the processor to obtain uplink information associated with the first user XR stream. Additionally, the example code, when executed, may cause the processor to output rendering information associated with the first user XR stream, the rendering information being based on the uplink information.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
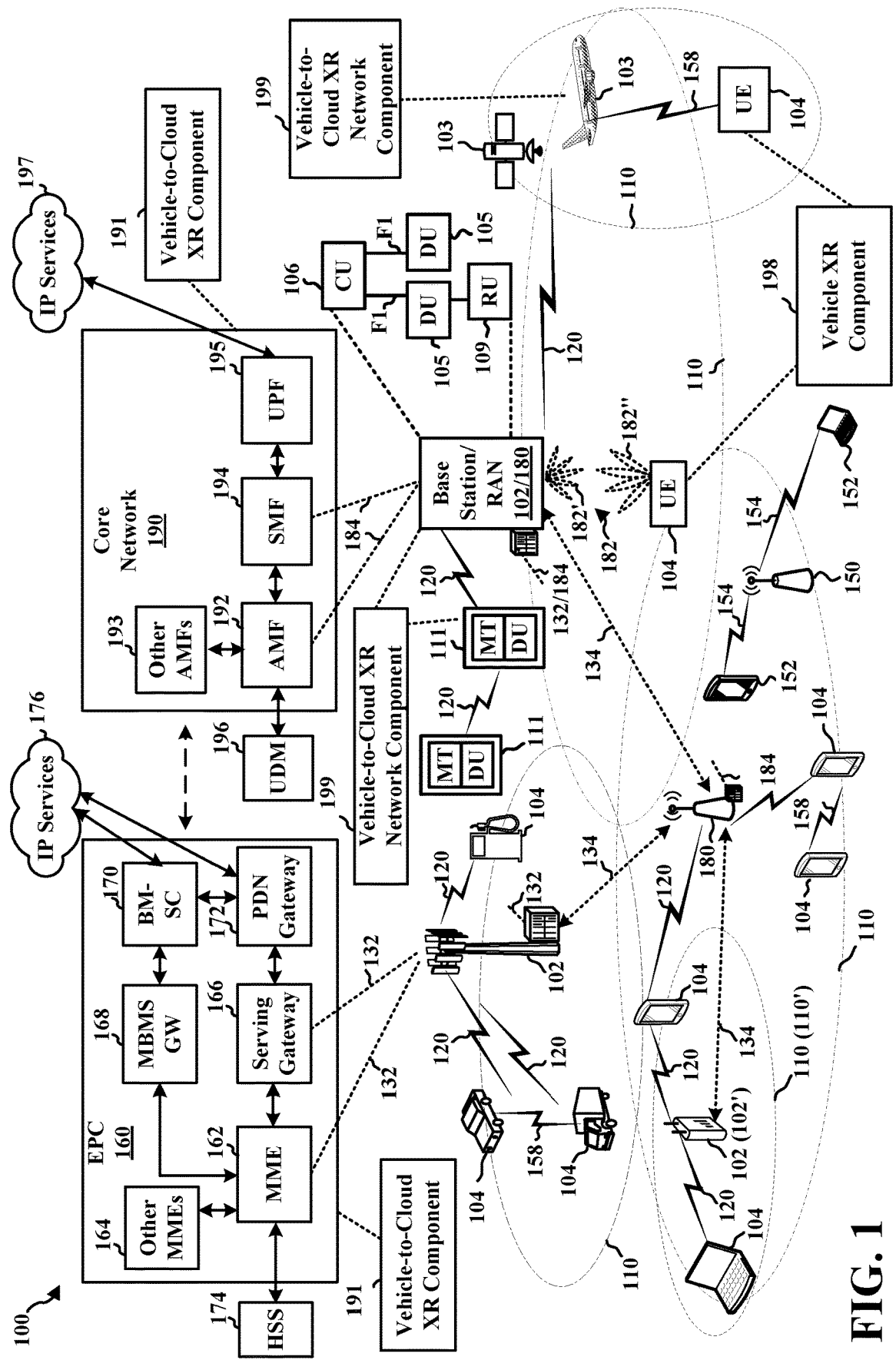
FIG. 1 is a diagram illustrating an example of a wireless communications system and an access network.

Extended reality (XR) refers to the reality-virtuality continuum between real environments and virtual environments. Extended reality technologies can provide virtual content to a user, and/or combine real or physical environments and virtual environments, which may be made up of virtual content or virtual objects, to provide users with XR experiences. An XR experience may include virtual reality (VR), augmented reality (AR), mixed reality (MR), and/or other immersive content.

A user may experience XR (e.g., may be provided with an XR experience) via an XR device. Extended reality devices may be of different form factors and may differ in processing capabilities, power consumption, and/or communication types. One example of an XR device is a head-mounted display (HMD). The HMD may include a display positioned in front of one or both eyes. The display may stream data, images, and/or other information in front of the user's eye(s).

An HMD may include an optical system, such as a display and/or lenses, one or more tracking sensors, one or more cameras, communication functionalities, and an XR engine. The XR engine may perform XR-related processing and may include one or more graphical processing units (GPUs), central processing units (CPUs), etc. The display of an HMD may be transparent or not transparent. For example, for an AR application, the display may be transparent (or mostly transparent) and AR information may be superimposed onto real life objects. In another example, for a VR application, the display may not be transparent and virtual information and images may be displayed in front of the user's eyes.

One example application of XR is associated with vehicles. For example, a vehicle may be configured with an XR system that provides a vehicle-based XR experience to users of the vehicle. The vehicle may include a terrestrial vehicle, such as a car, a bus, a train, etc., or an airborne/non-terrestrial vehicle, such as a drone, a balloon, a plane, a helicopter, etc. The user of the vehicle may be a human, a device with artificial intelligence, a communication equipment supporting remote access, or a connected controller. The XR system of the vehicle may have a different form factor than an HMD, but may include one or more similar components. For example, a vehicle XR system may include one or more displays for presentment of rendering information, one or more sensors for collecting information at the vehicle, and a UE to facilitate communication functions and XR-based processing. As used herein, a UE associated with a vehicle and configured to provide a vehicle-based XR experience may be referred to as a "vehicle UE," a "vehicle XR system UE," or, may be generally referred to as a "UE" herein.

As an example of a vehicle XR application, a navigation system of the vehicle may enable a user (e.g., a driver, a first passenger, etc.) to input a desired destination and generate a path plan (e.g., a route) to arrive at the desired destination. The one or more sensors may capture vehicle-surrounding information of the area around the vehicle. The vehicle UE may then process the vehicle-surrounding information and generate rendering information accordingly. One or more displays of the vehicle XR system may then display the rendering information. For example, the rendering information may include augmentation information that is superimposed on real world objects surrounding the vehicle. Non-limiting examples of real world objects surrounding the vehicle may include traffic lights, hazard signs, road signs, barricades, landmarks, buildings, billboards, etc. The augmentation information may include driver assistance information, such as a current speed of the vehicle, a speed limit, gas-related or battery-related information, upcoming directions, traffic light phasing information, information of potential maneuver of the surrounding vehicles and vulnerable road users (VRUs), road conditions, etc.

In some examples, the augmentation information presented to the user may be based on what the vehicle UE is able to identify and then present via the one or more displays. That is, the augmentation information may be based on a static or local-processing-based mechanism. Examples of static or local-processing-based mechanisms may be based on pre-configured information stored at the vehicle UE. For example, the vehicle UE may be configured with augmentation information corresponding to navigation, such as indicators of speed limits associated with streets or highways. In some such examples, the vehicle UE may identify, based on information provided by the one or more sensors of the vehicle XR system, a real world object, such as a street sign. According to one or more examples, the vehicle UE may then display augmentation information indicating the speed limit associated with the street based on the identified street sign.

In some examples, the augmentation information may be generated and displayed via the one or more displays of the vehicle XR system regardless of where the driver or the user is looking. For example, a display associated with the front windshield of the vehicle may display the augmentation information indicating the speed limit while the driver is looking out a side window of the vehicle. In such examples, the UE may be using resources (e.g., processing resources, memory, etc.) to generate and present the augmentation information with certain default configurations. Additionally, in some examples, the augmentation information presented in an XR scene may be limited to what objects the UE is able to identify and/or may be limited to the information provided by another system of the vehicle, such as the navigation system.

However, it may be appreciated that as more complicated vehicle XR operation scenarios emerge, the static or local-processing-based mechanism (or systems) may be less suitable and/or less efficient to provide a satisfactory user experience. For example, the static or local-processing-based mechanism of the vehicle XR system may not have the ability to identify landmarks in real-time (or near real-time). In some examples, the static or local-processing-based mechanism may provide inaccurate augmentation information. For example, the vehicle UE may be configured with augmentation information associated with a first landmark that has been replaced with a second landmark since the vehicle UE was configured. For example, when the vehicle UE is configured with augmentation information associated with an intersection, the augmentation information may include additional information about a clothing store. However, after the vehicle UE was configured with the augmentation information, the clothing store may have been replaced with a coffee shop.

Aspects disclosed herein facilitate a vehicle XR application that includes cloud-based processing. For example, aspects disclosed herein enable offloading some processing associated with presenting augmentation information to a cloud XR entity. The cloud XR entity may be in communication with a vehicle UE of a vehicle XR system. The cloud XR entity may receive information collected from a vehicle UE via one or more sensors of the vehicle XR system. The cloud XR entity may then help determine what rendering information is needed to support the vehicle XR application at the vehicle and to provide a satisfactory user experience (e.g., an XR experience that may be appreciated by the user). The rendering information may be associated with XR information and may facilitate presentment of the XR information via the one or more displays of the vehicle XR system. Non-limiting examples of rendering information may include augmentation information, identifiers of landmarks, interactive objects, additional information associated with a real world object, etc., that may be superimposed over real world objects and/or representations of real world objects. For example, the cloud XR entity may have the ability to identify real world objects in real-time (or near real-time) based on the information received from the vehicle UE. For example, based on the information received from the vehicle UE, the cloud XR entity may have the ability to identify that an intersection has a clothing store and provide augmentation information associated with the clothing store.

In some aspects, the vehicle UE and the cloud XR entity may establish a vehicle XR session. The vehicle XR session may enable communication associated with a user stream between the vehicle UE and the cloud XR entity. For example, the user stream may include uplink information that is provided by the vehicle UE to the cloud XR entity. The user stream may also include downlink information that is provided by the cloud XR entity to the vehicle UE.

The uplink information may include information that is collected by the one or more sensors of the vehicle XR system. The uplink information may include information about the vehicle and information about a user. For example, the collected information may include a vehicle XR component that includes one or more of vehicle pose information, vehicle information, and vehicle-surrounding information. The uplink information may also include a user XR component that includes one or more of user pose information and input information. The user pose information may include information relating to a position and/or orientation of the user in space relative to an XR space. An XR space may represent a virtual coordinate system with an origin that corresponds to a physical location. The user pose information may be with respect to the ground (e.g., absolute pose information) and/or with respect to the vehicle (e.g., relative pose information). The input information may include information related to user eye tracking and/or user gestures.

The downlink information from the cloud XR entity to the vehicle UE may include rendering information for presentment at the vehicle. For example, the rendering information may include XR information, such as augmentation information, that the vehicle UE is configured to superimpose over real world objects. The vehicle UE may also display the XR information via the one or more displays of the vehicle XR system. As used herein, the term "XR information" refers to information that is rendered in association with a vehicle XR session. For example, XR information may include augmentation information that the cloud XR entity generates for superimposing over real world objects.

The cloud XR entity may obtain the uplink information and perform virtual-physical fusion of the information to generate the rendering information. In one or more aspects, the virtual-physical fusion of the information may include identifying real world objects and XR information. For example, the cloud XR entity may identify the real world objects based on the vehicle-surrounding information of the vehicle XR component of the uplink information. The cloud XR entity may also generate XR information based on the identified real world objects. In some examples, the cloud XR entity may generate the XR information based on information received from additional network entities. For example, the cloud XR entity may identify a sports stadium and obtain XR information associated with the sports stadium from a network entity that provides sports-based information. The cloud XR entity may then provide the rendering information to the vehicle UE for presentment.

For example, the vehicle UE may facilitate displaying the rendering information via the one or more displays of the vehicle.

Additionally, as XR systems and communication systems evolve and mature, more XR experiences may emerge. For example, rather than a vehicle XR application that displays information without taking driver information into account, the cloud XR entity could adapt the rendering information provided to the vehicle UE based on user pose. In such examples, the XR application may present information relevant to a user (e.g., the driver) as the user moves their head and what the user is seeing changes. The rendering information provided to the vehicle UE may be adjusted according to the status of the user, or the situation of the vehicle. For example, certain traffic related information may not be presented to the user when the vehicle is parked. In another example, only driving related XR information may be presented to the driver when the vehicle is moving at higher speed.

Additionally, the cloud XR entity may allow passengers to be provided with an XR experience. For example, the one or more sensors of the vehicle XR system may collect information associated with different users (e.g., a driver and one or more passengers). In some such examples, the cloud XR entity may have the ability to generate XR information for the different users. For example, passengers may be presented with XR information that is the same or different than the driver. For example, a driver may be presented with first XR information that is related to navigation (e.g., direction, speed, etc.) while passengers may be presented with second XR information related to landmarks. According to one or more examples, the XR information presented to the passengers may be shielded from the view of the driver, for example, to avoid distracting the driver.

In some examples, the rendering information provided to the vehicle UE may include interactive objects with which the user may engage. In some examples, engaging with the interactive object may provide additional information about real world objects. For example, an interactive object may be superimposed above a landmark. In some examples, a user may engage with (e.g., select) the interactive object to receive information about the landmark. In some examples, a user may engage with the interactive object to perform a transaction. For example, the rendering information may include an interactive object that is superimposed above a coffee shop. In some examples, the user may select the interactive object to initiate a coffee purchase at the coffee shop. In some examples, the input information of the user XR component may include information indicating engagement with the interactive object.

In some examples, the vehicle UE may provide relatively frequent communications of the uplink information, for example, to enable receiving accurate rendering information for presentment. For example, frequent updates (e.g., transmissions of the uplink information) may be needed to provide accurate information about the location of the vehicle and the vehicle-surrounding information to the cloud XR entity. According to one or more aspects, the cloud XR entity may have the capability to perform pre-fetching and/or compression of information as appropriate. For example, based on the path plan, the cloud XR entity may pre-fetch XR information related to landmarks that a user may see while traveling the route. In some examples, the cloud XR entity may also encode and/or compress the rendering information to reduce the amount of information that is transmitted over the air (OTA). Additionally, by enabling the cloud XR entity to generate the XR information, one or more aspects disclosed herein facilitate reducing the computation load of the vehicle UE for displaying the XR information. For example, the cloud XR entity may generate the XR information instead of the vehicle UE employing static or local-processing-based mechanism to generate the XR information.

In some examples, a vehicle XR session may be associated with one or more XR services, such as navigation services, landmark services, interactivity services, transaction-enabling services, etc. The navigation services may enable the displaying of XR information related to navigation. The landmark services may enable the displaying of XR information related to landmark identification. The interactivity services may enable the displaying of XR information including one or more interactive objects. The transaction-enabling services may enable the displaying of XR information related to performing a transaction based on an interactive object.

In some examples, when the cloud XR entity receives uplink information, the cloud XR entity may generate the XR information based on the one or more XR services. For example, based on the uplink information, the cloud XR entity may identify landmarks, opportunities for user interaction, and/or opportunities for performing a transaction. In such examples, the cloud XR entity may generate the rendering information to include XR information associated with the respective services.

In some examples, the cloud XR entity may provide granular control of XR services supported by the vehicle XR session. For example, a vehicle XR session may be subscription-based and associated with a subscription level. A subscription level may be associated with a quantity of user streams that may be associated with a vehicle XR session. For example, a first subscription level may permit only driver stream, a second subscription level may permit only a passenger stream, a third subscription level may permit a driver stream and a passenger stream, and a fourth subscription level may permit any number and combination of streams. In some examples, a subscription level may be associated with a level of XR interactivity. For example, based on the subscription level, the cloud XR entity may generate XR information including different types of interactive objects. In some examples, the subscription level may be associated with which services are enabled and/or disabled. For example, one subscription level may include navigation services and landmark services, while another subscription level may include navigation services, landmark services, interactivity services, and transaction-enabling services, etc. Thus, according to one or more examples, different subscription levels may result in different XR information being presented to users. In some examples, the subscription level may additionally, or alternatively, determine what kind of services can be presented to the user. For example, at some subscription levels, a high priority service user, e.g., a police officer, a government official, etc., may be presented with landmark services or interactive services from all surrounding buildings/locations, while users who are not high priority service users (e.g., "normal" users), may be presented with only services from commercial buildings/locations.

When establishing the vehicle XR session with the vehicle UE, the cloud XR entity may authorize a supported session level based on the subscription level. The supported session level may indicate which XR services are enabled and/or disabled per vehicle XR session and provide XR information accordingly. In some examples, the supported session level may be based on a Quality of Service (QoS) information and/or Quality of Experience (QoE) information. For example, the cloud XR entity may perform rendering adaptation to provide a satisfactory user experience. The rendering adaptation may be based on QoE metrics and/or QoS support information provided by the vehicle UE. For example, when communications between the vehicle UE and the cloud XR entity are delayed, packet retransmission is being observed, and/or the data rate is lower than allowed, the cloud XR entity may perform rendering adaptation to adjust the XR information being generated and provided to the vehicle UE. For example, when the QoE metrics and/or the QoS support information indicates reduced communication capabilities, the cloud XR entity may prioritize XR information associated with a driver stream and may deprioritize XR information associated with passenger streams. In this manner, the cloud XR entity may provide a satisfactory user experience to the driver, which may be of higher priority than providing a satisfactory user experience to the passengers, for example.

In some examples, the vehicle XR session may be associated with multiple users. For example, the vehicle XR session may include a first user stream associated with a first user (e.g., a driver) and a second user stream associated with a second user (e.g., a passenger). In such examples, the user streams may be associated with the same vehicle. For example, the uplink information may include a first user XR component associated with the first user, a second user XR component associated with the second user, and a vehicle XR component that is shared between the first user stream and the second user stream. The cloud XR entity may receive the uplink information and the respective components and consolidate the uplink information so that the rendering information facilitates a unified projection to the one or more displays of the vehicle XR system.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) (e.g., an EPC 160), and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with the core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or the core network 190) with each other over third backhaul links 134 (e.g., an X2 interface). The first backhaul links 132, the second backhaul links 184 (e.g., an Xn interface), and the third backhaul links 134 may be wired or wireless.

In some aspects, a base station (e.g., one of the base stations 102 or one of base stations 180) may be referred to as a RAN and may include aggregated or disaggregated components. As an example of a disaggregated RAN, a base station may include a central unit (CU) (e.g. a CU 106), one or more distributed units (DU) (e.g., a DU 105), and/or one or more remote units (RU) (e.g., an RU 109), as illustrated in FIG. 1. A RAN may be disaggregated with a split between the RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs may be connected via an F1 interface. A DU 105 and an RU 109 may be connected via a fronthaul interface. A connection between the CU 106 and a DU 105 may be referred to as a midhaul, and a connection between a DU 105 and the RU 109 may be referred to as a fronthaul. The connection between the CU 106 and the core network 190 may be referred to as the backhaul.

The RAN may be based on a functional split between various components of the RAN, e.g., between the CU 106, the DU 105, or the RU 109. The CU 106 may be configured to perform one or more aspects of a wireless communication protocol, e.g., handling one or more layers of a protocol stack, and the one or more DUs may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. The CU 106 may host higher layer functions, e.g., above the RLC layer, such as a service data adaptation protocol (SDAP) layer, a packet data convergence protocol (PDCP) layer, and/or an upper layer. In other implementations, the split between the layer functions provided by the CU, the DU, or the RU may be different.

An access network may include one or more integrated access and backhaul (IAB) nodes (e.g., the IAB nodes 111) that exchange wireless communication with a UE (e.g., one of the UEs 104) or another IAB node to provide access and backhaul to a core network. In an IAB network of multiple IAB nodes, an anchor node may be referred to as an IAB donor. The IAB donor may be a base station (e.g., one of the base stations 102 or one of the base stations 180) that provides access to the core network 190 or the EPC 160 and/or control to one or more of the IAB nodes 111. The IAB donor may include a CU 106 and a DU 105. The IAB nodes 111 may include a DU 105 and a mobile termination (MT). The DU 105 of an IAB node may operate as a parent node, and the MT may operate as a child node.

As described above, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
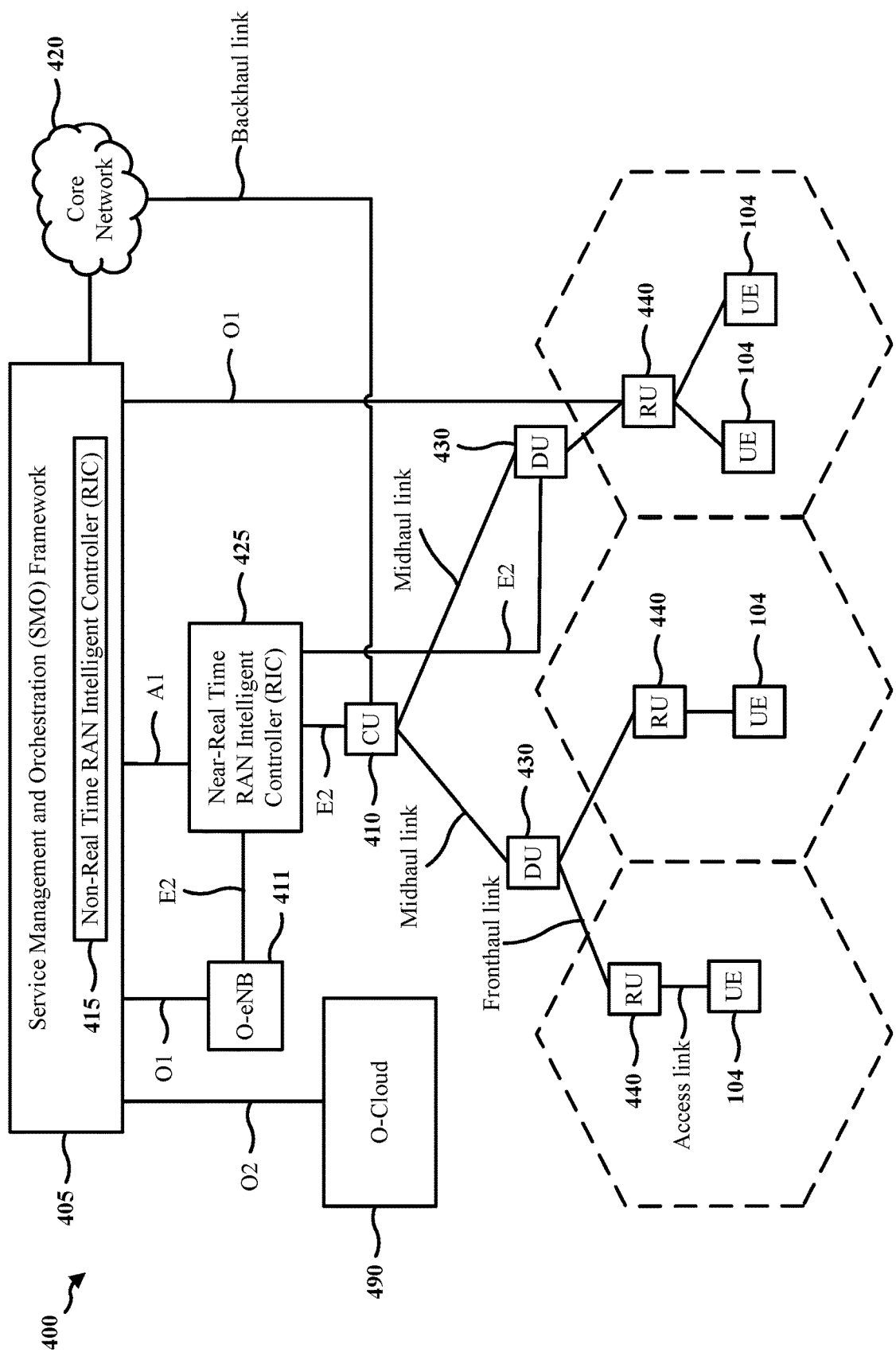
FIG. 4 is a diagram illustrating an example disaggregated base station architecture, in accordance with the teachings disclosed herein

As an example, FIG. 4 shows a diagram illustrating architecture of an example disaggregated base station 400. The disaggregated base station 400 architecture may include one or more CUs (e.g., a CU 410) that can communicate directly with a core network 420 via a backhaul link, or indirectly with the core network 420 through one or more disaggregated base station units (such as a Near-Real Time (Near-RT) RAN Intelligent Controller (RIC) (e.g., a Near-RT RIC 425) via an E2 link, or a Non-Real Time (Non-RT) RIC (e.g. a Non-RT RIC 415) associated with a Service Management and Orchestration (SMO) Framework (e.g., an SMO Framework 405), or both). The CU 410 (e.g., the CU 106 of FIG. 1) may communicate with one or more DUs (e.g., a DU 430) via respective midhaul links, such as an F1 interface. A DU 430 (e.g., the DU 105 of FIG. 1) may communicate with one or more RUs (e.g., an RU 440) via respective fronthaul links. An RU 440 (e.g., the RU 109 of FIG. 1) may communicate with respective UEs (e.g., the UEs 104 of FIG. 1) via one or more radio frequency (RF) access links. In some implementations, a UE may be simultaneously served by multiple RUs.

Each of the units, i.e., the CU 410, the DU 430, the RU 440, as well as the Near-RT RIC 425, the Non-RT RIC 415, and the SMO Framework 405, may include one or more interfaces or be coupled to one or more interfaces configured to receive or transmit signals, data, or information (collectively, signals) via a wired or wireless transmission medium.

Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit—User Plane (CU-UP)), control plane functionality (i.e., Central Unit—Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) can be implemented to handle over the air (OTA) communication with one or more of the UEs 104. In some implementations, real-time and non-real-time aspects of control and user plane communication with the RU(s) can be controlled by the corresponding DU. In some scenarios, this configuration can enable the DU(s) and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud 490 (O-Cloud)) to perform network element life cycle management (such as to instantiate virtualized network elements) via a cloud computing platform interface (such as an O2 interface). Such virtualized network elements can include, but are not limited to, the CU 410, the DU 430, the RU 440 and the Near-RT RIC 425. In some implementations, the SMO Framework 405 can communicate with a hardware aspect of a 4G RAN, such as an open eNB (O-eNB) (e.g., an O-eNB 411), via an O1 interface. Additionally, in some implementations, the SMO Framework 405 can communicate directly with one or more RUs via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Referring again to FIG. 1, the base stations 102 may wirelessly communicate with the UEs 104. Each of the base stations 102 may provide communication coverage for a respective geographic coverage area (e.g., a coverage area 110). There may be overlapping geographic coverage areas. For example, a small cell 102' may have a coverage area 110' that overlaps the coverage area 110 of one or more of the base stations 102 (e.g., one or more macro base stations). A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE to a base station and/or downlink (DL) (also referred to as forward link) transmissions from a base station to a UE. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some of the UEs 104 may communicate with each other using device-to-device (D2D) communication link (e.g., a D2D communication link 158). The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) (e.g., STAs 152) via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

A base station, whether a small cell 102' or a large cell (e.g., a macro base station), may include and/or be referred to as an eNB, gNodeB (gNB), or another type of base station. Some base stations, such as a gNB (e.g., one of the base stations 180) may operate in a traditional sub 6 GHz spectrum, in millimeter wave frequencies, and/or near millimeter wave frequencies in communication with the UEs 104. When the gNB operates in millimeter wave or near millimeter wave frequencies, the gNB may be referred to as a millimeter wave base station. The millimeter wave base station may utilize beamforming 182 with one or more of the UEs 104 to compensate for path loss and short range. The base stations 180 and the UEs 104 may each include a plurality of antennas, such as antenna elements, antenna panels, and/or antenna arrays to facilitate the beamforming. Similarly, beamforming may be applied for sidelink communication, e.g., between UEs.

The base stations 180 may transmit a beamformed signal to one or more of the UEs 104 in one or more transmit directions 182'. A UE may receive the beamformed signal from the base station in one or more receive directions 182". The UE may also transmit a beamformed signal to the base station in one or more transmit directions. The base stations 180 may receive the beamformed signal from the UE in one or more receive directions. The base stations 180/the UEs 104 may perform beam training to determine the best receive and transmit directions for each of the base station/the UE. The transmit and receive directions for the base station may or may not be the same. The transmit and receive directions for the UE may or may not be the same.

The EPC 160 may include a Mobility Management Entity (MME) (e.g., an MME 162), other MMEs 164, a Serving Gateway 166, a Multimedia Broadcast Multicast Service (MBMS) Gateway (e.g., an MBMS Gateway 168), a Broadcast Multicast Service Center (BM-SC) (e.g., a BM-SC 170), and a Packet Data Network (PDN) Gateway (e.g., a PDN Gateway 172). The MME 162 may be in communication with a Home Subscriber Server (HSS) (e.g., an HSS 174). The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) (e.g., an AMF 192), other AMFs 193, a Session Management Function (SMF) (e.g., an SMF 194), and a User Plane Function (UPF) (e.g., a UPF 195). The AMF 192 may be in communication with a Unified Data Management (UDM) (e.g., a UDM 196). The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to IP Services 197. The IP Services 197 may include the Internet, an intranet, an IP Multimedia Subsystem (IMS), a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit receive point (TRP), or some other suitable terminology. The base stations 102 provide an access point to the EPC 160 or the core network 190 for the UEs 104. Examples of the UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UEs 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a device in communication with a network entity, such as one of the UEs 104 in communication with one of the base stations 102 or a component of a base station (e.g., a CU 106, a DU 105, and/or an RU 109), may be configured to manage one or more aspects of wireless communication. For example, one or more of the UEs 104 (e.g., a vehicle UE) may include a vehicle XR component 198 configured to facilitate an XR user experience associated with a vehicle. In certain aspects, the vehicle XR component 198 may be configured to transmit a request for a vehicle XR session, the vehicle XR session being based on a first user XR stream including a vehicle XR component associated with a vehicle and a first user XR component associated with a first user, the first user having an association with the vehicle. The example vehicle XR component 198 may also be configured to transmit uplink information associated with the first user XR stream. Additionally, the example vehicle XR component 198 may be configured to receive rendering information associated with the first user XR stream, the rendering information being based on the uplink information.

In another configuration, a network entity, such as one of the base stations 102 or a component of a base station (e.g., a CU 106, a DU 105, and/or an RU 109), or an aerial device 103, may be configured to manage or more aspects of wireless communication. For example, one or more of the base stations 102 may include a vehicle-to-cloud XR network component 199 configured to facilitate an XR user experience associated with a vehicle. In certain aspects, the vehicle-to-cloud XR network component 199 may be configured to obtain a request for a vehicle XR session. The vehicle-to-cloud XR network component 199 may also be configured to authorize the vehicle XR session, the vehicle XR session being based on a first user XR stream including a vehicle XR component associated with a vehicle and a first user XR component associated with a first user, the first user having an association with the vehicle. The example vehicle-to-cloud XR network component 199 may also be configured to obtain uplink information associated with the first user XR stream. Additionally, the example vehicle-to-cloud XR network component 199 may be configured to output rendering information associated with the first user XR stream, the rendering information being based on the uplink information. In some examples, the vehicle-to-cloud XR network component 199 may be configured to additionally, or alternatively, provide additional information related to the vehicle XR session associated with the vehicle, such as location information of the vehicle, sensing information about the surrounding environment of the vehicle environment, etc.

In another configuration, a network entity, such as the EPC 160 and/or the core network 190 or a component of the network entity, may be configured to manage one or more aspects of wireless communication. For example, the EPC 160 and/or the core network 190 may include a vehicle-to-cloud XR component 191 configured to facilitate an XR user experience associated with a vehicle. The vehicle-to-cloud XR component 191 may be a new logical entity in the EPC 160 or the core network 190, or new functions distributed in existing entities inside the EPC 160 or the core network 190, such as the AMF 192, the SMF 194, the UPF 195, or the MME 162, the Serving Gateway 166, the PDN Gateway 172, the MBMS GW 168, and/or the BM-SC 170. In certain aspects, the vehicle-to-cloud XR component 191 may be configured to obtain a request for a vehicle XR session. The vehicle-to-cloud XR component 191 may also be configured to authorize the vehicle XR session, the vehicle XR session being based on a first user XR stream including a vehicle XR component associated with a vehicle and a first user XR component associated with a first user, the first user having an association with the vehicle. The example vehicle-to-cloud XR component 191 may also be configured to obtain uplink information associated with the first user XR stream. Additionally, the example vehicle-to-cloud XR component 191 may be configured to output rendering information associated with the first user XR stream, the rendering information being based on the uplink information. The vehicle-to-cloud XR component 191 may be configured to provide the necessary handling of the connection request for the vehicle XR session, e.g., establishing the required protocol data unit (PDU) sessions, selecting the appropriate UPF, authorizing the session based on subscription information, setting the proper QoS levels and charging records, etc. In another example, the vehicle-to-cloud XR component 191 may be realized outside of the EPC 160 or the core network 190, for example, beyond the PDN Gateway 172 or the UPF 195.

The aspects presented herein may enable a UE to provide a XR user experience in a vehicle. For example, aspects presented herein may enable network-based operation support to determine information to support the XR user experience in the vehicle, which may facilitate improving communication performance, for example, by reducing computation load at the vehicle.

Although the following description provides examples directed to 5G NR, the concepts described herein may be applicable to other similar areas, such as LTE, LTE-A, CDMA, GSM, 5G-Advanced, 6G, and/or other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. As shown in Table 1, the subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
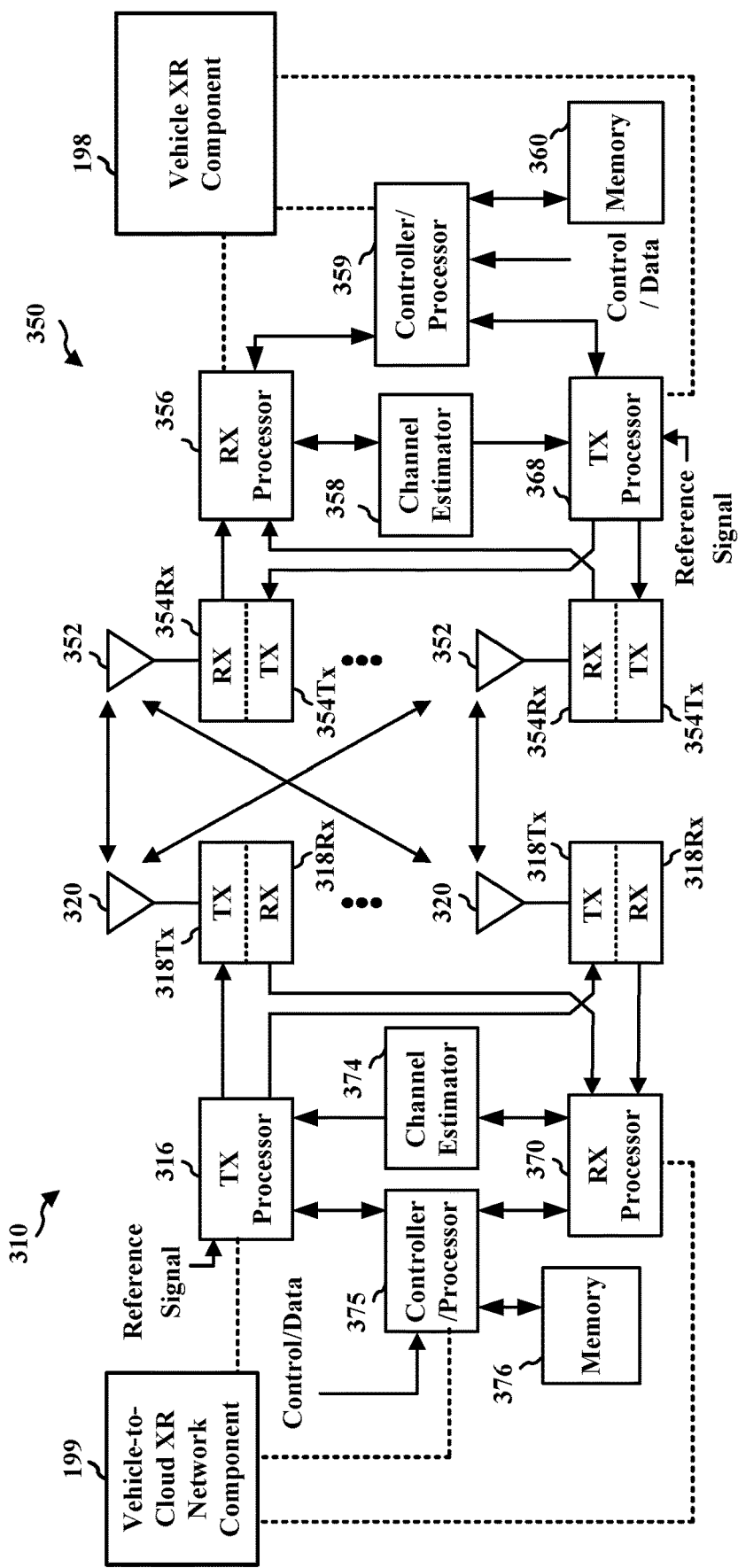
FIG. 3 is a diagram illustrating an example of a base station and user equipment (UE) in an access network.

FIG. 3 is a block diagram that illustrates an example of a first wireless device that is configured to exchange wireless communication with a second wireless device. In the illustrated example of FIG. 3, the first wireless device may include a base station 310, the second wireless device may include a UE 350, and the base station 310 may be in communication with the UE 350 in an access network. As shown in FIG. 3, the base station 310 includes a transmit processor (TX processor 316), a transmitter 318Tx, a receiver 318Rx, antennas 320, a receive processor (RX processor 370), a channel estimator 374, a controller/processor 375, and memory 376. The example UE 350 includes antennas 352, a transmitter 354Tx, a receiver 354Rx, an RX processor 356, a channel estimator 358, a controller/processor 359, memory 360, and a TX processor 368. In other examples, the base station 310 and/or the UE 350 may include additional or alternative components.

In the DL, Internet protocol (IP) packets may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer protocol data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna of the antennas 320 via a separate transmitter (e.g., the transmitter 318Tx). Each transmitter 318Tx may modulate a radio frequency (RF) carrier with a respective spatial stream for transmission.

At the UE 350, each receiver 354Rx receives a signal through its respective antenna of the antennas 352. Each receiver 354Rx recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, two or more of the multiple spatial streams may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna of the antennas 352 via separate transmitters (e.g., the transmitter 354Tx). Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna of the antennas 320. Each receiver 318Rx recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the vehicle XR component 198 of FIG. 1.

At least one of the TX processor 316, the RX processor 370, and the controller/processor 375 may be configured to perform aspects in connection with the vehicle-to-cloud XR network component 199 of FIG. 1.

As described above, XR refers to the reality-virtuality continuum between real environments and virtual environments. Extended reality technologies can provide virtual content to a user, and/or combine real or physical environments and virtual environments, which may be made up of virtual content or virtual objects, to provide users with XR experiences. An XR experience may include VR, AR, MR, and/or other immersive content. Augmented reality (AR) may merge the real world with virtual objects to support realistic, intelligent, and personalized experiences. Virtual reality (VR) provides a level of immersion, for example, by creating a sense of physical presence in real or imagined worlds. Augmented virtuality (AV) merges the virtual world with real world objects. Mixed reality (MR) merges the real world with the virtual world to produce new environments and visualizations where physical objects and virtual objects can co-exist and interact with each other. Extended reality (XR) includes AR, AV, VR, and MR, and refers to the full reality-virtuality continuum between real environments and virtual environments.

A user may experience XR (e.g., may be provided with an XR experience) via an XR device. Extended reality devices may be of different form factors and may differ in processing capabilities, power consumption, and/or communication types. One example of an XR device is an HMD. The HMD may include a display positioned in front of one or both eyes. The display may stream data, images, and/or other information in front of the user's eye(s).

An HMD may include an optical system, such as a display and/or lenses, one or more tracking sensors, one or more cameras, communication functionalities, and an XR engine. The XR engine may perform XR-related processing and may include one or more GPUs, CPUs, etc. The display of an HMD may be transparent or not transparent. For example, for an AR application, the display may be transparent (or mostly transparent) and AR information may be superimposed onto real life objects. In another example, for a VR application, the display may not be transparent and virtual information and images may be displayed in front of the user's eyes.

One example application of XR is associated with vehicles. For example, a vehicle may be configured with an XR system that provides a vehicle-based XR experience to users of the vehicle. The vehicle may include a terrestrial vehicle, such as a car, a bus, a train, etc., or an airborne/non-terrestrial vehicle, such as a drone, a balloon, a plane, a helicopter, etc. The user of the vehicle may be a human, a device with artificial intelligence, a communication equipment supporting remote access, or a connected controller. The XR system of the vehicle may have a different form factor than an HMD, but may include one or more similar components.

Figure 5:
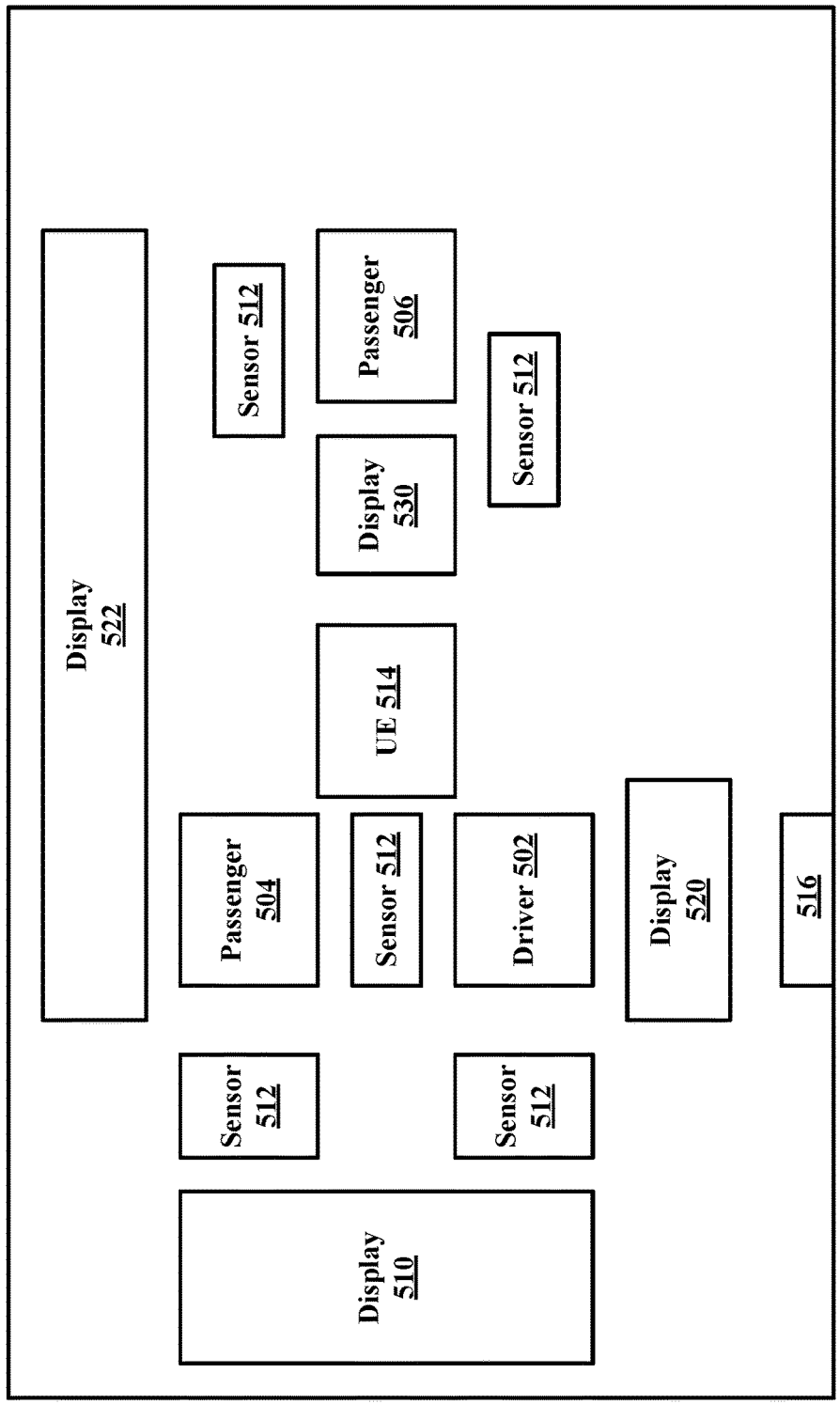
FIG. 5 is a diagram illustrating an example vehicle configured with a vehicle XR system, in accordance with the teachings disclosed herein.

FIG. 5 is a diagram illustrating an example vehicle 500 configured with a vehicle XR system, as presented herein. The vehicle 500 of FIG. 5 includes a seat for a driver 502, a seat for a first passenger 504, and a seat for a second passenger 506. In the example of FIG. 5, the driver 502 and the first passenger 504 are positioned in a same row (e.g., a front row) and the second passenger 506 is positioned in a different row (e.g., a back row). However, other examples may include additional or alternate configurations for the driver and one or more passengers.

In the example of FIG. 5, the vehicle 500 is configured with a vehicle XR system, which may also be referred to as a "vehicle XR platform" or by another name. The vehicle XR system facilitates providing vehicle XR to users of the vehicle 500. The vehicle XR system of FIG. 5 includes a first display 510, one or more sensors 512, and a vehicle UE 514. The first display 510 may include a heads-up display that adds augmentation information. The augmentation information may include information that is superimposed over real world objects via the first display 510. For example, the augmentation information may include identifiers of landmarks, interactive objects, additional information associated with a real world object, etc. The one or more sensors 512 may include camera(s), GPS sensor(s), radar sensor(s), light detection and ranging (LiDAR) sensor(s), etc. The one or more sensors 512 may be associated with an advanced driver assistant system (ADAS) of the vehicle 500 and/or may be in-cabin sensors. For example, the in-cabin sensors may be able to provide the pose information of the users of the vehicle, such as the driver 502, the first passenger 504, and/or the second passenger 506. The vehicle UE 514 may provide communication functionalities and XR-based processing.

As an example of a vehicle XR application, a navigation system of the vehicle 500 may enable a user (e.g., the driver 502, the first passenger 504, and/or the second passenger 506) to input a desired destination and generate a path plan (e.g., a route) to arrive at the desired destination. The one or more sensors 512 may capture vehicle-surrounding information of the area around the vehicle 500. The vehicle UE 514 may then process the vehicle-surrounding information and generate rendering information accordingly. The first display 510 may then display the rendering information. For example, the rendering information may include augmentation information that is superimposed on the real world objects surrounding the vehicle 500. Examples of real world objects surrounding the vehicle may include traffic lights, hazard signs, road signs, barricades, landmarks, buildings, billboards, etc. The augmentation information may include driver assistance information, such as a current speed of the vehicle 500, a speed limit, gas-related or battery-related information, upcoming directions, traffic light phasing information, information of potential maneuver of the surrounding vehicles and vulnerable road users (VRUs), road conditions, etc.

Figure 6A:
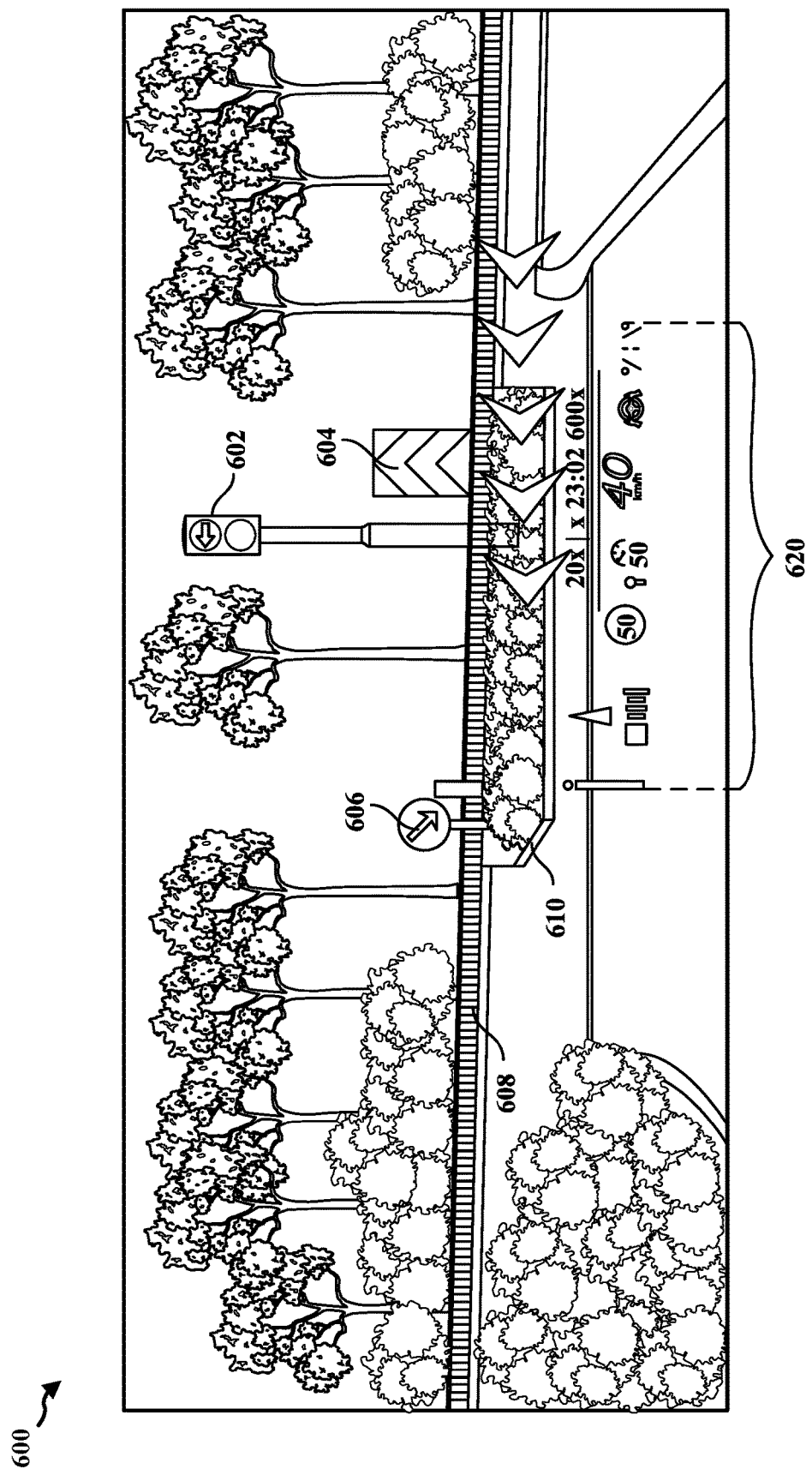
FIG. 6A is a diagram illustrating an example XR scene, in accordance with the teachings disclosed herein.

FIG. 6A depicts a scene 600 in which a heads-up display of a vehicle superimposes augmentation information over real world objects and/or representations of real world objects, as presented herein. In the example of FIG. 6A, the scene 600 includes real world objects, such as a traffic light 602, a hazard sign 604, a directional sign 606, barricades 608, and a median 610. The scene 600 also includes augmentation information 620 that may be superimposed on the real world objects via a display, such as the first display 510 of FIG. 5. In the example of FIG. 6A, the augmentation information 620 includes information related to the speed of the vehicle, a speed limit, navigation information, etc.

In the examples of FIG. 5 and FIG. 6A, the augmentation information 620 is based on what the vehicle UE 514 is able to identify and then present via the first display 510. For example, the augmentation information 620 may be identified and presented based on a static or local-processing-based mechanism. Examples of static or local-processing-based mechanisms may be based on pre-configured information stored at the vehicle UE. For example, the vehicle UE may be configured with augmentation information corresponding to navigation, such as indicators of speed limits associated with streets or highways. In some such examples, the vehicle UE may identify, based on information provided by the one or more sensors of the vehicle XR system, a real world object, such as a street sign. According to one or more examples, the vehicle UE may then display augmentation information indicating the speed limit associated with the street based on the identified street sign.

In some examples, the augmentation information 620 may be generated and displayed via the first display 510 regardless of where the driver 502 is looking. For example, the driver 502 may be looking out a window 516 of the vehicle 500 and unable to see augmentation information displayed via the first display 510. In such examples, the vehicle UE 514 may be using resources (e.g., processing resources, memory, etc.) to generate and present the augmentation information 620 with default configurations. Additionally, in some examples, the augmentation information 620 presented in the scene 600 may be limited to what objects the vehicle UE 514 is able to identify and/or may be limited to the information provided by another system of the vehicle, such as the navigation system.

Figure 6B:
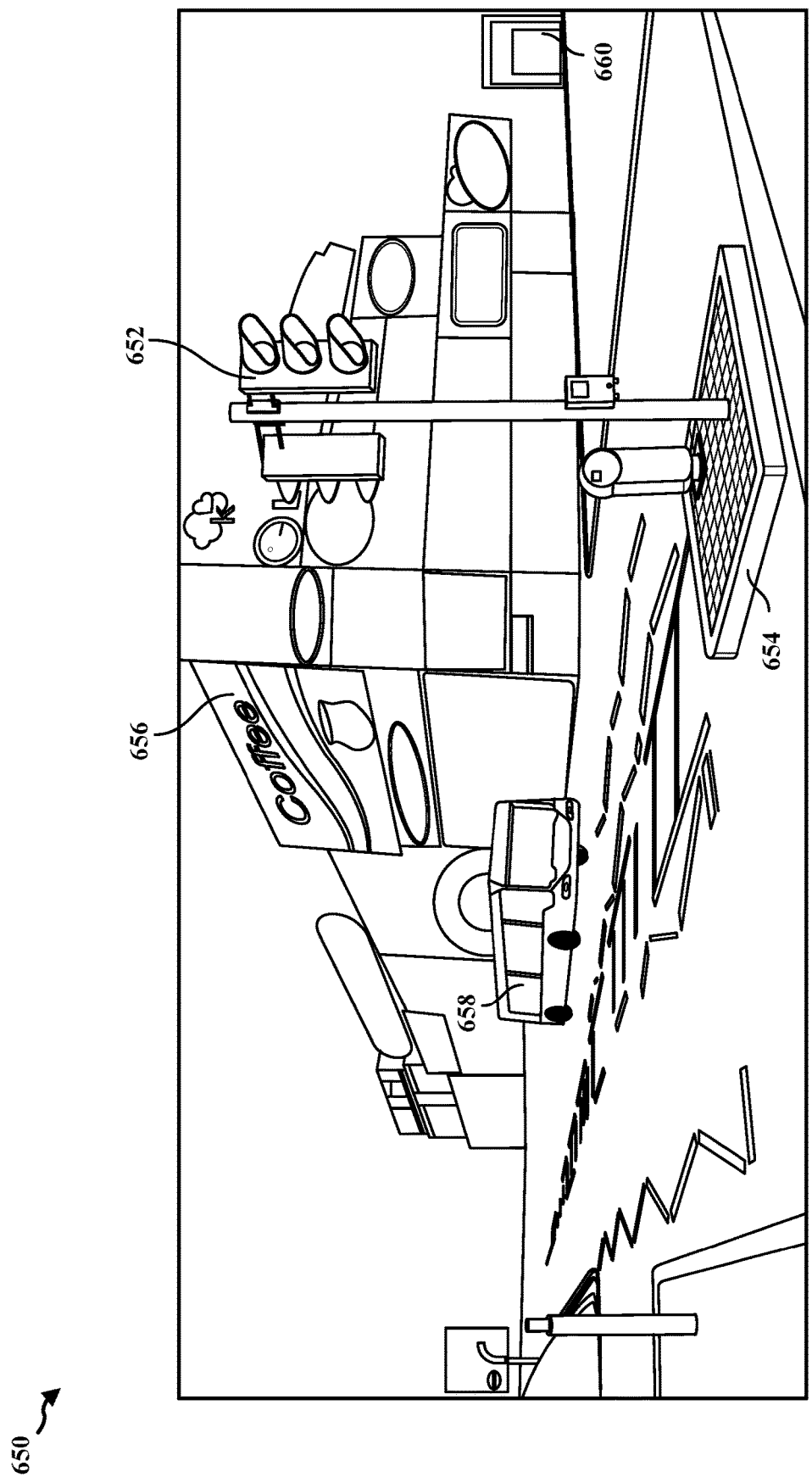
FIG. 6B is a diagram illustrating an example scene including real world objects, in accordance with the teachings disclosed herein.

FIG. 6B depicts a scene 650 including real world objects, as presented herein. In the example of FIG. 6B, the scene 650 includes real world objects, such as a traffic light 652, a median 654, electronic billboards 656, a bus 658, and a train stop 660.

Figure 6C:
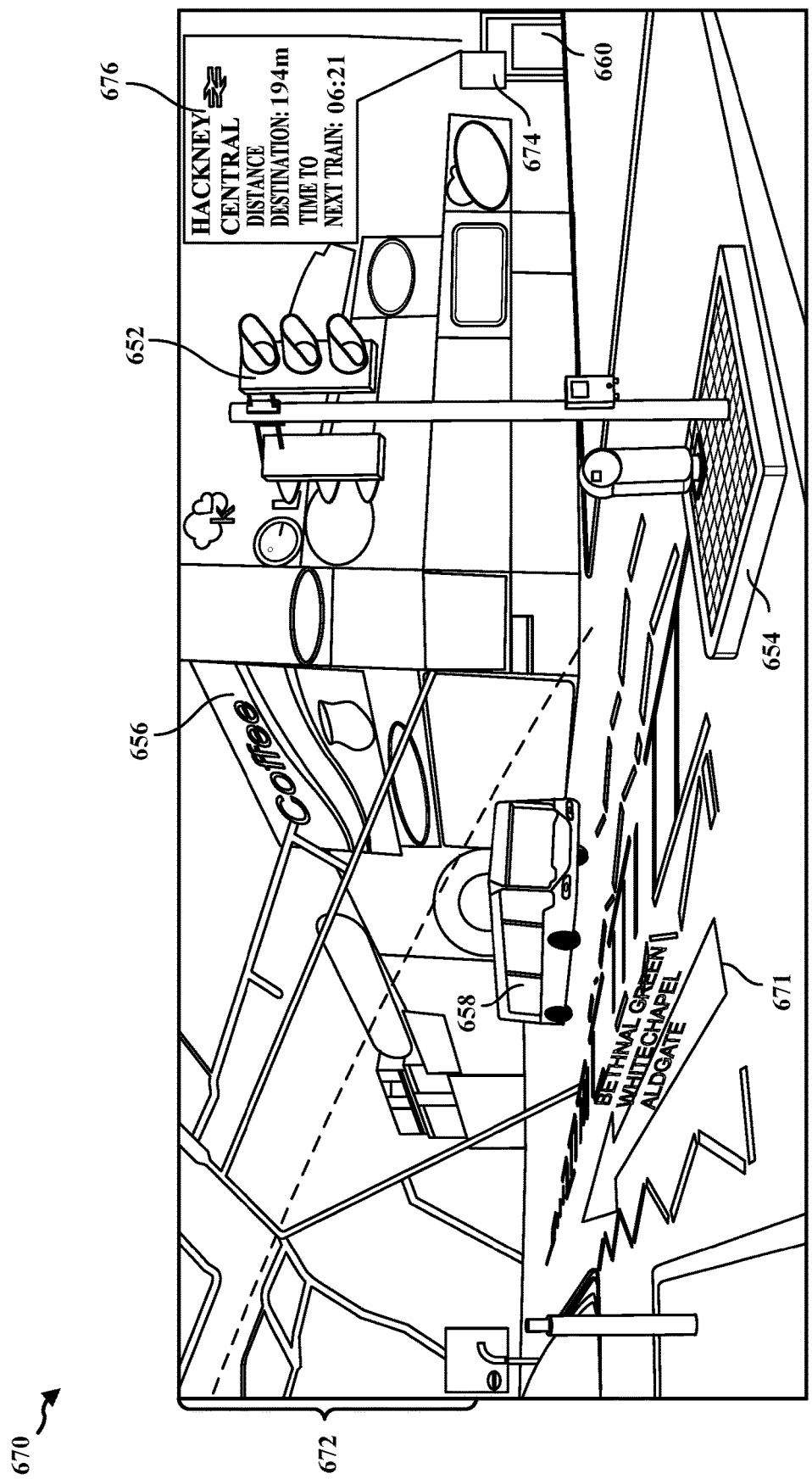
FIG. 6C is a diagram illustrating an example XR scene including virtual objects superimposed on real world objects, in accordance with the teachings disclosed herein.

FIG. 6C depicts a scene 670 including virtual objects superimposed over real world objects, as presented herein. For example, the scene 670 includes augmentation information that may be superimposed on the real world objects of FIG. 6B that may be presented via a display associated with a vehicle XR system, such as the first display 510 of FIG. 5. In the example of FIG. 6C, the augmentation information includes landmark information 671, navigation information 672, and an interactive object 674 that is superimposed over the train stop 660.

In some examples, a user (e.g., a driver and/or a passenger) may be presented with interactive objects with which the user may engage. In some examples, engaging with the interactive object may provide additional information about real world objects. For example, in the example of FIG. 6C, selecting the interactive object 674 may provide additional information for a related landmark, such as the train stop 660. For example, if a user selects the interactive object 674, the user may be presented with augmentation information 676 that provides information related to the train stop 660, such as the name of the train stop, a distance to the train stop, the next scheduled train arrival, etc.

Aspects disclosed herein facilitate a vehicle XR application that includes cloud-based processing. For example, aspects disclosed herein enable offloading some processing associated with presenting augmentation information to a cloud XR entity. The cloud XR entity may be in communication with a vehicle UE of a vehicle XR system, such as the vehicle UE 514 of FIG. 5. The cloud XR entity may receive information collected from the vehicle UE 514 via one or more sensors of the vehicle XR system, such as the one or more sensors 512. The cloud XR entity may then help determine what rendering information is needed to support the vehicle XR application at the vehicle UE 514 and to provide a satisfactory user experience (e.g., an XR experience that may be appreciated by the user). For example, the cloud XR entity may have the ability to identify real world objects in real-time (or near real-time) based on the information received from the vehicle UE. For example, based on the information received from the vehicle UE, the cloud XR entity may have the ability to identify that an intersection has a coffee shop and provide augmentation information associated with the coffee shop.

In some aspects, the vehicle UE and the cloud XR entity may establish a vehicle XR session. The vehicle XR session may enable communication associated with a user stream between the vehicle UE and the cloud XR entity. For example, the user stream may include uplink information that is provided by the vehicle UE to the cloud XR entity. The user stream may also include downlink information that is provided by the cloud XR entity to the vehicle UE.

The uplink information may include information that is collected by the one or more sensors of the vehicle XR system. The uplink information may include information about the vehicle and information about a user. For example, the collected information may include a vehicle XR component that includes one or more of vehicle pose information, vehicle information, and vehicle-surrounding information. The uplink information may also include a user XR component that includes one or more of user pose information and input information. The user pose information may include information relating to a position and/or orientation of the user in space relative to an XR space. An XR space may represent a virtual coordinate system with an origin that corresponds to a physical location. The user pose information may be with respect to the ground (e.g., absolute pose information) and/or with respect to the vehicle (e.g., relative pose information). The input information may include information related to user eye tracking and/or user gestures.

The downlink information from the cloud XR entity to the vehicle UE may include rendering information for presentment at the vehicle. For example, the rendering information may include XR information, such as augmentation information, that the vehicle UE is configured to superimpose over real world objects. The vehicle UE may also display the XR information via the one or more displays of the vehicle XR system.

The cloud XR entity may obtain the uplink information and perform virtual-physical fusion of the information to generate the rendering information. In one or more aspects, the virtual-physical fusion of the information may include identifying real world objects and XR information. For example, the cloud XR entity may identify the real world objects based on the vehicle-surrounding information of the vehicle XR component of the uplink information. The cloud XR entity may also generate XR information based on the identified real world objects. In some examples, the cloud XR entity may generate the XR information based on information received from additional network entities. For example, the cloud XR entity may identify a sports stadium and obtain XR information associated with the sports stadium from a network entity that provides sports-based information. The cloud XR entity may then provide the rendering information to the vehicle UE for presentment. For example, the vehicle UE may facilitate displaying the rendering information via the one or more displays of the vehicle.

Additionally, as XR systems and communication systems evolve and mature, more XR experiences may emerge. For example, rather than a vehicle XR application that displays information without taking driver information into account, the cloud XR entity could adapt the rendering information provided to the vehicle UE based on user pose. In such examples, the XR application may present information relevant to a user (e.g., the driver) as the user moves their head and what the user is seeing changes. The rendering information provided to the vehicle UE may be adjusted according to the status of the user, or the situation of the vehicle. For example, certain traffic related information may not be presented to the user when the vehicle is parked. In another example, only driving related XR information may be presented to the driver when the vehicle is moving at higher speed.

Additionally, the cloud XR entity may allow passengers to be provided with an XR experience. For example, the one or more sensors of the vehicle XR system may collect information associated with different users (e.g., a driver and one or more passengers). In some such examples, the cloud XR entity may have the ability to generate XR information for the different users. For example, passengers may be presented with XR information that is the same or different than the driver. For example, a driver may be presented with first XR information that is related to navigation (e.g., direction, speed, etc.) while passengers may be presented with second XR information related to landmarks. According to one or more examples, the XR information presented to the passengers may be shielded from the view of the driver, for example, to avoid distracting the driver.

In some examples, the rendering information provided to the vehicle UE may include interactive objects with which the user may engage. In some examples, engaging with the interactive object may provide additional information about real world objects. For example, an interactive object may be superimposed above a landmark. In some examples, a user may engage with (e.g., select) the interactive object to receive information about the landmark. In some examples, a user may engage with the interactive object to perform a transaction. For example, the rendering information may include an interactive object that is superimposed above a coffee shop. In some examples, the user may select the interactive object to initiate a coffee purchase at the coffee shop. In some examples, the input information of the user XR component may include information indicating engagement with the interactive object.

In some examples, the vehicle UE may provide relatively frequent communications of the uplink information, for example, to enable receiving accurate rendering information for presentment. For example, frequent updates (e.g., transmissions of the uplink information) may be needed to provide accurate information about the location of the vehicle and the vehicle-surrounding information to the cloud XR entity. According to one or more aspects, the cloud XR entity may have the capability to perform pre-fetching and/or compression of information as appropriate. For example, based on the path plan, the cloud XR entity may pre-fetch XR information related to landmarks that a user may see while traveling the route. In some examples, the cloud XR entity may also encode and/or compress the rendering information to reduce the amount of information that is transmitted over the air (OTA). Additionally, by enabling the cloud XR entity to generate the XR information, one or more aspects disclosed herein facilitate reducing the computation load of the vehicle UE for displaying the XR information. For example, the cloud XR entity may generate the XR information instead of the vehicle UE employing static or local-processing-based mechanism to generate the XR information.

In some examples, a vehicle XR session may be associated with one or more XR services, such as navigation services, landmark services, interactivity services, transaction-enabling services, etc. The navigation services may enable the displaying of XR information related to navigation. The landmark services may enable the displaying of XR information related to landmark identification. The interactivity services may enable the displaying of XR information including one or more interactive objects. The transaction-enabling services may enable the displaying of XR information related to performing a transaction based on an interactive object.

In some examples, when the cloud XR entity receives uplink information, the cloud XR entity may generate the XR information based on the one or more XR services. For example, based on the uplink information, the cloud XR entity may identify landmarks, opportunities for user interaction, and/or opportunities for performing a transaction. In such examples, the cloud XR entity may generate the rendering information to include XR information associated with the respective services.

In some examples, the cloud XR entity may provide granular control of XR services supported by the vehicle XR session. For example, a vehicle XR session may be subscription-based and associated with a subscription level. A subscription level may be associated with a quantity of user streams that may be associated with a vehicle XR session. For example, a first subscription level may permit only driver stream, a second subscription level may permit only a passenger stream, a third subscription level may permit a driver stream and a passenger stream, and a fourth subscription level may permit any number and combination of streams. In some examples, a subscription level may be associated with a level of XR interactivity. For example, based on the subscription level, the cloud XR entity may generate XR information including different types of interactive objects. In some examples, the subscription level may be associated with which services are enabled and/or disabled. For example, one subscription level may include navigation services and landmark services, while another subscription level may include navigation services, landmark services, interactivity services, and transaction-enabling services, etc. Thus, according to one or more examples, different subscription levels may result in different XR information being presented to users. In some examples, the subscription level may additionally, or alternatively, determine what kind of services can be presented to the user. For example, at some subscription levels, a high priority service user, e.g., a police officer, a government official, etc., may be presented with landmark services or interactive services from all surrounding buildings/locations, while users who are not high priority service users (e.g., "normal" users), may be presented with only services from commercial buildings/locations.

When establishing the vehicle XR session with the vehicle UE, the cloud XR entity may authorize a supported session level based on the subscription level. The supported session level may indicate which XR services are enabled and/or disabled and provide XR information accordingly. In some examples, the supported session level may be based on QoS information and/or QoE information. For example, the cloud XR entity may perform rendering adaptation to provide a satisfactory user experience. The rendering adaptation may be based on QoE metrics and/or QoS support information provided by the vehicle UE. For example, when communications between the vehicle UE and the cloud XR entity are delayed, packet retransmission is being observed, and/or the data rate is lower than allowed, the cloud XR entity may perform rendering adaptation to adjust the XR information being generated and provided to the vehicle UE. For example, when the QoE metrics and/or the QoS support information indicates reduced communication capabilities, the cloud XR entity may prioritize XR information associated with a driver stream and may deprioritize XR information associated with passenger streams. In this manner, the cloud XR entity may provide a satisfactory user experience to the driver, which may be of higher priority than providing a satisfactory user experience to the passengers, for example.

In some examples, the vehicle XR session may be associated with multiple users. For example, the vehicle XR session may include a first user stream associated with a first user (e.g., a driver) and a second user stream associated with a second user (e.g., a passenger). In such examples, the user streams may be associated with the same vehicle (e.g., the vehicle 500 of FIG. 5). For example, the uplink information may include a first user XR component associated with the first user, a second user XR component associated with the second user, and a vehicle XR component that is shared between the first stream and the second stream. The cloud XR entity may receive the uplink information and the respective components and consolidate the uplink information so that the rendering information facilitates a unified projection to the one or more displays of the vehicle.

Referring again to the example vehicle 500 of FIG. 5, the vehicle XR system of the vehicle 500 may be associated with one or more displays. The displays may be glasses-based or glass-less. In a glasses-based display, the users may each be wearing individual XR glasses and XR information may be displayed separately on the different XR glasses. In a glass-less based display, XR information may be presented via a heads-up display (HUD). In some examples, to enable different XR information to be presented for different users, the HUD may be a special-treated window that is polarized to achieve dual view of different content.

In the example of FIG. 5, the vehicle 500 includes the first display 510 that may be a HUD and configured to display XR information for the driver 502 and the first passenger 504. The vehicle 500 also includes a second display 520 that is positioned on the driver-side of the vehicle 500 and a third display 522 that is positioned on the other side of the vehicle 500. The second display 520 and the third display 522 may be HUDs configured to display XR information to users on the respective-sides of the vehicle. In some examples, the third display 522 may be configured to display different XR information to the first passenger 504 and the second passenger 506. The vehicle 500 also includes a fourth display 530. The fourth display 530 may be a glasses-based display that is worn by the second passenger 506 to view XR information associated with a vehicle XR session. Thus, it may be appreciated that when the vehicle UE 514 of FIG. 5 receives rendering information (e.g., from the cloud XR entity), the rendering information may be presentment via the one or more displays of the vehicle 500 (e.g., the first display 510, the second display 520, the third display 522, and/or the fourth display 530).

It may be appreciated that in other examples, the positioning of the displays and/or types of the displays may vary. For example, a vehicle may include only glasses-based display or may include only glass-less based display.

As used herein, the term "XR information" refers to information that rendered in association with an XR session. For example, XR information may include augmentation information that is superimposed over real world objects, such as the augmentation information 620 of FIG. 6A and/or the augmentation information of FIG. 6C.

Figure 7:
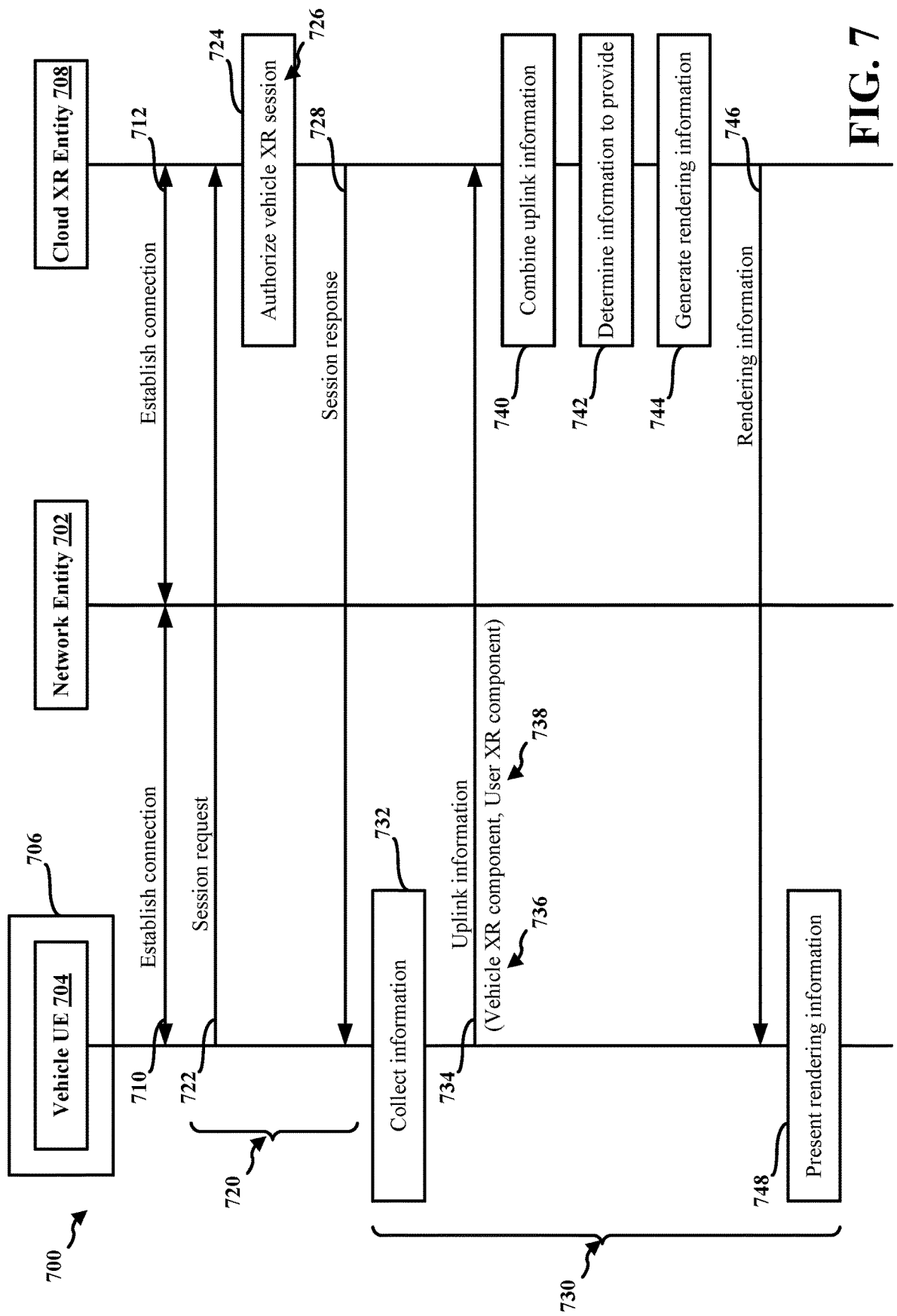
FIG. 7 is an example communication flow between a network entity, a UE, and a cloud XR entity, in accordance with the teachings disclosed herein.

FIG. 7 illustrates an example communication flow 700 between a network entity 702, a vehicle UE 704, and a cloud XR entity 708, as presented herein. One or more aspects described for the network entity 702 may be performed by a base station or a component of a base station, such as a CU, a DU, and/or an RU. Aspects of the cloud XR entity 708 may facilitate implementing the vehicle-to-cloud XR component 191 and/or the vehicle-to-cloud XR network component 199 of FIG. 1. Although not shown in the illustrated example of FIG. 7, it may be appreciated that in additional or alternate examples, the network entity 702, the vehicle UE 704, and/or the cloud XR entity 708 may be in communication with one or more other network entities or UEs.

In the illustrated example of FIG. 7, the communication flow 700 facilitates establishing a vehicle XR session and management of the vehicle XR session between the vehicle UE 704 and the cloud XR entity 708. The vehicle UE 704 may be a UE that enables a vehicle 706 to communicate via an access network. The vehicle 706 may be a terrestrial vehicle, such as a car, a bus, a train, etc., or may be an airborne/non-terrestrial vehicle, such as a drone, a balloon, etc. The cloud XR entity 708 may be a network entity that provides vehicle-to-cloud-based XR services to the vehicle 706. In some examples, the cloud XR entity 708 may be operated by a network operator, such as an operator of the network entity 702. In other examples, the cloud XR entity 708 may be operated by an operator different than the operator of the network entity 702. The network entity 702 and the cloud XR entity 708 may be collocated in a physical entity in some realizations.

As shown in FIG. 7, the vehicle UE 704 and the cloud XR entity 708 perform respective connection establishment procedures to facilitate communication between the vehicle UE 704 and the cloud XR entity 708. For example, the vehicle UE 704 and the network entity 702 perform a first connection establishment procedure 710 to enable the vehicle UE 704 to communicate via an access network. The cloud XR entity 708 and the network entity 702 may also perform a second connection establishment procedure 712 to enable the cloud XR entity 708 to communicate via the access network.

In the example of FIG. 7, after the vehicle UE 704 and the cloud XR entity 708 establish their respective connections, the vehicle UE 704 and the cloud XR entity 708 may communicate via the network entity 702. For example, when the vehicle UE 704 transmits a message to the cloud XR entity 708, the message may be first communicated from the vehicle UE 704 to the network entity 702, and then from the network entity 702 to the cloud XR entity 708. In a similar manner, when the cloud XR entity 708 transmits a message to the vehicle UE 704, the message may be first communicated from the cloud XR entity 708 to the network entity 702, and then from the network entity 702 to the vehicle UE 704.

As shown in FIG. 7, the vehicle UE 704 and the cloud XR entity 708 may perform a session establishment procedure 720 to establish a vehicle XR session. The session establishment procedure 720 may enable the vehicle UE 704 to initiate a vehicle XR session with the cloud XR entity 708. The session establishment procedure 720 may also enable the cloud XR entity 708 to authorize a vehicle XR session and to configure one or more aspects of the vehicle XR session For example, the vehicle UE 704 may output (e.g., transmit) a session request 722 that is obtained (e.g., received) by the cloud XR entity 708. The session request 722 may include a request to establish a vehicle XR session. The cloud XR entity 708 may perform authorization procedures 724 to authorize a vehicle XR session 726. The cloud XR entity 708 may perform the authorization procedures 724 based on information included in the session request 722. The cloud XR entity 708 may then output a session response 728 that is received by the vehicle UE 704. The session response 728 may confirm that the vehicle XR session 726 is established between the vehicle UE 704 and the cloud XR entity 708.

The vehicle XR session 726 may be associated with a session level and a corresponding session configuration. The session level may be based on one or more of a subscription, a supported Quality of Service (QoS), a user identifier (ID), and/or privacy controls. In some examples, the cloud XR entity 708 may determine a session configuration based on the session level. The session configuration may be associated with one or more operation parameters. For example, the session configuration may indicate a Uu connection to establish, an update frequency of state information, etc. The cloud XR entity 708 may configure the vehicle UE 704 with the one or more operation parameters via the session response 728. Additional aspects of the session establishment procedure 720 are described in connection with FIG. 8.

After the vehicle XR session 726 is established (e.g., via the session establishment procedure 720), the vehicle UE 704 and the cloud XR entity 708 may perform session management procedures 730 to manage the user experience associated with the vehicle XR session 726. For example, the vehicle UE 704 may perform information collection procedures 732 to collect information at the vehicle 706. For example, one or more sensors of the vehicle 706 may be configured to collect information related to the user and/or to the vehicle 706. Aspects of the one or more sensors of the vehicle 706 may be implemented by the one or more sensors 512 of FIG. 5. For example, the one or more sensors of the vehicle 706 may include sensors associated with an ADAS system of the vehicle 706 and/or in-cabin sensors.

As shown in FIG. 7, the vehicle UE 704 may output uplink information 734 that is obtained by the cloud XR entity 708. The uplink information 734 may be based on the information collected via the collection procedures 732. In the example of FIG. 7, the uplink information 734 includes a vehicle XR component 736 and a user XR component 738. The vehicle XR component 736 may include information relating to the vehicle 706, such as vehicle posture information, vehicle information, and/or vehicle-surrounding information. The user XR component 738 may include information relating to the user, such as user pose information and/or user input information.

In some examples, the vehicle UE 704 may collect information associated with the vehicle XR component 736 and/or the user XR component 738 based on respective periodicities configured via the session response 728. As different sensors may be associated with the collection of information for the vehicles and the users, the information collection may happen at different time points and/or with different periodicities. In some examples, the vehicle UE 704 may include timing information (e.g., timestamps) associated with different attributes of the uplink information.

As shown in FIG. 7, the cloud XR entity 708 may perform combination procedures 740 based on the uplink information 734. For example, the cloud XR entity 708 may perform virtual-physical fusion based on the vehicle XR component 736 and the user XR component 738 of the uplink information 734. In some examples, the combination procedures 740 may include associating an augmentation component with vehicle-surrounding information based on an environmental component. For example, the cloud XR entity 708 may identify an environmental component (e.g., a real world object) based on the vehicle XR component 736 of the uplink information 734. The cloud XR entity 708 may then associate an augmentation component with the environmental component. For example, the cloud XR entity 708 may identify a stadium and an augmentation component associated with the stadium. The augmentation component may include one or more of an identifier of a landmark (e.g., a name of the stadium) and an interactive object. The interactive object may be selected by the user to access additional information related to the real world object.

In some examples, the combination procedures 740 may include combining information from the vehicle UE 704 (e.g., the uplink information 734) and information from a service entity providing a service. Aspects of combining information based on information from a service entity are described in connection with the examples of FIG. 14 and FIG. 15.

In some examples, the combination procedures 740 may include correlating multiple attributes of the uplink information based on at least a first timestamp and a second timestamp. For example, the vehicle XR component 736 may include at least a first timestamp and the user XR component 738 may include at least a second timestamp. The cloud XR entity 708 may use the first timestamp and the second timestamp to correlate attributes of the uplink information 734 and/or compensate for differences in different attributes of the uplink information 734.

The cloud XR entity 708 may perform determination procedures 742 to determine what information to provide to the vehicle UE 704. For example, the cloud XR entity 708 may determine different XR information to provide to the vehicle UE 704 based on, for example, a subscription level, a QoS profile, a user identifier, privacy controls, etc. For example, based on a subscription level and corresponding supported session level associated with the vehicle XR session 726, the cloud XR entity 708 may determine to include different levels of interactivity via the XR information provided to the vehicle UE 704.

The cloud XR entity 708 may perform generating procedures 744 to generate rendering information 746. The rendering information 746 may be based on the output of the combination procedures 740 and the determination procedures 742. In some examples, the rendering information 746 may be configured based on the display capabilities of the vehicle 706. For example, the cloud XR entity 708 may adjust the rendering information 746 based on whether the rendering information 746 is for presentment via a glasses-based display or a glass-less based display. The cloud XR entity 708 may then output the rendering information 746 that is obtained by the vehicle UE 704.

As shown in FIG. 7, the vehicle UE 704 may perform presentation procedures 748 to present the rendering information 746. For example, the vehicle UE 704 may present the rendering information 746 via the one or more displays of the vehicle 706. Aspects of the displays of the vehicle 706 may be implemented by the first display 510, the second display 520, the third display 522, and/or the fourth display 530 of FIG. 5.

Figure 8:
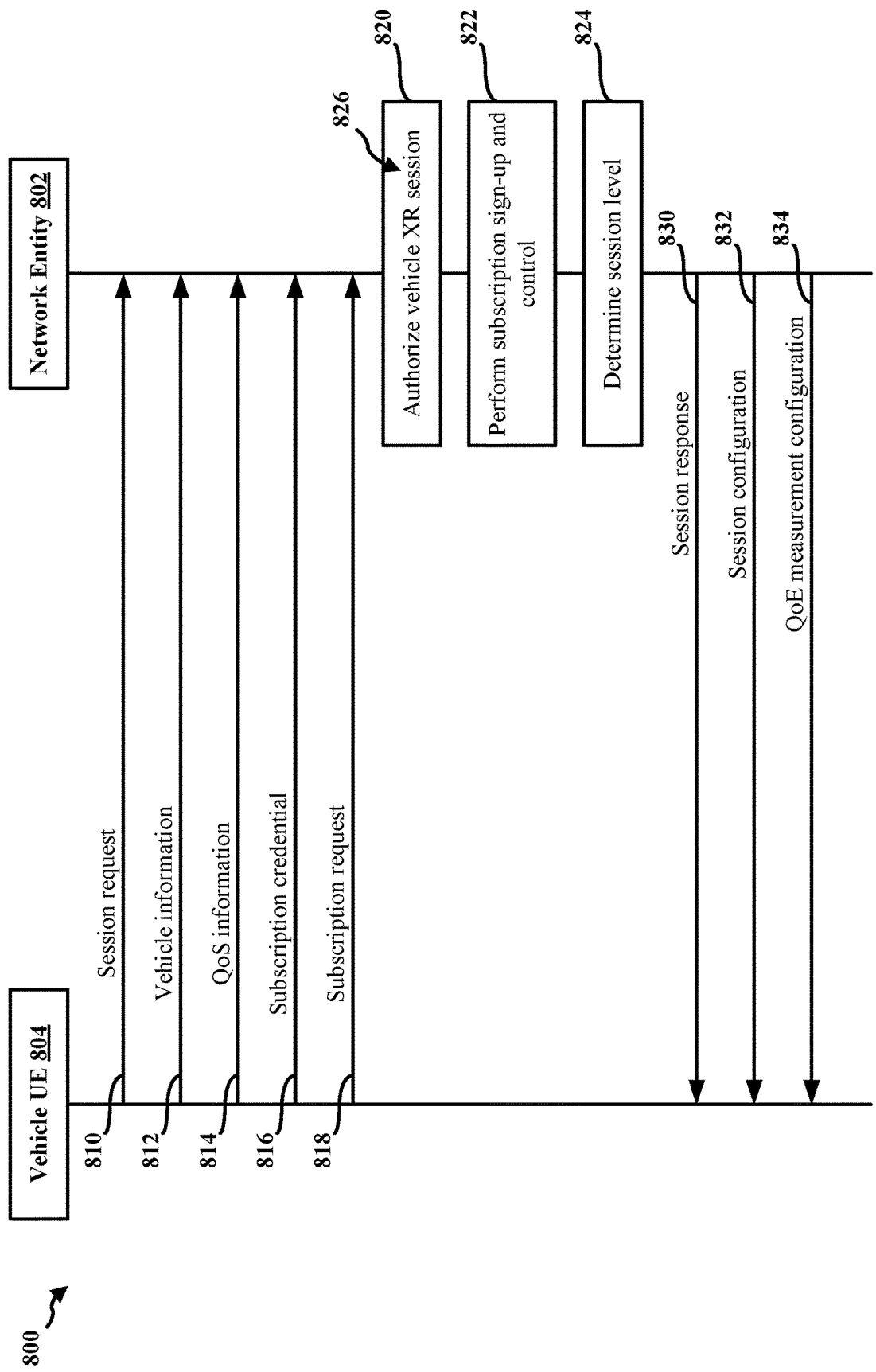
FIG. 8 is an example communication flow between a network entity and a UE, in accordance with the teachings disclosed herein.

FIG. 8 illustrates an example communication flow 800 between a network entity 802 and a vehicle UE 804, as presented herein. Aspects of the network entity 802 may be implemented by the cloud XR entity 708. In the illustrated example of FIG. 8, the communication flow 800 facilitates establishing a vehicle XR session between the network entity 802 and the vehicle UE 804. For example, the communication flow 800 may facilitate performing the session establishment procedure 720 of FIG. 7. In another example, the signaling between the vehicle UE 804 and the network entity 802 may be forwarded by the network entity 702 of FIG. 7.

As shown in FIG. 8, the vehicle UE 804 may transmit a session request 810 that is obtained (e.g., received) by the network entity 802. As described in connection with the session request 722 of FIG. 7, the session request 810 may indicate a request to establish a vehicle XR session with the network entity 802. The session request 810 may also indicate information that the network entity 802 may use to establish and maintain the vehicle XR session. In some examples, the session request 810 may include vehicle information 812, QoS information 814, subscription credential information 816, and/or subscription request information 818. Although the vehicle information 812, the QoS information 814, the subscription credential information 816, and the subscription request information 818 are illustrated as separate communications in the example of FIG. 8, in other examples, one or more of the vehicle information 812, the QoS information 814, the subscription credential information 816, and/or the subscription request information 818 may be included with the session request 810.

In some examples, the vehicle UE 804 may transmit the vehicle information 812 that is obtained by the network entity 802. The vehicle information 812 may include information about a vehicle associated with the vehicle UE 804, such as the vehicle 706 of FIG. 7. The vehicle information 812 may include vehicle make information, vehicle model information, vehicle modem information, vehicle mobile equipment (ME) information, path plan information, traffic condition information, etc. In some examples, the path plan information may be provided via a navigation system of the vehicle. For example, the path plan information may indicate a destination and a route to arrive at the destination. In some examples, the traffic condition information may be associated with traffic light information obtained from other devices, for example, via sidelink communication. Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. In some examples, the network entity 802 may obtain the vehicle information via a third party different than the vehicle UE 804. For example, the network entity 802 may obtain the vehicle information directly from the RSU, from another UE, or using other connected sensors, including cameras or radars.

In some examples, the vehicle UE 804 may transmit the QoS information 814 that is obtained by the network entity 802. The QoS information 814 may indicate a data rate supported by the vehicle UE 804 and/or mobile devices of users associated with the vehicle XR session. The QoS information 814 may also, or alternatively, indicate if a network connection is already established by the vehicle UE 804 (e.g., via the first connection establishment procedure 710 of FIG. 7). In some such examples, the QoS information 814 may also indicate if associated protocol data unit (PDU) sessions are established and if there are any guaranteed bit rate (GBR) bearers established. In some examples, the QoS information 814 may include an identifier of the UE, such as a generic public subscription identifier (GPSI). The identifier of the UE may enable the network entity 802 to obtain QoS monitoring/prediction information from another network entity, such as the AMF 192 of FIG. 1.

In some examples, the vehicle XR session may be associated with a subscription. A subscription may facilitate receiving one or more services associated with a vehicle XR session. A subscription may provide the one or more services to only one user (e.g., a driver or a passenger) or to more than one user (e.g., a driver and one or more passengers, or two or more passengers) associated with the vehicle XR session. In some examples, the subscription may be associated with different sets of services to different users. For example, the subscription may provide a first set of services (e.g., one or more services) to a driver and may provide a second set of services (e.g., one or more services) to a passenger. In some examples, the subscription may be associated with different sets of services for passengers. For example, the set of services offered to a passenger may be based on an age of the passenger (e.g., different sets of services associated with children, teenagers, adults, etc.) and/or a position of the passenger in the vehicle (e.g., different sets of services associated with a passenger in the front row compared to a passenger in a back row).

In some examples, the subscription may be a vehicle-based subscription. A vehicle-based subscription may be associated with a vehicle (e.g., the vehicle 706 of FIG. 7) and the one or more services may be registered with the vehicle. For example, a vehicle-based subscription may provide the one or more services to users of the vehicle.

In some examples, the subscription may be a user-based subscription. A user-based subscription may be associated with a user (e.g., via a user identifier) and the one or more services may be registered with the user. For example, a user-based subscription may enable a user to access the one or more services associated with their subscription from different vehicles, such as a rental vehicle. In some examples, the user-based subscription may allow a user to transfer a vehicle XR session from one vehicle to another vehicle, for example, in a ride sharing case. The user-based subscription information may be locally shared with the vehicle UE 804 so that it can be used for the corresponding vehicle XR session control. The local sharing mechanism for the subscription information may depend on the connectivity available in the vehicle, e.g., via Bluetooth, Wi-Fi, or other device-to-device communication technologies.

The subscription may be an existing subscription or may be requested. In some examples, the vehicle UE 804 may transmit the subscription credential information 816 that is obtained by the network entity 802. The subscription credential information 816 may include credentials associated with an existing subscription for vehicle XR services. The credentials may be stored in and/or associated with a subscriber identity module (SIM), a vehicle mobile equipment (ME), and/or an IP multimedia subsystem (IMS) like credentials. For example, an ME identifier, e.g., an International Mobile Equipment Identity (IMEI) or a UE ID, may be used for authorization and/or authentication. In some examples, the credential may be stored in a virtual SIM, a secure environment of a ME, or a physical security token. In some examples, the credential may additionally or alternatively use different formats that can be supported by the network entity 802, such as 3GPP defined credentials, or other credentials including certificates issued or authorized by other authorities, etc.

In some examples, the vehicle UE 804 may transmit the subscription request information 818 that is obtained by the network entity 802. The subscription request information 818 may include information associated with creating a subscription for vehicle XR services. Aspects of the subscription request information 818 may be collected via an online sign-up procedure, an application store, and/or payment information (e.g., a credit card, mobile payment, etc.).

As shown in FIG. 8, the network entity 802 may perform authorization procedures 820 to establish a vehicle XR session 826. In some examples, the authorization procedures 820 may include subscription management procedures 822. For example, the network entity 802 may perform subscription sign-up and subscription control. For example, the network entity 802 may create a subscription based on the subscription request information 818. In some examples, the network entity 802 may verify the subscription credential information 816 to confirm that the vehicle UE 804 is authorized to access a vehicle XR session.

The network entity 802 may also determine a supported session level 824. The network entity 802 may determine the supported session level 824 based on information obtained and/or associated with the session request 810, such as the vehicle information 812, the QoS information 814, and/or the subscription credential information 816. For example, the supported session level 824 may be associated with a subscription level, a supported QoS, a user identifier, and/or privacy controls. The supported session level 824 may enable the network entity 802 to perform granular support of services supported by the vehicle XR session 826. For example, based on a supported session level 824, the network entity 802 may determine to enable and/or disable one or more services and/or may determine a level of XR interactivity.

In some examples, the supported session level 824 may be based in part on a location and/or path plan of the vehicle. For example, the vehicle information 812 may indicate the location of the vehicle and/or a path plan of the vehicle. The network entity 802 may obtain, based on the vehicle information 812, supported QoS along the path plan of the vehicle (e.g., via predicted QoS procedures) and determine the supported session level 824 for the vehicle XR session 826 based on the supported QoS. For example, the network entity 802 may determine, based on the vehicle information 812, that portions of the path plan may have varying levels of network support capabilities and, thus, adjust the supported session level 824 for the vehicle XR session 826.

Determining the supported session level 824 based on the supported QoS may enable the network entity 802 to ensure that the user experience of a user (e.g., a driver) is not diminished. The supported session level 824 may be used in-turn by the network entity 802 to schedule transmission planning, encoding of the information, or even feedback to the network entity 702 of FIG. 7 to adjust the rendering information constructions. For example, in examples in which the vehicle XR session 826 is associated with multiple users (e.g., a driver and one or more passengers), the network entity 802 may determine the supported session level 824 so that that passenger XR session(s) do not interfere with the driver experience. For example, different session levels may offer different levels of XR interactivity and the supported session level 824 may be associated with a level of XR interactivity based on the supported QoS.

In some examples, the network entity 802 may determine the supported session level 824 based on the location of the vehicle UE 804. For example, the vehicle information 812 may include vehicle-surrounding information indicating that the vehicle is traveling next to a barricade on one-side of the vehicle. In such examples, the supported session level 824 may adjust the information provided to the vehicle UE 804 so that information for presentment on the barricaded-side is reduced, thereby reducing the amount of information communicated to the vehicle UE 804.

In some examples, the network entity 802 may determine the supported session level 824 based on a user and/or privacy controls. For example, different services may be associated with different users. In such examples, the XR information presented to a user may be based on their associated services. For example, certain public locations/services may offer XR information. In such examples, certain users may be presented with the XR information while other users may not be presented with the XR information. For example, a user who is a police officer may be presented with XR information that is not presented to a user who is not a police officer. As another example, a real estate agent may be presented with house-based XR information associated with a house while the general public may not be presented with the house-based XR information and/or may be presented with limited house-based XR information. For example, the real estate agent may see information indicating that the house is on the market, while the general public may see no information about the house or may see a house address.

As another example, if a user has a subscription to a sports channel, then the user may be presented with additional XR information and/or more in-depth information compared to a user who does not have the subscription to the sports channel. For example, one supported session level may provide information, such as a stadium name, when a stadium is visible and another supported session level may provide additional information related to the stadium, such as the home team(s) of the stadium, whether there is a game being played (or was recently played), the score of the game, a schedule of games, etc.

Thus, the supported session level 824 may facilitate the network entity 802 determining what information to provide to the vehicle UE 804 for presentment associated with the vehicle XR session 826. For example, based on the supported session level 824 and in association with the vehicle XR session 826, the network entity 802 may determine what XR information to provide to the vehicle UE 804 and/or may determine how much XR information to provide to the vehicle UE 804.

As shown in FIG. 8, the network entity 802 may output a session response 830 that is obtained (e.g., received) by the vehicle UE 804. As described in connection with the session response 728 of FIG. 7, the session response 830 may confirm that the vehicle XR session 826 is established between the vehicle UE 804 and the network entity 802.

In some examples, the session response 830 may include a session configuration 832. The session configuration 832 may configure one or more operating parameters associated with the vehicle XR session 826 at the vehicle UE 804. For example, the session configuration 832 may include an indication of the supported session level 824 associated with the vehicle XR session 826. The session configuration 832 may be based on the supported session level 824. In some examples, the session configuration 832 may configure a network connection type at the vehicle UE 804. In some examples, the session configuration 832 may configure an update frequency (e.g., periodicity) associated with uplink information associated with the vehicle XR session 826. For example, the session configuration 832 may configure a first periodicity associated with a vehicle XR component of uplink information (e.g., the vehicle XR component 736 of FIG. 7) and may configure a second periodicity associated with a user XR component of the uplink information (e.g., the user XR component 738 of FIG. 7).

In some examples, the network entity 802 may provide a configuration associated with Quality of Experience (QoE) parameters for the vehicle XR session 826. For example, the network entity 802 may output a QoE measurement configuration 834 that is received by the vehicle UE 804. The QoE measurement configuration 834 may be based on the supported session level 824 and/or the QoS information 814. The QoE measurement configuration 834 may facilitate providing fast and accurate rendering information to the vehicle UE 804. For example, the QoE measurement configuration 834 may facilitate accurate placement of augmentation components for presentment at the vehicle. In some examples, the QoE measurement configuration 834 may be associated with a delay and/or a capacity. For example, the QoE measurement configuration 834 may configure a delay threshold, a retransmission threshold, and/or a data rate threshold.

In some examples, the vehicle UE 804 may collect QoE metrics based on the QoE measurement configuration 834. Examples of QoE metrics may include a delay associated with a transmission, observed packet retransmission, and/or a data rate. In some examples, the vehicle UE 804 may transmit the session request 810 when an event associated with QoE metrics is satisfied. For example, the vehicle UE 804 may transmit the session request 810 when the delay exceeds the delay threshold, observed packet retransmission exceeds the retransmission threshold, and/or the capacity does not satisfy the data rate threshold (e.g., the data rate is lower than allowed by the network).

Although the session configuration 832 and the QoE measurement configuration 834 are illustrated as separate communications in the example of FIG. 8, in other examples, one or both of the session configuration 832 and the QoE measurement configuration 834 may be included with the session response 830.

Figure 9:
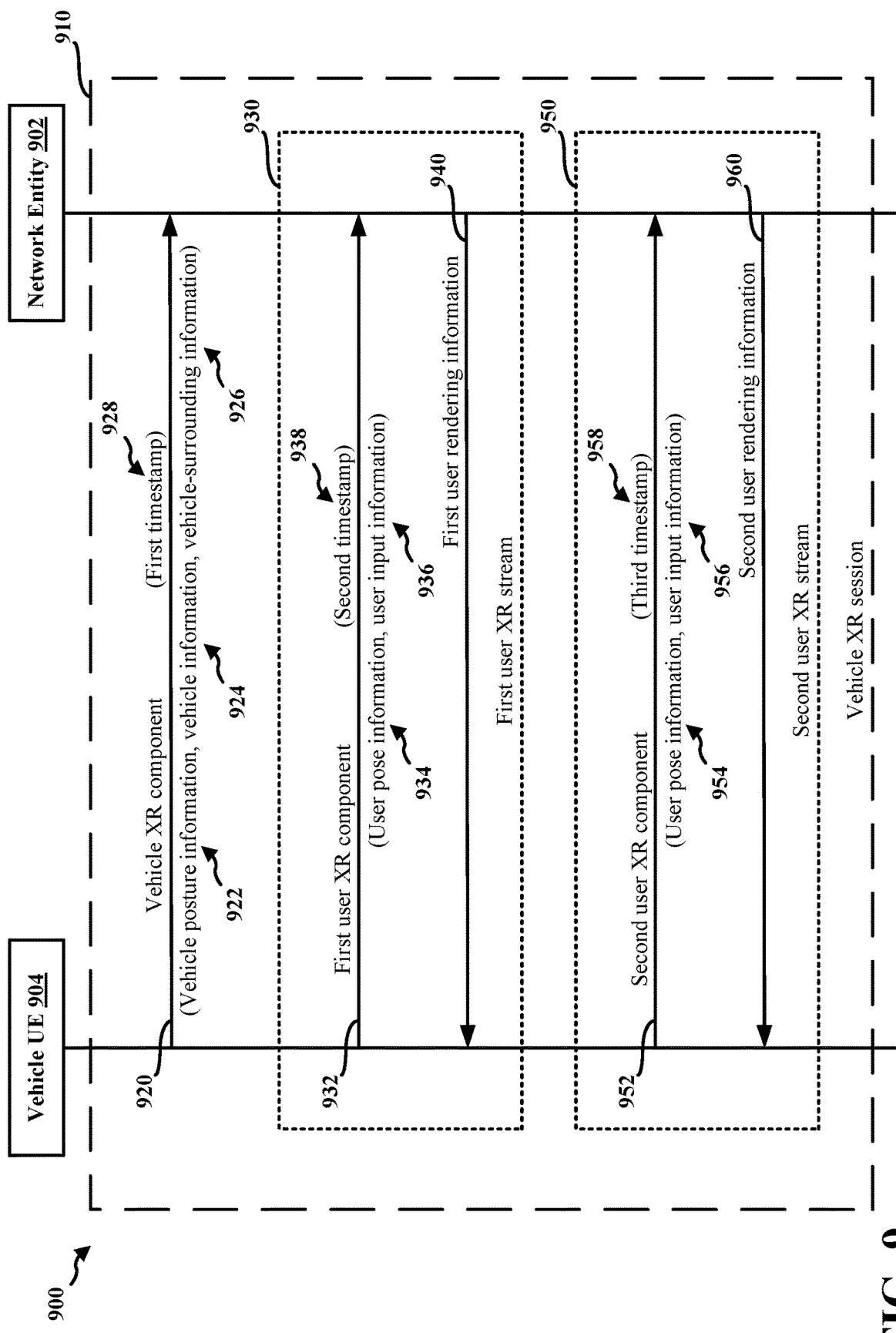
FIG. 9 is an example communication flow between a network entity and a UE, in accordance with the teachings disclosed herein.

FIG. 9 illustrates an example communication flow 900 between a network entity 902 and a vehicle UE 904, as presented herein. Aspects of the network entity 902 may be implemented by the cloud XR entity 708 of FIG. 7 and/or the network entity 802 of FIG. 8. Aspects of the vehicle UE 904 may be implemented by the vehicle UE 704 of FIG. 7 and/or the vehicle UE 804 of FIG. 8.

In the illustrated example of FIG. 9, the communication flow 900 facilitates providing vehicle-to-cloud XR services associated with a vehicle XR session. For example, the vehicle UE 904 and the network entity 902 may establish a vehicle XR session 910, as described in connection with session establishment procedure 720 of FIG. 7 and/or the communication flow 800 of FIG. 8. The vehicle XR session 910 may include one or more information streams that facilitate exchanging information associated with a respective user between the network entity 902 and the vehicle UE 904. As shown in FIG. 9, the vehicle XR session 910 includes a first user XR stream 930 and a second user XR stream 950. The first user XR stream 930 may facilitate exchanging information associated with a first user, such as the driver 502 of FIG. 5. The second user XR stream 950 may facilitate exchanging information associated with a second user, such as the first passenger 504 of FIG. 5. Although the example of FIG. 9 includes two information streams (e.g., the first user XR stream 930 and the second user XR stream 950), which may also be referred to as "sub-sessions" or "layers" of the vehicle XR session, other examples may include any suitable quantity of information streams, for example, based on a quantity of users accessing the vehicle XR session 910.

The vehicle UE 904 may transmit uplink information that is obtained by the network entity 902, as described in connection with the uplink information 734 of FIG. 7. The uplink information may include one or more components. In the example of FIG. 9, the vehicle UE 904 transmits a vehicle XR component 920 that is obtained by the network entity 902. The vehicle XR component 920 may include vehicle posture information 922 (e.g., location information, orientation information, direction information, heading information, speed information, yaw information, etc.), vehicle information 924 (e.g., vehicle make information, vehicle model information, vehicle modem information, vehicle mobile equipment (ME) information, path plan information, navigation information, traffic condition information, etc.), and/or vehicle-surrounding information 926 (e.g., environment information, buildings information, landscape information, etc.).

As shown in FIG. 9, the vehicle XR session 910 includes a first user XR stream 930 that may facilitate communicating information between the network entity 902 and the vehicle UE 904 associated with a first user (e.g., the driver 502 of FIG. 5). For example, the first user XR stream 930 may include a component of uplink information, such as a first user XR component 932. The first user XR component 932 may include user pose information 934 (e.g., a position and/or orientation of the first user). The user pose information 934 may be relative pose information and/or absolute pose information. For example, the user pose information 934 that is with respect to the ground may be referred to as absolute user pose information. The user pose information 934 that is with respect a vehicle coordinate system may be referred to as relative user pose information. The first user XR component 932 may also, or alternatively, include user input information 936. The user input information 936 may include information related to eye tracking, such as length of eye focus, and/or user gesture information associated with the first user. The user input information 936 may facilitate identifying when the first user is providing user input, such as selecting an augmentation component (e.g., an interactive object) being presented via the rendering information.

The first user XR stream 930 also includes first user rendering information 940. For example, the network entity 902 may output the first user rendering information 940 that is received by the vehicle UE 904. The first user rendering information 940 may include rendering information configured for presentment via the one or more displays associated with the first user. For example, and referring to the example of FIG. 5, the first user rendering information 940 may be presented to the driver 502 via the first display 510 when the driver is looking forward and may be presented to the driver 502 via the second display 520 when the driver 502 is looking in the direction of the window 516.

The first user rendering information 940 may include XR information configured for providing a satisfactory user experience to the first user. For example, the first user rendering information 940 may include augmentation components associated with a path plan (e.g., directions), a landmark, and/or interactive objects. The augmentation components may be associated with vehicle-surrounding information. For example, the network entity 902 may identify an environmental component via the vehicle XR component 920 (e.g., a landmark, such as a stadium). The network entity 902 may then associate an augmentation component with the vehicle-surrounding information based on the environmental component. For example, the network entity 902 may associate an identifier of a landmark (e.g., a stadium name) with the environment component. Thus, the first user rendering information 940 may include augmentation components associated with real world objects and related to the user experience of the first user.

As shown in FIG. 9, the vehicle XR session 910 may also include a second user XR stream 950 that may facilitate communicating information between the network entity 902 and the vehicle UE 904 associated with a second user (e.g., the first passenger 504 or the second passenger 506 of FIG. 5). For example, the second user XR stream 950 may include a component of uplink information, such as a second user XR component 952. The second user XR component 952 may be similar to the first user XR component 932, but with respect to the second user. For example, the second user XR component 952 may include user pose information 954 (e.g., a position and/or orientation of the second user). The user pose information 954 may be relative pose information and/or absolute pose information. The second user XR component 952 may also, or alternatively, include user input information 956. The user input information 956 may include information related to eye tracking, such as length of eye focus, and/or user gesture information associated with the second user. The user input information 956 may facilitate identifying when the second user is providing user input, such as selecting an augmentation component (e.g., an interactive object) being presented via the rendering information.

The second user XR stream 950 also includes second user rendering information 960. For example, the network entity 902 may output the second user rendering information 960 that is received by the vehicle UE 904. Similar to the first user rendering information 940 associated with the first user XR stream 930, the second user rendering information 960 may include rendering information configured for presentment via the one or more displays associated with the second user. For example, and referring to the example of FIG. 5, the second user rendering information 960 may be presented to the first passenger 504 via the first display 510 when the first passenger 504 is looking forward and may be presented to the first passenger 504 via the third display 522 when the first passenger is looking in the direction of the third display 522.

Similar to the first user rendering information 940, the second user rendering information 940 may include XR information configured for providing a satisfactory user experience to the second user. For example, the second user rendering information 960 may include augmentation components associated with real world objects. The augmentation components may include identifiers of the real world objects and/or interactive objects.

In the example of FIG. 9, the rendering information may be based on the user XR component and the vehicle XR component. Thus, in some examples, the vehicle XR component 920 may be shared between the first user XR stream 930 and the second user XR stream 950. The communications associated with the different user sessions may be communicated separately or may be communicated together. For example, the vehicle UE 904 may transmit uplink information including the vehicle XR component 920, the first user XR component 932, and/or the second user XR component 952. Additionally, the network entity 902 may output rendering information including the first user rendering information 940 and/or the second user rendering information 960. For example, the rendering information may include a first rendering information component corresponding to the first user rendering information 940 and a second rendering information component corresponding to the second user rendering information 960.

As shown in FIG. 9, one or more aspects of the uplink information (e.g., the vehicle XR component 920, the first user XR component 932, and/or the second user XR component 952) may include timing information. For example, the vehicle XR component 920 may be associated with a first timestamp 928, the first user XR component 932 may be associated with a second timestamp 938, and the second user XR component 952 may be associated with a third timestamp 958. The respective timestamps may include a date and/or time at which the corresponding information was collected. The timing information may facilitate correlating attributes of the uplink information and/or compensating for attributes of the uplink information. Aspects of correlating and/or compensating the attributes of the uplink information are described in connection with the communication flow 1400 of FIG. 14.

Figure 10:
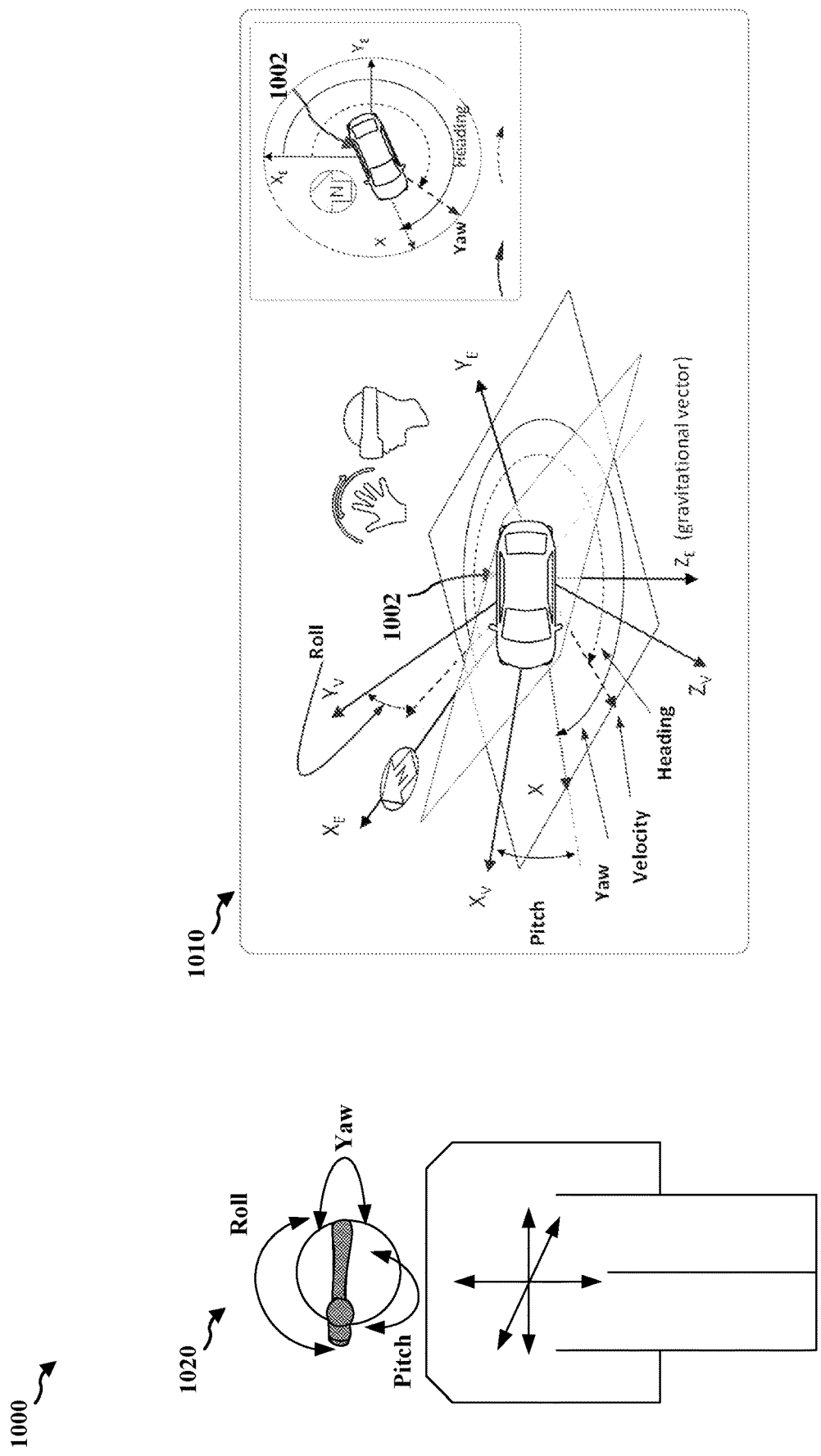
FIG. 10 is a diagram illustrating example collected information exchanged with a network entity, in accordance with the teachings disclosed herein.

FIG. 10 is a diagram illustrating information 1000 that may be exchanged with a network entity, as presented herein. The information 1000 may be collected by a UE for communicating to a network entity. Aspects of collecting the information 1000 are described in connection with the collection procedures 732 of FIG. 7. For example, the information may be collected via one or more sensors of a vehicle, such as the one or more sensors 512 of the vehicle 500 of FIG. 5.

In the example of FIG. 10, the information 1000 includes aspects of a vehicle XR component 1010, such as vehicle posture information. The vehicle XR component 1010 may include information related to the position and/or orientation of a vehicle 1002. For example, the vehicle XR component 1010 of FIG. 10 may include a vehicle orientation, velocity, heading, yaw, pitch, and/or roll. The vehicle XR component 1010 may be based on a relative positioning or absolute positioning. Examples of absolute positioning are shown in FIG. 10 via labels $X_E$, $Y_E$, and $Z_E$. Examples of relative positioning are shown in FIG. 10 via labels $X_V$, $Y_V$, and $Z_V$. The vehicle XR component 1010 may also include surrounding environments of the vehicle 1002, such as the vehicle-surrounding information 926 of FIG. 9. The vehicle XR component 1010 may also, or alternatively, include a path plan (e.g., from a navigation system) that provides directions to a desired destination.

In the example of FIG. 10, the information 1000 may also include aspects of a user XR component 1020, such as user pose information. The user pose information may refer to a position and/or orientation of the user in space relative to an XR space. For example, the user XR component 1020 may include an orientation of the user. The user XR component 1020 may also include video and/or camera inputs, such as surrounding environments, user eye tracking, and/or user gestures (e.g., based on hand devices).

In some examples, the information 1000 associated with the user XR component 1020 may correspond to an absolute posture, for example, with respect to the ground. In some examples, the user XR component 1020 may correspond to a relative posture, for example, with respect the vehicle coordinate system. For example, the orientation of the user may be with respect to the ground (e.g., an absolute posture) or may be with respect to the vehicle coordinate system (e.g., a relative posture). In a similar manner, the user gestures may be described with respect to the ground (e.g., an absolute gesture) or may be with respect to the vehicle coordinate system (e.g., a relative gesture). In some examples, information related to the relative gestures and/or the relative posture may be collected via in-cabin sensors of the vehicle 1002.

Figure 11:
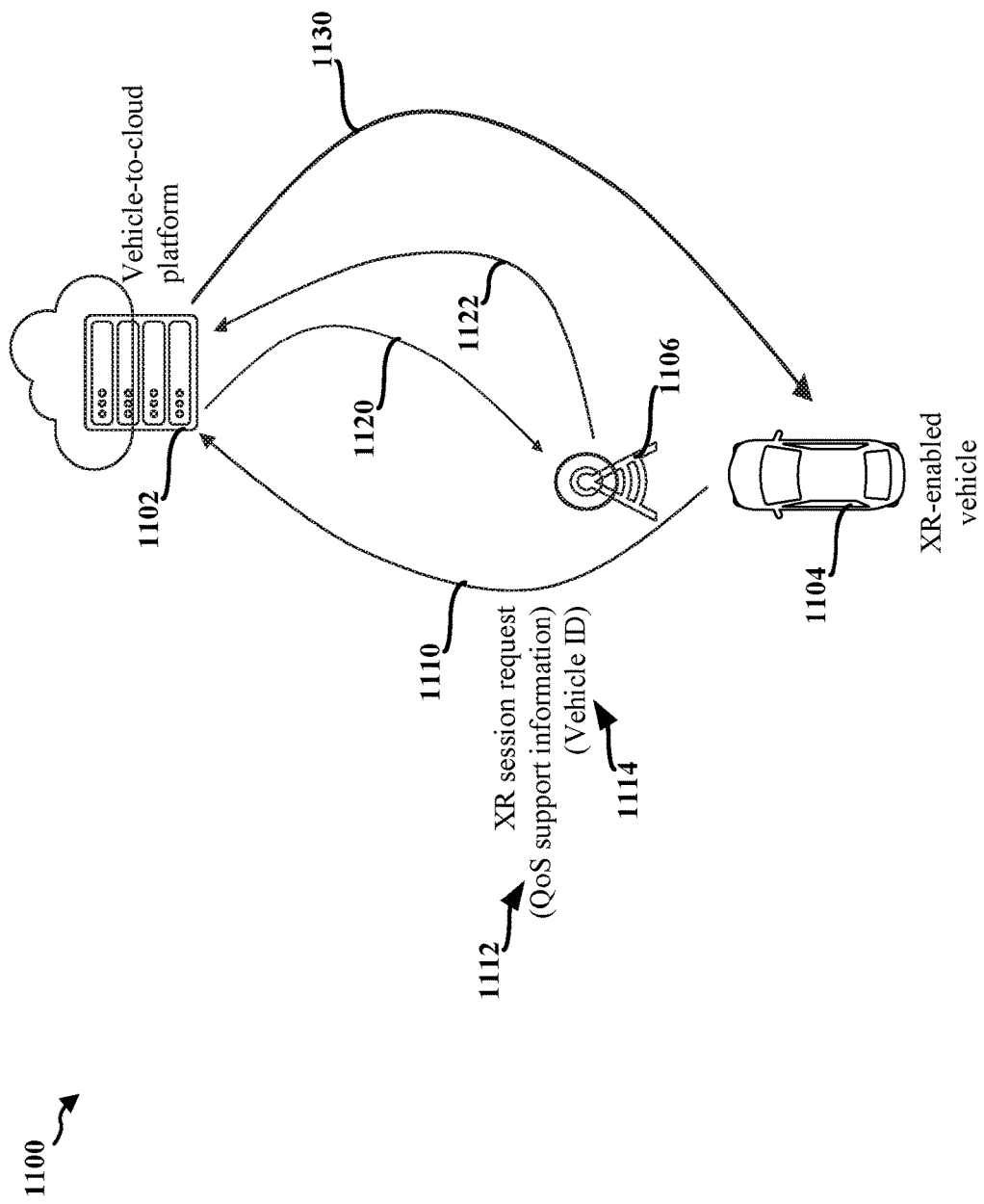
FIG. 11 is an example communication flow between a network entity and a UE, in accordance with the teachings disclosed herein.

FIG. 11 illustrates a communication flow 1100 between a network entity 1102 and a vehicle UE 1104, as presented herein. Aspects of the network entity 1102 may be implemented by a vehicle-to-cloud platform, such as the cloud XR entity 708 of FIG. 7 and/or the network entity 802 of FIG. 8. Aspects of the vehicle UE 1104 may be implemented by an XR-enabled vehicle, such as the vehicle 500 of FIG. 5 and/or the vehicle UE 704 and vehicle 706 of FIG. 7.

In the illustrated example of FIG. 11, the network entity 1102 and the vehicle UE 1104 communicate via a communication system 1106. Aspects of the communication system 1106 are described in connection with the network entity 702 of FIG. 7. For example, the network entity 1102 and the vehicle UE 1104 may communicate via a 5G NR system.

As shown in FIG. 11, the vehicle UE 1104 may transmit an XR session request 1110 that is obtained (e.g., received) by the network entity 1102. Aspects of the XR session request 1110 may be implemented by the session request 722 of FIG. 7 and/or the session request 810 of FIG. 8. In the illustrated example of FIG. 11, the vehicle UE 1104 may transmit QoS support information 1112 associated with the XR session request 1110. The QoS support information 1112 may facilitate XR rendering adaptation by the network entity 1102.

The QoS support information 1112 may include a data rate supported by the vehicle and/or mobile devices of users associated with the vehicle XR session. In some examples, the QoS support information 1112 may indicate if a network connection is already established (e.g., via the communication system 1106). For example, the QoS support information 1112 may indicate that the vehicle UE 1104 has established a network connection with the communication system 1106 and whether there are one or more XR-based PDU sessions associated with the network connection. For example, an XR-based PDU session may be associated with a QoS Flow that requires a guaranteed flow bit rate (e.g., GBR QoS Flow) and, thus, the QoS support information 1112 may indicate whether one or more GBR bearers are established to facilitate the communication associated with the vehicle XR session.

In some examples, the XR session request 1110 may include a vehicle identifier 1114. For example, the vehicle identifier 1114 may include a vehicle ME identifier, a UE ID, a GPSI, etc. The network entity 1102 may use the vehicle identifier 1114 to obtain QoS monitoring information and/or QoS prediction information from the communication system 1106. For example, the network entity 1102 may output a request 1120 that is obtained by the communication system 1106. The request 1120 may include the vehicle identifier 1114. The communication system 1106 may use the vehicle identifier 1114 to obtain QoS monitoring information and/or QoS prediction information associated with the vehicle UE 1104. The communication system 1106 may then transmit a response 1122 based on the request 1120 and include the QoS monitoring information and/or QoS prediction information.

In some examples, the network entity 1102 may configure the vehicle UE 1104 to collect and provide QoE metrics. For example, to facilitate XR rendering adaptation, the network entity 1102 may output a QoE measurement configuration 1130 that is received by the vehicle UE 1104. In some examples, the network entity 1102 may provide the QoE measurement configuration 1130 via a session response, such as the session response 728 of FIG. 7 and/or the session response 830. The QoE measurement configuration 1130 may be based on a supported session level and/or the QoS support information 1112. The QoE measurement configuration 1130 may facilitate providing fast and accurate rendering information to the vehicle UE 1104. For example, the QoE measurement configuration 1130 may facilitate accurate placement of augmentation components for presentment at the vehicle. In some examples, the QoE measurement configuration 1130 may be associated with a delay and/or a capacity. For example, the QoE measurement configuration 1130 may configure a delay threshold, a retransmission threshold, and/or a data rate threshold.

In some examples, the vehicle UE 1104 may collect QoE metrics based on the QoE measurement configuration 1130. Examples of QoE metrics may include a delay associated with a transmission, observed packet retransmission, and/or a data rate. In some examples, the vehicle UE 1104 may transmit the XR session request 1110 when an event associated with QoE metrics is satisfied. For example, the vehicle UE 1104 may transmit the XR session request 1110 when the delay exceeds the delay threshold, observed packet retransmission exceeds the retransmission threshold, and/or the capacity does not satisfy the data rate threshold (e.g., the data rate is lower than allowed by the network).

Figure 12:
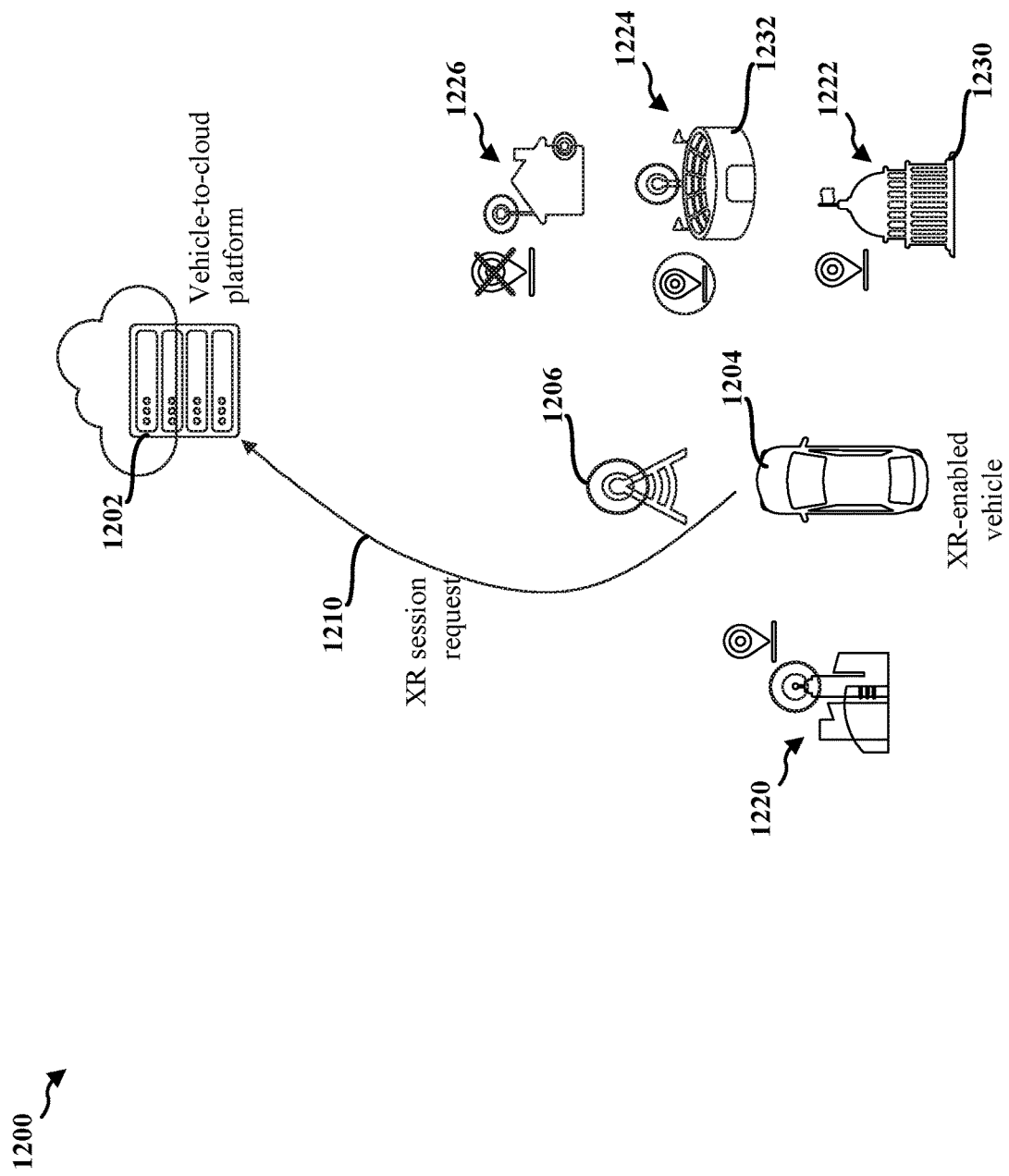
FIG. 12 is an example communication flow between a network entity and a UE, in accordance with the teachings disclosed herein.

FIG. 12 illustrates a communication flow 1200 between a network entity 1202 and a vehicle UE 1204, as presented herein. Aspects of the network entity 1202 may be similar to the network entity 1102 of FIG. 11. Aspects of the vehicle UE 1204 may be similar to the vehicle UE 1104 of FIG. 11. In the illustrated example of FIG. 12, the network entity 1202 and the vehicle UE 1204 communicate with each other via a communication system 1206. Aspects of the communication system 1206 may be similar to the communication system 1106 of FIG. 11.

As shown in FIG. 12, the vehicle UE 1204 may output an XR session request 1210 that is obtained by the network entity 1202. Aspects of the XR session request 1210 may be implemented by the session request 722 of FIG. 7 and/or the session request 810 of FIG. 8. For example, the XR session request 1210 may include vehicle information, QoS information, subscription credential information, and/or subscription request information, as described in connection with FIG. 8.

The network entity 1202 may determine a supported session level based on the XR session request 1210, as described in connection with the supported session level 824 of FIG. 8. For example, the XR session request 1210 may include subscription credential information and the network entity 1202 may determine a subscription level based on the subscription credential information. The network entity 1202 may also determine a supported session level based on the subscription level.

In some examples, the network entity 1202 may determine which XR services to provide based on the subscription level. In the example of FIG. 12, example XR services include a navigation service 1220, a landmark service 1222, a sports service 1224, and a realtor service 1226. The navigation service 1220 may facilitate providing XR information related to navigation (e.g., a path plan, etc.). The landmark service 1222 may facilitate providing XR information related to identifying landmarks. The sports service 1224 may facilitate providing XR information related to providing additional and/or in-depth information related to sports-based landmarks. The realtor service 1226 may facilitate providing XR information related to real estate (e.g., information about a house that is on the market, the seller's agent, etc.).

Other examples may include additional or alternate XR services that provide an immersive XR experience to users, such as a passenger. For example, a shopping service may enable a passenger to initiate and engage in a shopping experience. A video conference service may enable a passenger to initiate and participate in a video conference. A gaming service may enable a passenger to initiate and participate in a gaming session with other passengers in the region (e.g., via vehicle-to-vehicle (V2V) communication).

In the example of FIG. 12, the network entity 1202 may determine, based on the XR session request 1210 that the user has access to certain XR services and not to other XR services. For example, the network entity 1202 may determine to provide access to the navigation service 1220, the landmark service 1222, and the sports service 1224, and to not provide access to the realtor service 1226. As described above, access to the different XR services may be based on the subscription level, the user identifier, and/or based on privacy controls.

The different XR services may provide different XR information for presentment via rendering information. For example, based on the landmark service 1222, the network entity 1202 may provide XR information identifying a government building 1230 and a stadium 1232. If the user has a subscription to a sports channel, then the network entity 1202 may determine to provide access to the sports service 1224 and provide additional information related to the stadium 1232. For example, the XR information associated with the stadium 1232 may indicate that a game is being played at the stadium 1232, may indicate the current score of the game, etc. In some examples, the XR information associated with the stadium 1232 may provide a transaction opportunity. For example, the XR information associated with the stadium 1232 may include an interactive object that facilitates purchasing a ticket to an upcoming game at the stadium 1232.

Figure 13:
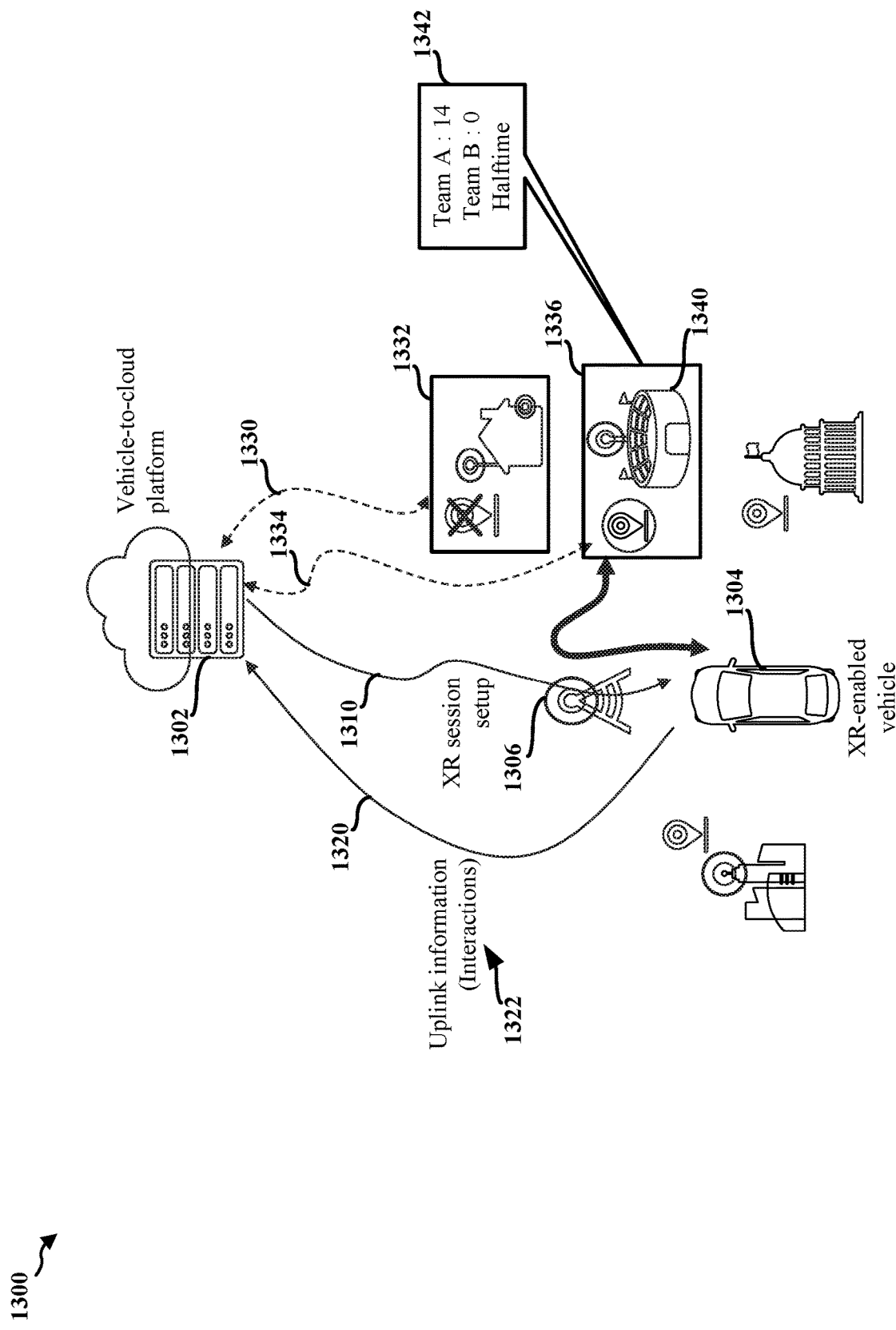
FIG. 13 is an example communication flow between a network entity and a UE, in accordance with the teachings disclosed herein.

FIG. 13 illustrates a communication flow 1300 between a network entity 1302 and a vehicle UE 1304, as presented herein. Aspects of the network entity 1302 may be similar to the network entity 1102 of FIG. 11 and/or the network entity 1202 of FIG. 12. Aspects of the vehicle UE 1304 may be similar to the vehicle UE 1104 of FIG. 11 and/or the vehicle UE 1204 of FIG. 12. Similar to the examples of FIG. 11 and FIG. 12, in the illustrated example of FIG. 13, the network entity 1302 and the vehicle UE 1304 communicate with each other via a communication system 1306. Aspects of the communication system 1306 may be similar to the communication system 1106 of FIG. 11 and/or the communication system 1206 of FIG. 12.

The communication flow 1300 of FIG. 13 facilitates vehicle XR session and service management. In some examples, the communication flow 1300 may facilitate a vehicle XR session including interactive objects. In the example of FIG. 13, the network entity 1302 outputs an XR session setup message 1310 that is obtained by the vehicle UE 1304. Aspects of the XR session setup message 1310 may be implemented by the session response 728 of FIG. 7 and/or the session response 830 of FIG. 8. For example, the XR session setup message 1310 may indicate a supported session level and/or a session configuration. In some examples, the XR session setup message 1310 may configure one or more operation parameters at the vehicle UE 1304. For example, the XR session setup message 1310 may indicate a network connection type to establish (e.g., via the communication system 1306), an update frequency associated with uplink information, etc. In some examples, the update frequency (e.g., periodicity) may be associated with different components of the uplink information. For example, the XR session setup message 1310 may configure a first periodicity associated with the vehicle XR component and a second periodicity associated with the user XR component. The vehicle UE 1304 may collect the information associated with the different XR components based on the respective periodicities. For example, the vehicle UE 1304 may collect information associated with the vehicle XR component based on the first periodicity and collect information associated with the user XR component based on the second periodicity.

As described above in connection with the collection procedures 732 of FIG. 7, the vehicle UE 1304 may collect information for the uplink information via one or more sensors of the vehicle, such as the one or more sensors 512 of FIG. 5. The vehicle UE 1304 may output uplink information 1320 that is obtained by the network entity 1302. Aspects of the uplink information 1320 may be implemented by the uplink information 734 of FIG. 7.

The network entity 1302 may obtain the uplink information 1320 and fuse attributes of the uplink information 1320 to generate rendering information, such as the rendering information 746 of FIG. 7. The network entity 1302 may provide the rendering information to the vehicle UE 1304 for presentment via one or more displays of the vehicle, such as the first display 510, the second display 520, the third display 522, and/or the fourth display 530 of FIG. 5.

In some examples, the network entity 1302 may have the capability to provide an XR service. For example, the network entity 1302 may have the capability to provide a navigation service and a landmark service, such as the navigation service 1220 and the landmark service 1222 of FIG. 12. In some examples, the network entity 1302 may have the capability to communicate with another network entity that provides an XR service. For example, the network entity 1302 may establish a first connection 1330 to communicate with a first network entity 1332 that provides a realtor service, such as the realtor service 1226 of FIG. 12. The network entity 1302 may establish a second connection 1334 to communicate with a second network entity 1336 that provides a sports service, such as the sports service 1224 of FIG. 12. It may be appreciated that the first network entity 1332 and the second network entity 1336 may a same network entity or may be different network entities.

In the example of FIG. 13, the rendering information provided to the vehicle UE 1304 may include an interactive object. For example, the rendering information may include an interactive object 1340 that is superimposed on a real world object (e.g., a stadium). The interactive object 1340 may enable a user (e.g., a passenger) to select the interactive object 1340 and to obtain additional or in-depth information related to the stadium. For example, selecting the interactive object 1340 may provide additional information regarding the stadium, such as a current score of a game being played at the stadium.

In the example of FIG. 13, when a user interacts with an interactive object, such as the interactive object 1340, the vehicle UE 1304 may generate user interaction information 1322 based on the interaction(s). The user interaction information 1322 may provide information regarding what interactive object was selected. As shown in FIG. 13, the vehicle UE 1304 may provide the user interaction information 1322 to the network entity 1302 via uplink information (e.g., the uplink information 1320). The network entity 1302 may then generate and output subsequent rendering information based on in part on the user interaction information 1322. For example, in the illustrated example of FIG. 13, the subsequent rendering information may include score information 1342 indicating a score of a current game being played at the stadium.

In some examples, the network entity 1302 may communicate with the second network entity 1336 via the second connection 1334 to provide the score information 1342. For example, the network entity 1302 may receive the user interaction information 1322 and determine a user interaction with the interactive object 1340. The network entity 1302 may also determine that the interactive object 1340 is associated with a sports service being provided by the second network entity 1336. In such examples, the network entity 1302 may communicate with the second network entity 1336 to obtain additional information, if any, associated with the stadium. In the example of FIG. 13, the second network entity 1336 may identify the score information 1342 and provide the score information 1342 to the network entity 1302, for example, via the second connection 1334. The network entity 1302 may then generate the subsequent rendering information including the score information 1342 for presentment at the vehicle.

Figure 14:
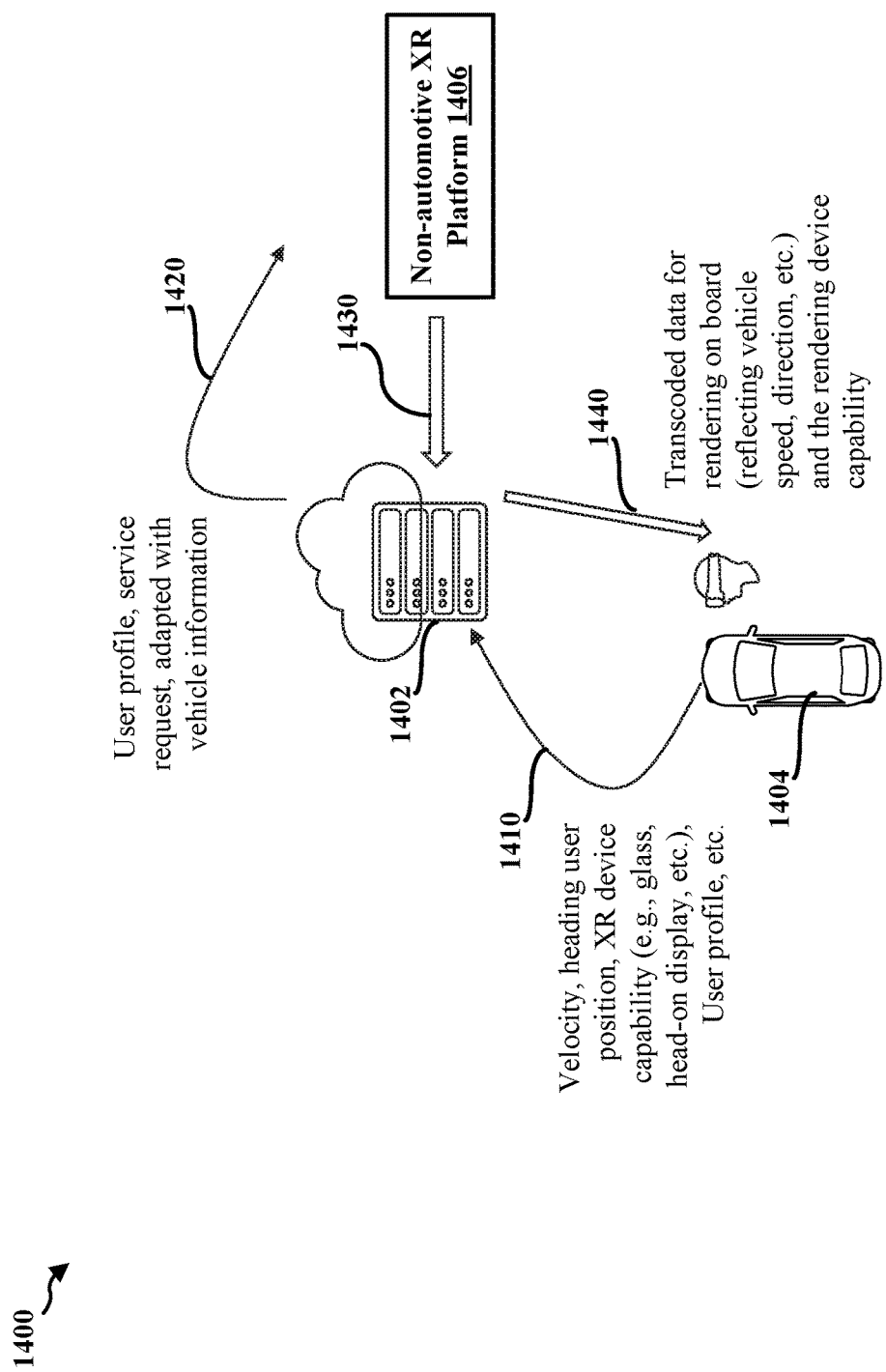
FIG. 14 is an example communication flow between a network entity and a UE, in accordance with the teachings disclosed herein.

FIG. 14 illustrates a communication flow 1400 between a network entity 1402 and a vehicle UE 1404, as presented herein. Aspects of the network entity 1402 may be similar to the network entity 1102 of FIG. 11, the network entity 1202 of FIG. 12, and/or the network entity 1302 of FIG. 13. Aspects of the vehicle UE 1404 may be similar to the vehicle UE 1104 of FIG. 11, the vehicle UE 1204 of FIG. 12, and/or the vehicle UE 1304 of FIG. 13. Although not shown in the example of FIG. 14, the network entity 1402 and the vehicle UE 1404 may communicate with each other via a communication system, such as the communication system 1106 of FIG. 11, the communication system 1206 of FIG. 12, and/or the communication system 1306 of FIG. 13.

In the illustrated example of FIG. 14, the communication flow 1400 facilitates accessing XR services provided by another network entity, such as a non-automotive XR platform 1406. The non-automotive XR platform 1406 may provide a service that may not be associated with a vehicle-based service. For example, the non-automotive XR platform 1406 may provide a service, such as purchasing a ticket for a game or purchasing a coffee.

In the illustrated example of FIG. 14, the network entity 1402 may be configured to receive information from the vehicle UE 1404 and/or the non-automotive XR platform 1406 and to process the received information for use by the vehicle UE 1404 and/or the non-automotive XR platform 1406. For example, the vehicle UE 1404 may output uplink information 1410 that is obtained by the network entity 1402. The uplink information 1410 may include a vehicle XR component and a user XR component, as described in connection with the vehicle XR component 920 and the first user XR component 932 of FIG. 9. For example, the uplink information 1410 may include information related to a velocity, a heading, user position, XR device capability (e.g., glasses-based display, glass-less based display, etc.), a user profile (e.g., subscription credentials, etc.).

The network entity 1402 may then adapt the uplink information 1410 to generate service request information 1420. The network entity 1402 may adapt the uplink information 1410 so that the non-automotive XR platform 1406 may use the service request information 1420 without being aware of the automotive use of the service. For example, the network entity 1402 may aggregate and translate the uplink information 1410, such as the position, direction gesture, target, etc., to generate the service request information 1420. The service request information 1420 may include a service request and a user profile. The network entity 1402 may adapt the uplink information 1410 to generate the service request information 1420 that the non-automotive XR platform 1406 may expect to receive when receiving a service request. The network entity 1402 may perform the translating of the uplink information 1410 based on knowledge of the vehicle, such as the make, the model, and/or additional vehicle-specific information, such as original equipment manufacturer (OEM) information.

The network entity 1402 may then output the service request information 1420 that is obtained by the non-automotive XR platform 1406. The non-automotive XR platform 1406 may then operate as usual based on the service request information 1420. For example, the non-automotive XR platform 1406 may use the service request information 1420 to generate service output information 1430. The service output information 1430 may be based on the service request information 1420 and without knowledge that the service request information 1420 was generated based on information obtained from a vehicle and associated with a vehicle XR session. In some examples, the service output information 1430 may include data for rendering based on the service performed by the non-automotive XR platform 1406.

The non-automotive XR platform 1406 may output the service output information 1430 that is obtained by the network entity 1402. The network entity 1402 may then transcode the service output information 1430 for rendering at the vehicle. For example, the network entity 1402 may transcode the data obtained from the non-automotive XR platform 1406 via the service output information 1430 based on one or more attributes of the uplink information 1410. For example, based on the speed, direction, the rendering capability of the vehicle UE 1404, etc., the network entity 1402 may generate transcoded data 1440. The network entity 1402 may output the transcoded data 1440 to the vehicle UE 1404 for presentment via the one or more displays of the vehicle associated with the vehicle XR session. Aspects of the one or more displays of the vehicle may be implemented by the one or more displays of the vehicle 500 of FIG. 5 (e.g., the first display 510, the second display 520, the third display 522, and/or the fourth display 530).

In some examples, the generating of the service request information 1420 and/or the transcoded data 1440 by the network entity 1402 may include correlating and/or compensating for differences associated with the uplink information 1410. For example, one or more attributes of the uplink information 1410 may include timing information so that the network entity 1402 is able to compensate for differences, for example, between when the network entity 1402 receives the uplink information 1410 and generates the transcoded data 1440. In some such examples, the uplink information 1410 may include one or more timestamps, such as the first timestamp 928 associated with vehicle XR component 920 and the second timestamp 938 associated with the first user XR component 932 of FIG. 9.

As one example of operation based on the communication flow 1400 of FIG. 14, the non-automotive XR platform 1406 may be associated with a coffee business and may provide services associated with purchasing goods at the coffee business, for example, via a mobile application. In such examples, the uplink information 1410 may include user interaction information, such as the user interaction information 1322 of FIG. 13, indicating a selection of an interactive object associated with the coffee business (e.g., selection of a coffee offered by the coffee business). The uplink information 1410 may also include information about the path plan of the vehicle. The network entity 1402 may use the path plan of the vehicle and navigation services to identify a location of the coffee business that is on the path plan. The network entity 1402 may adapt the uplink information 1410, including the user interaction information to generate the service request information 1420 to initiate a purchase of the selected coffee. The service request information 1420 may be configured with information to facilitate the coffee purchase (e.g., a coffee type, a size, etc.) and may be absent of information related to the vehicle. The non-automotive XR platform 1406 may use the service request information 1420 to perform a mobile order of the selected coffee and generate service output information 1430 that is obtained by the network entity 1402. The service output information 1430 may include verification that the coffee purchase was successful and an expected time for the coffee to be ready. The network entity 1402 may then generate the transcoded data 1440 based on the service output information 1430 and one or more attributes of the uplink information 1410. For example, the transcoded data 1440 may include rendering information that is configured for presentment via the one or more devices of the vehicle associated with the vehicle XR session.

Although not shown in the example of FIG. 14, it may be appreciated that the communication flow 1400 between the vehicle UE 1404, the network entity 1402, and the non-automotive XR platform 1406 may be implemented via one or more application programming interfaces (APIs) or cloud native services. The APIs or cloud native services may provide exposure to one or more configuration and operation parameters. For example, the network entity 1402 may be configured with a first API or cloud native service that enables the vehicle UE 1404 to communicate with the network entity 1402. The network entity 1402 may also be configured with a second API or cloud native service that enables the network entity 1402 and the non-automotive XR platform 1406 to communicate. Thus, the APIs or cloud native services at the network entity 1402 and the non-automotive XR platform 1406 may enable exposing certain interfaces so that a service operator can provide non-automotive services for use via a vehicle XR session.

Figure 15:
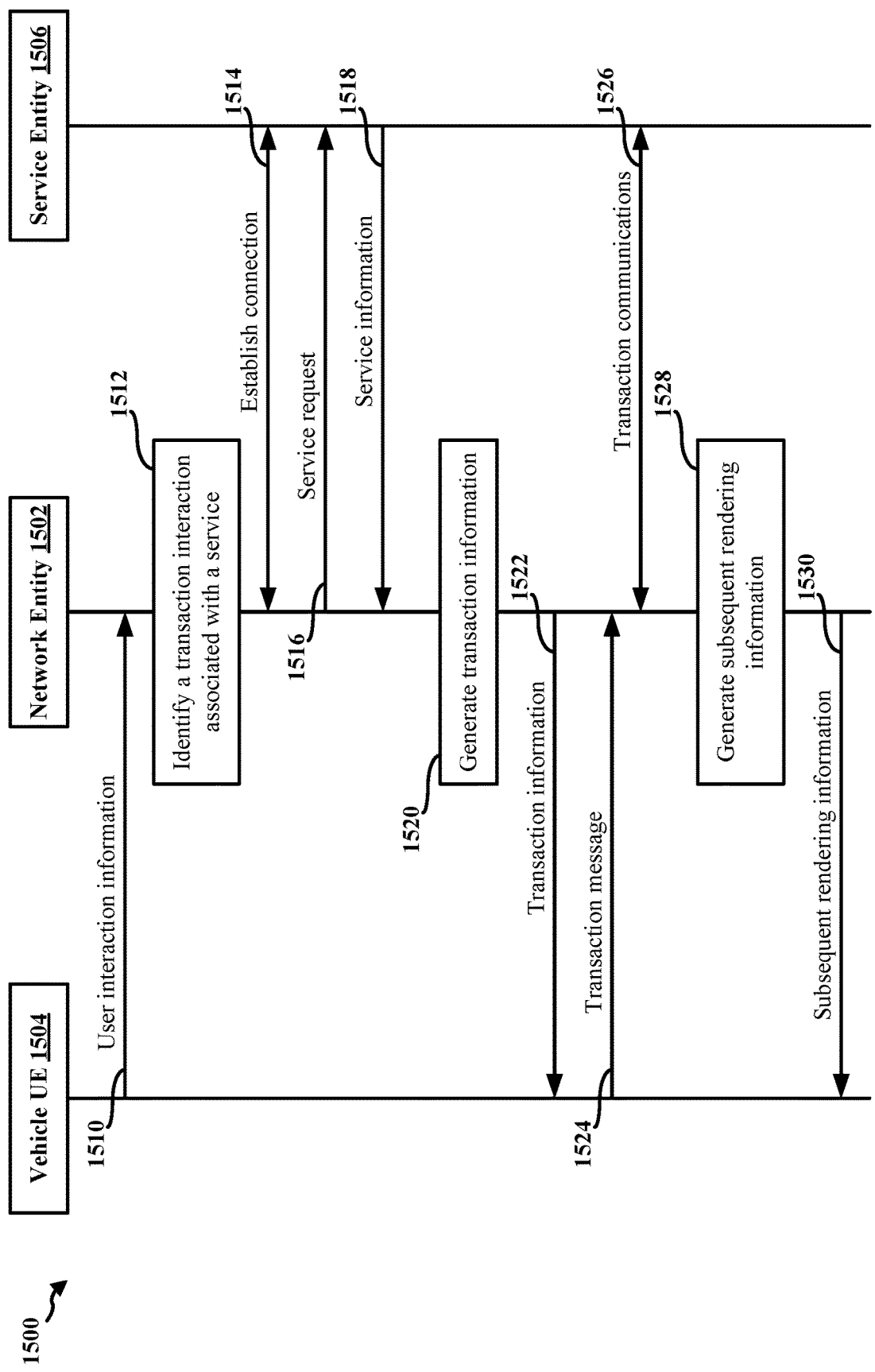
FIG. 15 is an example communication flow between a network entity, a UE, and a service entity, in accordance with the teachings disclosed herein.

FIG. 15 illustrates an example communication flow 1500 between a network entity 1502, a UE 1504, and a service entity 1506, as presented herein. Aspects of the network entity 1502 may be implemented by the cloud XR entity 708 of FIG. 7, the network entity 802 of FIG. 8, and/or the network entity 902 of FIG. 9. Although not shown in the illustrated example of FIG. 15, it may be appreciated that the network entity 1502, the UE 1504 and the service entity 1506 may be in communication via a communication system, such as a 5G NR system.

In the illustrated example of FIG. 15, the communication flow 1500 may facilitate performing a transaction associated with a service provided by the service entity 1506. For example, the service entity 1506 may provide a service to order a coffee from a coffee business via a mobile application. Aspects of the communication flow 1500 may be similar to the communication flow 1400 of FIG. 14.

In the example of FIG. 15, the UE 1504 may output user interaction information 1510 that is obtained by the network entity 1502. The user interaction information 1510 may be included with uplink information that is output to the network entity 1502. The network entity 1502 may perform identification 1512 of a transaction interaction associated with a service. For example, the network entity 1502 may determine that the user interaction information 1510 includes selection of an interactive object that facilitates a transaction. In the example of FIG. 15, the network entity 1502 may determine that the transaction is associated with a service that is provided by the service entity 1506. As shown in FIG. 15, the network entity 1502 and the service entity 1506 may perform a connection establishment procedure 1514 to facilitate communication with each other. The network entity 1502 may output a service request 1516 that is obtained by the service entity 1506. Aspects of the service request 1516 may be similar to the service request information 1420 of FIG. 14. For example, the service request 1516 may include information to facilitate the transaction with the service entity 1506. The service entity 1506 may process the service request 1516 and may output service information 1518 that is obtained by the network entity 1502.

The network entity 1502 may use the service information 1518 for generating 1520 transaction information. In some examples, the network entity 1502 may generate transaction information 1522 based on the service information 1518 and uplink information. The network entity 1502 outputs the transaction information 1522 that is received by the UE 1504. The UE 1504 may process the transaction information 1522 for presentment via the one or more displays of the vehicle associated with the vehicle XR session.

For example, the user interaction information 1510 may indicate selection of an interactive object associated with a coffee business. The network entity 1502 may establish a connection with the service entity 1506 that facilitates performing transactions related to the coffee business, such as ordering a coffee. The service information 1518 may include a menu of products offered by the coffee business and available for purchase. The transaction information 1522 may include rendering information that facilitates presentment of the menu based on the one or more displays of the vehicle. For example, the network entity 1502 may adapt the transaction information 1522 based on whether the rendering information will be presented via a HUD or a glasses-based display.

In some examples, a user may further engage with the rendering information based on the transaction information 1522. For example, the rendering information may include interactive objects corresponding to respective beverages that may be purchased via the menu. The UE 1504 may output uplink information including a transaction message 1524 indicating selection of an interactive object corresponding to a beverage. The network entity 1502 and the service entity 1506 may then exchange transaction communications 1526 to place the order of the beverage. The network entity 1502 may also perform generating procedures 1528 of subsequent rendering information 1530 based on the transaction communications 1526. The network entity 1502 may then output the subsequent rendering information 1530 for presentment via the one or more displays associated with the vehicle XR session.

Figure 16:
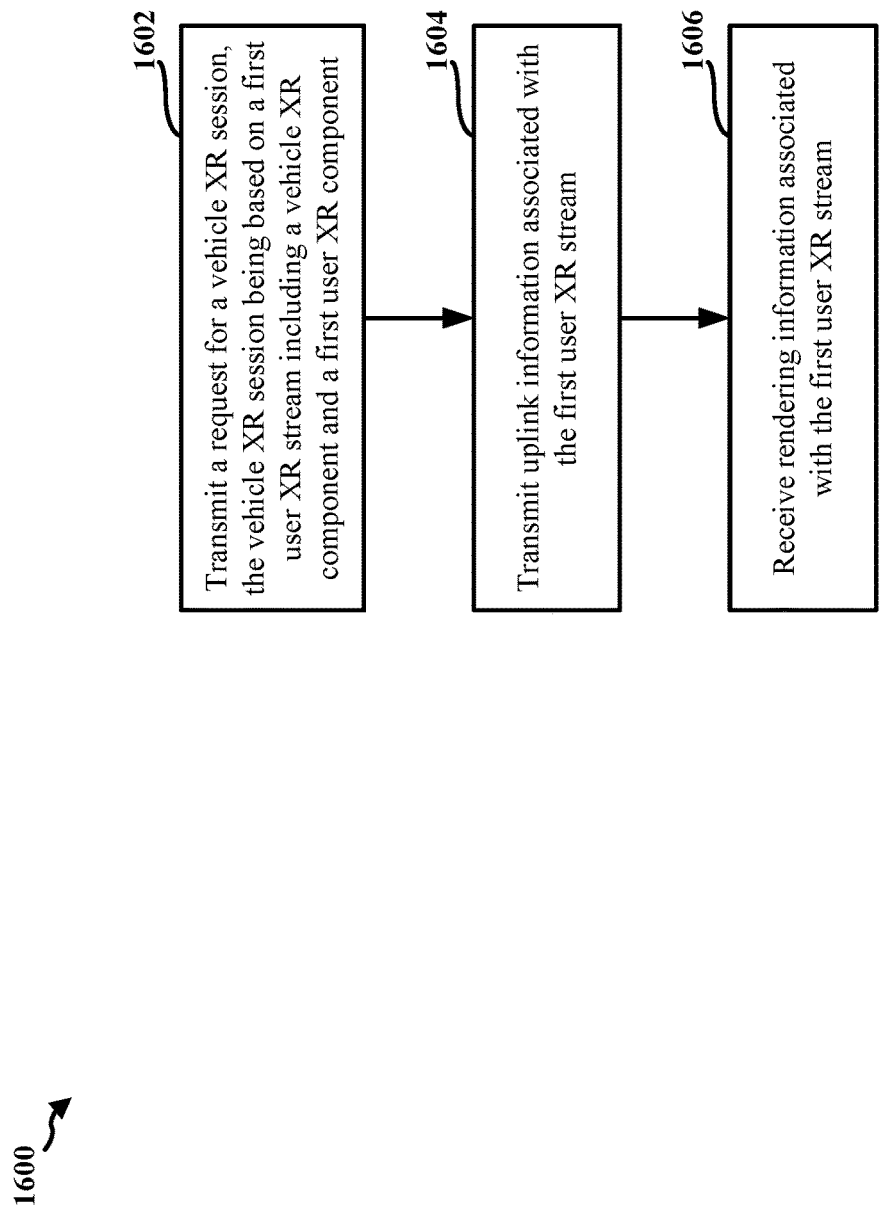
FIG. 16 is a flowchart of a method of wireless communication at a UE, in accordance with the teachings disclosed herein.

FIG. 16 is a flowchart 1600 of a method of wireless communication. The method may be performed by a UE (e.g., one or more of the UEs 104, and/or an apparatus 1804 of FIG. 18). The method may facilitate improving user experience associated with a vehicle XR session by using a cloud-based entity to reduce information transmitted OTA and/or to reduce computation load associated with the vehicle XR session at the UE.

At 1602, the UE transmits a request for a vehicle XR session. Aspects of the request for the vehicle XR session are described in connection with at least the session request 722 of FIG. 7. The vehicle XR session may be based on a first user XR stream including a vehicle XR component associated with a vehicle and a first user XR component associated with a first user, the first user having an association with the vehicle, as described in connection with the vehicle XR component 736 and the user XR component 738 of FIG. 7. The transmitting of the request for the vehicle XR session, at 1602, may be performed by a cellular RF transceiver 1822 and/or the vehicle XR component 198 of the apparatus 1804 of FIG. 18.

In some examples, the vehicle XR component may include at least one of vehicle posture information, vehicle information, and vehicle-surrounding information, as described in connection with at least the vehicle XR component 920 of FIG. 9. In some examples, the first user XR component may include relative user posture information and user input with reference to the vehicle, as described in connection with at least the first user XR component 932 of FIG. 9.

At 1604, the UE transmits uplink information associated with the first user XR stream. Aspects of the uplink information are described in connection with at least the uplink information 734 of FIG. 7. The transmitting of the uplink information, at 1604, may be performed by the cellular RF transceiver 1822 and/or the vehicle XR component 198 of the apparatus 1804 of FIG. 18.

At 1606, the UE receives rendering information associated with the first user XR stream. Aspects of the rendering information are described in connection with at least the rendering information 746 of FIG. 7. The receiving of the rendering information, at 1606, may be performed by the cellular RF transceiver 1822 and/or the vehicle XR component 198 of the apparatus 1804 of FIG. 18.

Figure 17:
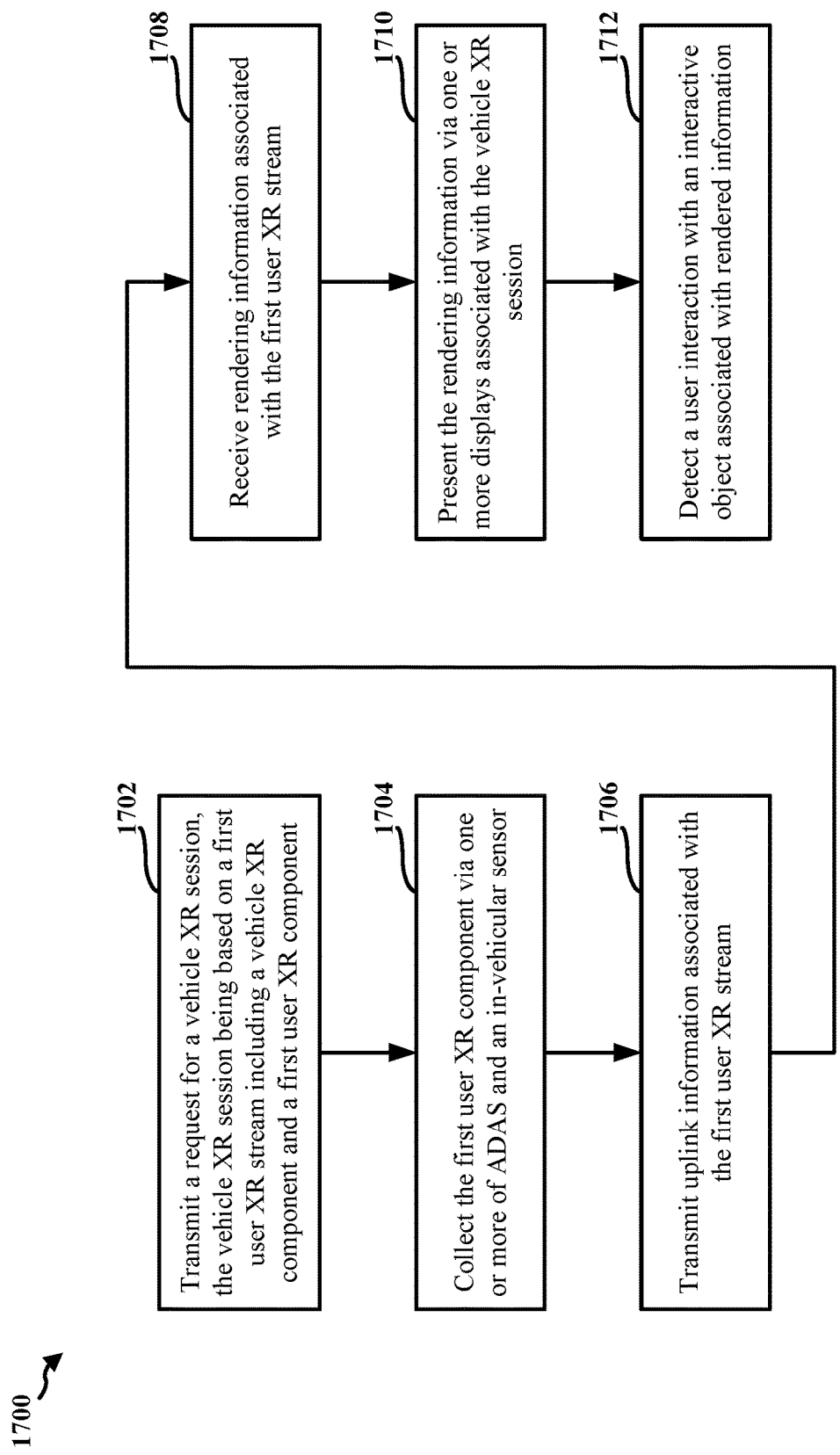
FIG. 17 is a flowchart of a method of wireless communication at a UE, in accordance with the teachings disclosed herein.

FIG. 17 is a flowchart 1700 of a method of wireless communication. The method may be performed by a UE (e.g., one or more of the UEs 104, and/or an apparatus 1804 of FIG. 18). The method may facilitate improving user experience associated with a vehicle XR session by using a cloud-based entity to reduce information transmitted OTA and/or to reduce computation load associated with the vehicle XR session at the UE.

At 1702, the UE transmits a request for a vehicle XR session. Aspects of the request for the vehicle XR session are described in connection with at least the session request 722 of FIG. 7. The vehicle XR session may be based on a first user XR stream including a vehicle XR component associated with a vehicle and a first user XR component associated with a first user, the first user having an association with the vehicle, as described in connection with the vehicle XR component 736 and the user XR component 738 of FIG. 7. The transmitting of the request for the vehicle XR session, at 1702, may be performed by a cellular RF transceiver 1822 and/or the vehicle XR component 198 of the apparatus 1804 of FIG. 18.

In some examples, the vehicle XR component may include at least one of vehicle posture information, vehicle information, and vehicle-surrounding information, as described in connection with at least the vehicle XR component 920 of FIG. 9. In some examples, the first user XR component may include relative user posture information and user input with reference to the vehicle, as described in connection with at least the first user XR component 932 of FIG. 9.

In some examples, the request for the vehicle XR session, at 1702, may include a subscription credential, as described in connection with the subscription credential information 816 of FIG. 8. In some examples, the subscription credential may be associated with a subscription level.

At 1704, the UE may collect the first user XR component associated with the first user XR stream via one or more of an advanced driver assistant system (ADAS) or an in-vehicular sensor, as described in connection with the collection procedures 732 of FIG. 7. The collecting of the first user XR component, at 1704, may be performed by the vehicle XR component 198 of the apparatus 1804 of FIG. 18.

At 1706, the UE transmits uplink information associated with the first user XR stream. Aspects of the uplink information are described in connection with at least the uplink information 734 of FIG. 7. The transmitting of the uplink information, at 1706, may be performed by the cellular RF transceiver 1822 and/or the vehicle XR component 198 of the apparatus 1804 of FIG. 18.

In some examples, the uplink information may include at least a first timestamp associated with the vehicle XR component and at least a second timestamp associated with the first user XR component, as described in connection with at least the first timestamp 928 and the second timestamp 938 of FIG. 9.

At 1708, the UE receives rendering information associated with the first user XR stream. Aspects of the rendering information are described in connection with at least the rendering information 746 of FIG. 7. The receiving of the rendering information, at 1708, may be performed by the cellular RF transceiver 1822 and/or the vehicle XR component 198 of the apparatus 1804 of FIG. 18.

In some examples, the rendering information may include an augmentation component associated with vehicle-surrounding information, as described in connection with at least the interactive object 1340 and/or the score information 1342 of FIG. 13.

At 1710, the UE may present the rendering information via one or more displays associated with the vehicle XR session. Aspects of presenting the rendering information are described in connection with at least the presentation procedures 748 of FIG. 7. The presenting of the rendering information, at 1710, may performed by the vehicle XR component 198 of the apparatus 1804 of FIG. 18.

At 1712, the UE may detect a user interaction with an interactive object associated with rendering information. In some examples, the first user XR component may include user interaction information associated with the user interaction. In some examples, the interactive object may be associated with the vehicle XR component of the vehicle XR session. Aspects of the user interaction and the user interaction information are described in connection with at the user interaction information 1322 of FIG. 13.

In some examples, the vehicle XR session may be further based on a second user XR stream including the vehicle XR component and a second user XR component associated with a second user. Aspects of the second user XR stream are described in connection with at least the second user XR stream 950 of FIG. 9.

In some examples in which the vehicle XR session is based on the first user XR stream and the second user XR stream, the rendering information, at 1708, may include a first rendering component associated with the first user XR stream and a second rendering component associated with the second user XR stream, as described in connection with at least the first user rendering information 940 and the second user rendering information 960 of FIG. 9.

In some examples in which the vehicle XR session is based on the first user XR stream and the second user XR stream, the vehicle XR component may be shared between the first user XR stream and the second user XR stream, as described in connection with at least the vehicle XR component 920, the first user XR stream 930, and the second user XR stream 950 of FIG. 9.

Figure 18:
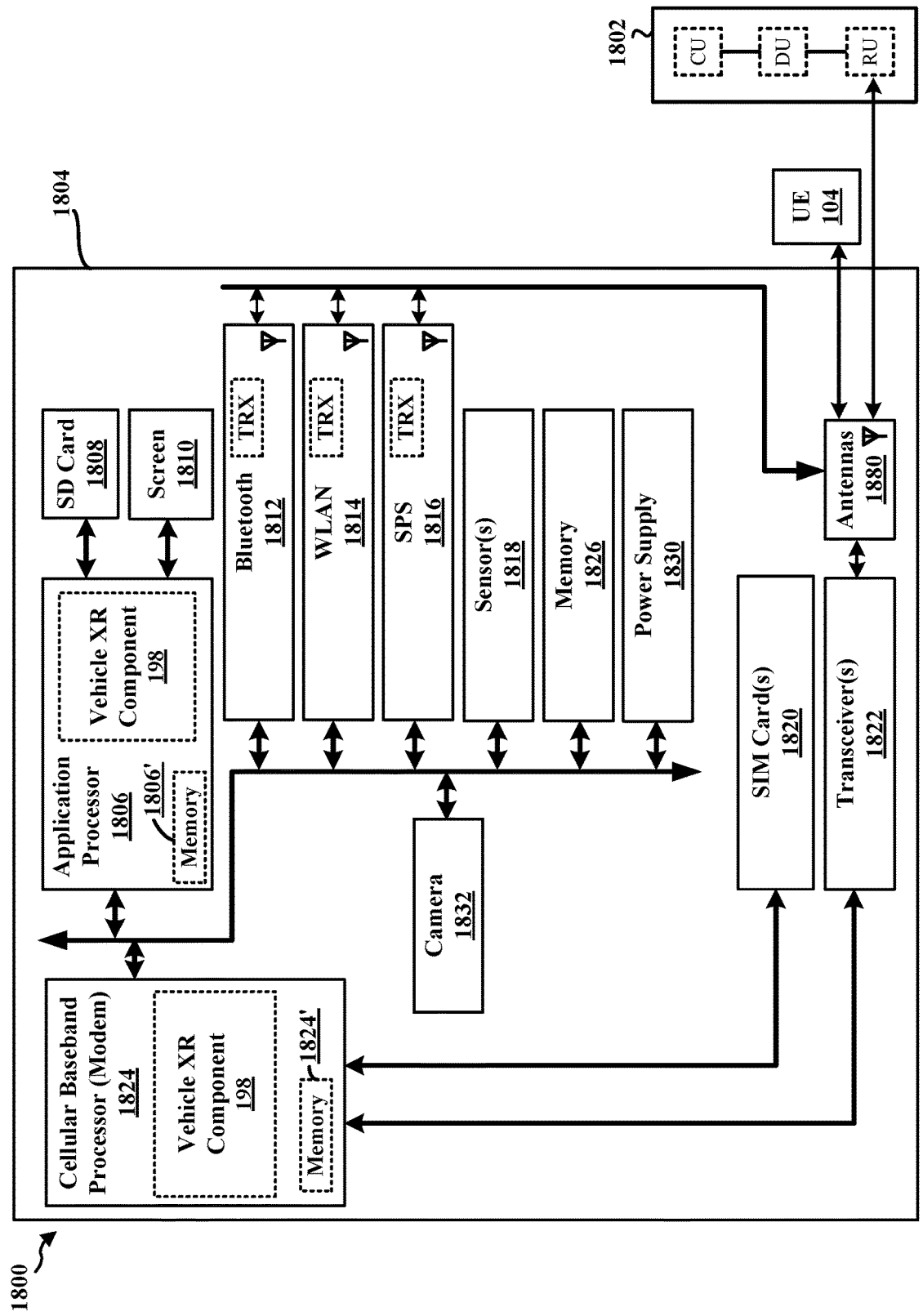
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include a cellular baseband processor 1824 (also referred to as a modem) coupled to one or more transceivers (e.g., a cellular RF transceiver 1822). The cellular baseband processor 1824 may include on-chip memory 1824'. In some aspects, the apparatus 1804 may further include one or more subscriber identity modules (SIM) cards 1820 and an application processor 1806 coupled to a secure digital (SD) card 1808 and a screen 1810. The application processor 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize one or more antennas 1880 for communication. The cellular baseband processor 1824 communicates through transceiver(s) (e.g., the cellular RF transceiver 1822) via one or more antennas 1880 with one or more of the UEs 104 and/or with an RU associated with a network entity 1802. The cellular baseband processor 1824 and the application processor 1806 may each include a computer-readable medium/memory, such as the on-chip memory 1824', and the on-chip memory 1806', respectively. The additional memory modules 1826 may also be considered a computer-readable medium/memory. Each computer-readable medium/memory (e.g., the on-chip memory 1824', the on-chip memory 1806', and/or the additional memory modules 1826) may be non-transitory. The cellular baseband processor 1824 and the application processor 1806 are each responsible for general processing, including the execution of software stored on the computer-readable medium/memory. The software, when executed by the cellular baseband processor 1824/application processor 1806, causes the cellular baseband processor 1824/application processor 1806 to perform the various functions described supra. The computer-readable medium/memory may also be used for storing data that is manipulated by the cellular baseband processor 1824/application processor 1806 when executing software. The cellular baseband processor 1824/application processor 1806 may be a component of the UE 350 and may include the memory 360 and/or at least one of the TX processor 368, the RX processor 356, and the controller/processor 359. In one configuration, the apparatus 1804 may be a processor chip (modem and/or application) and include just the cellular baseband processor 1824 and/or the application processor 1806, and in another configuration, the apparatus 1804 may be the entire UE (e.g., see the UE 350 of FIG. 3) and include the additional modules of the apparatus 1804.

As discussed supra, the vehicle XR component 198 is configured to transmit a request for a vehicle extended reality (XR) session, the vehicle XR session being based on a first user XR stream including a vehicle XR component associated with a vehicle and a first user XR component associated with a first user, the first user having an association with the vehicle. The vehicle XR component 198 is also configured to transmit uplink information associated with the first user XR stream. The vehicle XR component 198 is also configured to receive rendering information associated with the first user XR stream, the rendering information being based on the uplink information.

The vehicle XR component 198 may be within the cellular baseband processor 1824, the application processor 1806, or both the cellular baseband processor 1824 and the application processor 1806. The vehicle XR component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1804 may include a variety of components configured for various functions. For example, the vehicle XR component 198 may include one or more hardware components that perform each of the blocks of the algorithm in the flowcharts of FIGS. 16 and/or 17.

In one configuration, the apparatus 1804, and in particular the cellular baseband processor 1824 and/or the application processor 1806, includes means for transmitting a request for a vehicle extended reality (XR) session, the vehicle XR session being based on a first user XR stream including a vehicle XR component associated with a vehicle and a first user XR component associated with a first user, the first user having an association with the vehicle. The example apparatus 1804 also includes means for transmitting uplink information associated with the first user XR stream. The example apparatus 1804 also includes means for receiving rendering information associated with the first user XR stream, the rendering information being based on the uplink information.

In another configuration, the example apparatus 1804 also includes means for presenting the rendering information via one or more displays associated with the vehicle XR session.

In another configuration, the example apparatus 1804 also includes means for collecting the first user XR component associated with the first user XR stream via one or more of an advanced driver assistant system (ADAS) or an in-vehicular sensor, where the uplink information includes the first user XR component.

In another configuration, the example apparatus 1804 also includes means for detecting a user interaction with an interactive object associated with rendered information, and where the first user XR component includes user interaction information associated with the user interaction.

In another configuration, the example apparatus 1804 also includes means for receiving subsequent rendering information based on the user interaction information.

In another configuration, the example apparatus 1804 also includes means for receiving a message in response to the request, the message including a configuration associated with the vehicle XR session.

In another configuration, the example apparatus 1804 also includes means for collecting a second user XR component associated with the second user XR stream, where the uplink information includes the second user XR component.

In another configuration, the example apparatus 1804 also includes means for presenting the first rendering component via a first display of one or more displays associated with the vehicle XR session. The example apparatus 1804 also includes means for presenting the second rendering component via a second display of the one or more displays.

The means may be the vehicle XR component 198 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 19:
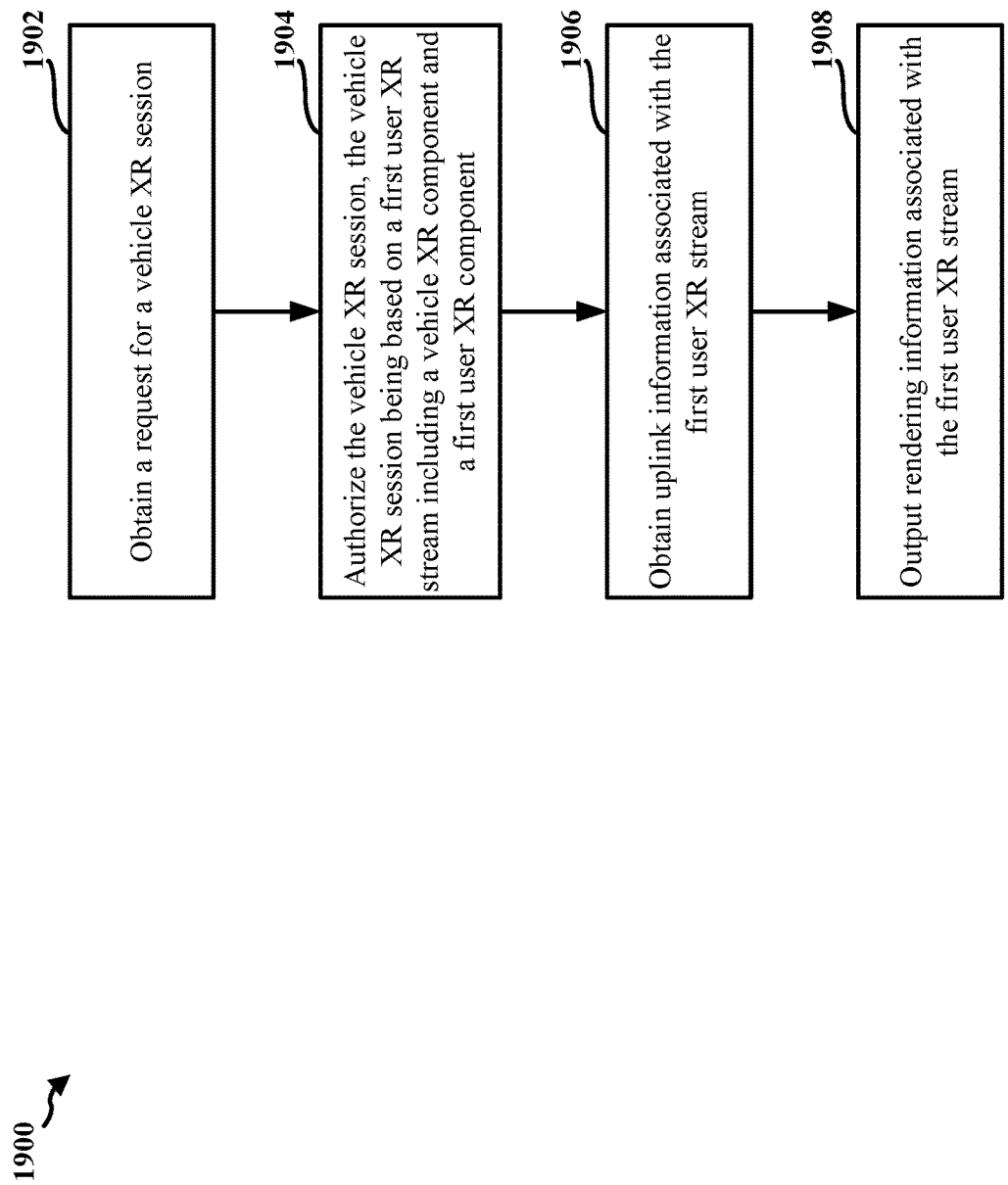
FIG. 19 is a flowchart of a method of wireless communication at a network entity, in accordance with the teachings disclosed herein.

FIG. 19 is a flowchart 1900 of a method of wireless communication. The method may be performed by a network entity (e.g., one of the base stations 102 or a component of a base station, the cloud XR entity 708, a network entity 2102 of FIG. 21, and/or a network entity 2260 of FIG. 22). The method may facilitate improving user experience associated with a vehicle XR session by using a cloud-based entity to reduce information transmitted OTA and/or to reduce computation load associated with the vehicle XR session at the UE.

At 1902, the network entity obtains a request for a vehicle XR session. Aspects of the request for the vehicle XR session may be described in connection with at least the session request 722 of FIG. 7. The obtaining of the request for the vehicle XR session, at 1902, may be performed by the vehicle-to-cloud XR network component 199 of the network entity 2102 of FIG. 21 and/or the vehicle-to-cloud XR component 191 of the network entity 2260 of FIG. 22.

At 1904, the network entity authorizes the vehicle XR session. Aspects of authorizing the vehicle XR session may be described in connection with at least the authorization procedures 724 of FIG. 7. The vehicle XR session may be based on a first user XR stream including a vehicle XR component associated with a vehicle and a first user XR component associated with a first user, the first user having an association with the vehicle, as described in connection with the vehicle XR component 736 and the user XR component 738 of FIG. 7. The authorizing of the vehicle XR session, at 1904, may be performed by the vehicle-to-cloud XR network component 199 of the network entity 2102 of FIG. 21 and/or the vehicle-to-cloud XR component 191 of the network entity 2260 of FIG. 22.

At 1906, the network entity obtains uplink information associated with the first user XR stream. Aspects of the uplink information are described in connection with at least the uplink information 734 of FIG. 7. The obtaining of the uplink information, at 1906, may be performed by the vehicle-to-cloud XR network component 199 of the network entity 2102 of FIG. 21 and/or the vehicle-to-cloud XR component 191 of the network entity 2260 of FIG. 22.

The uplink information may include the vehicle XR component and the first user XR component, as described in connection with the vehicle XR component 736 and the user XR component 738 of FIG. 7. In some examples, the vehicle XR component may include at least one of vehicle posture information, vehicle information, and vehicle-surrounding information, as described in connection with at least the vehicle XR component 920 of FIG. 9. In some examples, the first user XR component may include relative user posture information and user input with reference to the vehicle, as described in connection with at least the first user XR component 932 of FIG. 9.

At 1908, the network entity outputs rendering information associated with the first user XR stream, the rendering information being based on the uplink information. Aspects of the rendering information are described in connection with at least the rendering information 746 of FIG. 7. The outputting of the rendering information, at 1908, may be performed by the vehicle-to-cloud XR network component 199 of the network entity 2102 of FIG. 21 and/or the vehicle-to-cloud XR component 191 of the network entity 2260 of FIG. 22.

Figure 20:
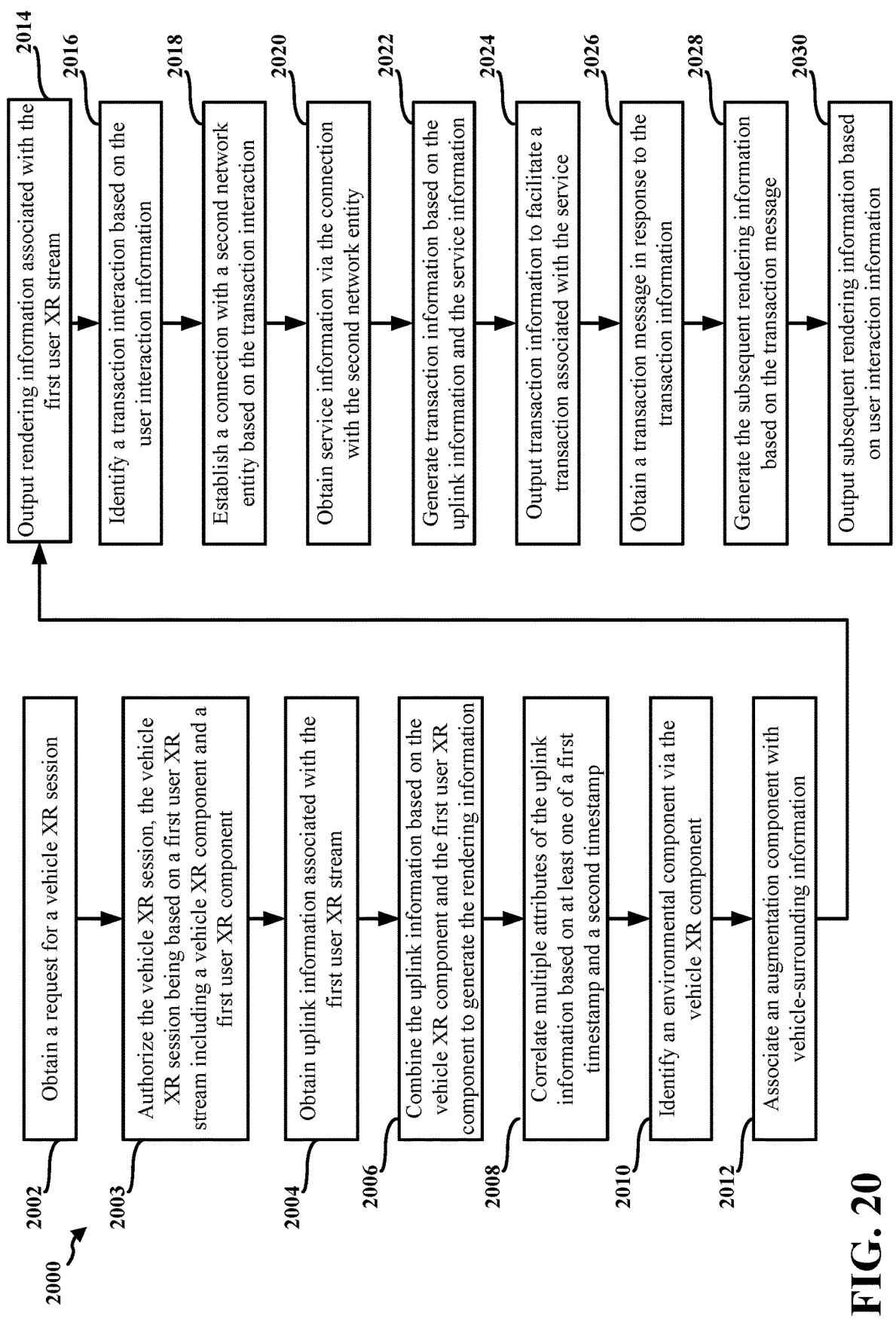
FIG. 20 is a flowchart of a method of wireless communication at a network entity, in accordance with the teachings disclosed herein.

FIG. 20 is a flowchart 2000 of a method of wireless communication. The method may be performed by a network entity (e.g., one of the base stations 102 or a component of a base station, the cloud XR entity 708, a network entity 2102 of FIG. 21, and/or a network entity 2260 of FIG. 22). The method may facilitate improving user experience associated with a vehicle XR session by using a cloud-based entity to reduce information transmitted OTA and/or to reduce computation load associated with the vehicle XR session at the UE.

At 2002, the network entity obtains a request for a vehicle XR session. Aspects of the request for the vehicle XR session may be described in connection with at least the session request 722 of FIG. 7. The obtaining of the request for the vehicle XR session, at 2002, may be performed by the vehicle-to-cloud XR network component 199 of the network entity 2102 of FIG. 21 and/or the vehicle-to-cloud XR component 191 of the network entity 2260 of FIG. 22.

At 2003, the network entity authorizes the vehicle XR session. Aspects of authorizing the vehicle XR session may be described in connection with at least the authorization procedures 724 of FIG. 7. The vehicle XR session may be based on a first user XR stream including a vehicle XR component associated with a vehicle and a first user XR component associated with a first user, the first user having an association with the vehicle, as described in connection with the vehicle XR component 736 and the user XR component 738 of FIG. 7. The authorizing of the vehicle XR session, at 2003, may be performed by the vehicle-to-cloud XR network component 199 of the network entity 2102 of FIG. 21 and/or the vehicle-to-cloud XR component 191 of the network entity 2260 of FIG. 22.

In some examples, the request for the vehicle XR session, at 2002, may include a subscription credential, as described in connection with the subscription credential information 816 of FIG. 8. In some examples, the subscription credential may be associated with a subscription level.

At 2004, the network entity obtains uplink information associated with the first user XR stream. Aspects of the uplink information are described in connection with at least the uplink information 734 of FIG. 7. The obtaining of the uplink information, at 2004, may be performed by the vehicle-to-cloud XR network component 199 of the network entity 2102 of FIG. 21 and/or the vehicle-to-cloud XR component 191 of the network entity 2260 of FIG. 22.

The uplink information may include the vehicle XR component and the first user XR component, as described in connection with the vehicle XR component 736 and the user XR component 738 of FIG. 7. In some examples, the vehicle XR component may include at least one of vehicle posture information, vehicle information, and vehicle-surrounding information, as described in connection with at least the vehicle XR component 920 of FIG. 9. In some examples, the first user XR component may include relative user posture information and user input with reference to the vehicle, as described in connection with at least the first user XR component 932 of FIG. 9.

At 2014, the network entity outputs rendering information associated with the first user XR stream, the rendering information being based on the uplink information. Aspects of the rendering information are described in connection with at least the rendering information 746 of FIG. 7. The outputting of the rendering information, at 2014, may be performed by the vehicle-to-cloud XR network component 199 of the network entity 2102 of FIG. 21 and/or the vehicle-to-cloud XR component 191 of the network entity 2260 of FIG. 22.

At 2006, the network entity may combine the uplink information based on the vehicle XR component and the first user XR component to generate the rendering information. Aspects of combining the uplink information are described in connection with at least the combination procedures 740 of FIG. 7. The combining of the uplink information, at 2006, may be performed by the vehicle-to-cloud XR network component 199 of the network entity 2102 of FIG. 21 and/or the vehicle-to-cloud XR component 191 of the network entity 2260 of FIG. 22.

In some examples, the uplink information (e.g., at 2004) may include at least a first timestamp associated with the vehicle XR component and at least a second timestamp associated with the first user XR component, as described in connection with at least the first timestamp 928 and the second timestamp 938 of FIG. 9. In some such examples, the network entity may, at 2008, correlate multiple attributes of the uplink information based on at least the first timestamp and the second timestamp, as described in connection with at least the combination procedures 740 of FIG. 7. The correlating of the multiple attributes of the uplink information, at 2008, may be performed by the vehicle-to-cloud XR network component 199 of the network entity 2102 of FIG. 21 and/or the vehicle-to-cloud XR component 191 of the network entity 2260 of FIG. 22.

In some examples, combining the uplink information to generate the rendering information (e.g., at 2006) may be based augmentation components. For example, at 2010, the network entity may identify an environment component via the vehicle XR component of the first user XR stream. Aspects of identifying the environment component are described in connection with at least the stadium 1232 of FIG. 12. The identifying of the environment component, at 2010, may be performed by the vehicle-to-cloud XR network component 199 of the network entity 2102 of FIG. 21 and/or the vehicle-to-cloud XR component 191 of the network entity 2260 of FIG. 22.

At 2012, the network entity may associate an augmentation component with vehicle-surrounding information based on the environment component to combine the uplink information. Aspects of associating the augmentation component are described in connection with at least the interactive object 1340 and the score information 1342 of FIG. 13. The associating of the augmentation component, at 2012, may be performed by the vehicle-to-cloud XR network component 199 of the network entity 2102 of FIG. 21 and/or the vehicle-to-cloud XR component 191 of the network entity 2260 of FIG. 22.

In some examples, the uplink information (e.g., at 2004) may include user interaction information associated with a user interaction. At 2030, the network entity may output subsequent rendering information based on the user interaction information. Aspects of outputting the subsequent rendering information are described in connection with at least the score information 1342 of FIG. 13. The outputting of the subsequent rendering information, at 2030, may be performed by the vehicle-to-cloud XR network component 199 of the network entity 2102 of FIG. 21 and/or the vehicle-to-cloud XR component 191 of the network entity 2260 of FIG. 22.

In some examples, the user interaction information may be associated with a transaction. For example, at 2016, the network entity may identify a transaction interaction based on the user interaction information. The transaction interaction may be associated with a service provided by a second network entity. Aspects of the transaction interaction are described in connection with at least the identification 1512 of FIG. 15. The identifying of the transaction interaction, at 2016, may be performed by the vehicle-to-cloud XR network component 199 of the network entity 2102 of FIG. 21 and/or the vehicle-to-cloud XR component 191 of the network entity 2260 of FIG. 22.

At 2024, the network entity may output transaction information to facilitate a transaction associated with the service. Aspects of the transaction information are described in connection with at least the transaction information 1522 of FIG. 15. The outputting of the transaction information, at 2024, may be performed by the vehicle-to-cloud XR network component 199 of the network entity 2102 of FIG. 21 and/or the vehicle-to-cloud XR component 191 of the network entity 2260 of FIG. 22.

In some examples, to facilitate the transaction associated with the service, the network entity may communicate with the second network entity. For example, at 2018, the network entity may establish a connection with the second network entity based on the transaction interaction. Aspects of establishing the connection with the second network entity are described in connection with at least the connection establishment procedure 1514 of FIG. 15. The establishing of the connection with the second network entity, at 2018, may be performed by the vehicle-to-cloud XR network component 199 of the network entity 2102 of FIG. 21 and/or the vehicle-to-cloud XR component 191 of the network entity 2260 of FIG. 22.

At 2020, the network entity may obtain service information via the connection with the second network entity. Aspects of obtaining the service information are described in connection with at least the service information 1518 of FIG. 15. The obtaining of the service information, at 2020, may be performed by the vehicle-to-cloud XR network component 199 of the network entity 2102 of FIG. 21 and/or the vehicle-to-cloud XR component 191 of the network entity 2260 of FIG. 22.

At 2022, the network entity may generate the transaction information based on the uplink information and the service information. Aspects of generating the transaction information are described in connection with at least the generating 1520 of FIG. 15. The generating of the transaction information, at 2022, may be performed by the vehicle-to-cloud XR network component 199 of the network entity 2102 of FIG. 21 and/or the vehicle-to-cloud XR component 191 of the network entity 2260 of FIG. 22.

The network entity may then output the transaction information to facilitate a transaction associated with the service (e.g., at 2024).

In some examples, the network entity may obtain a response based on the transaction information. For example, at 2026, the network entity may obtain a transaction message in response to the transaction information. Aspects of obtaining the transaction message are described in connection with at least the transaction message 1524 of FIG. 15. The obtaining of the transaction message, at 2026, may be performed by the vehicle-to-cloud XR network component 199 of the network entity 2102 of FIG. 21 and/or the vehicle-to-cloud XR component 191 of the network entity 2260 of FIG. 22.

At 2028, the network entity may generate the subsequent rendering information based on the transaction message. Aspects of the subsequent rendering information are described in connection with at least the subsequent rendering information 1530 of FIG. 15. The generating of the subsequent rendering information, at 2028, may be performed by the vehicle-to-cloud XR network component 199 of the network entity 2102 of FIG. 21 and/or the vehicle-to-cloud XR component 191 of the network entity 2260 of FIG. 22.

In some examples, the vehicle XR session may be further based on a second user XR stream including the vehicle XR component and a second user XR component associated with a second user. Aspects of the second user XR stream are described in connection with at least the second user XR stream 950 of FIG. 9.

In some examples in which the vehicle XR session is based on the first user XR stream and the second user XR stream, the rendering information, at 2014, may include a first rendering component associated with the first user XR stream and a second rendering component associated with the second user XR stream, as described in connection with at least the first user rendering information 940 and the second user rendering information 960 of FIG. 9.

In some examples in which the vehicle XR session is based on the first user XR stream and the second user XR stream, the uplink information (e.g., at 2004) may include the second user XR component associated with the second user, and the second rendering component may be based on the vehicle XR component and the second user XR component, as described in connection with at least the second user rendering information 960 of FIG. 9.

In some examples in which the vehicle XR session is based on the first user XR stream and the second user XR stream, the vehicle XR component may be shared between the first user XR stream and the second user XR stream, as described in connection with at least the vehicle XR component 920, the first user XR stream 930, and the second user XR stream 950 of FIG. 9.

Figure 21:
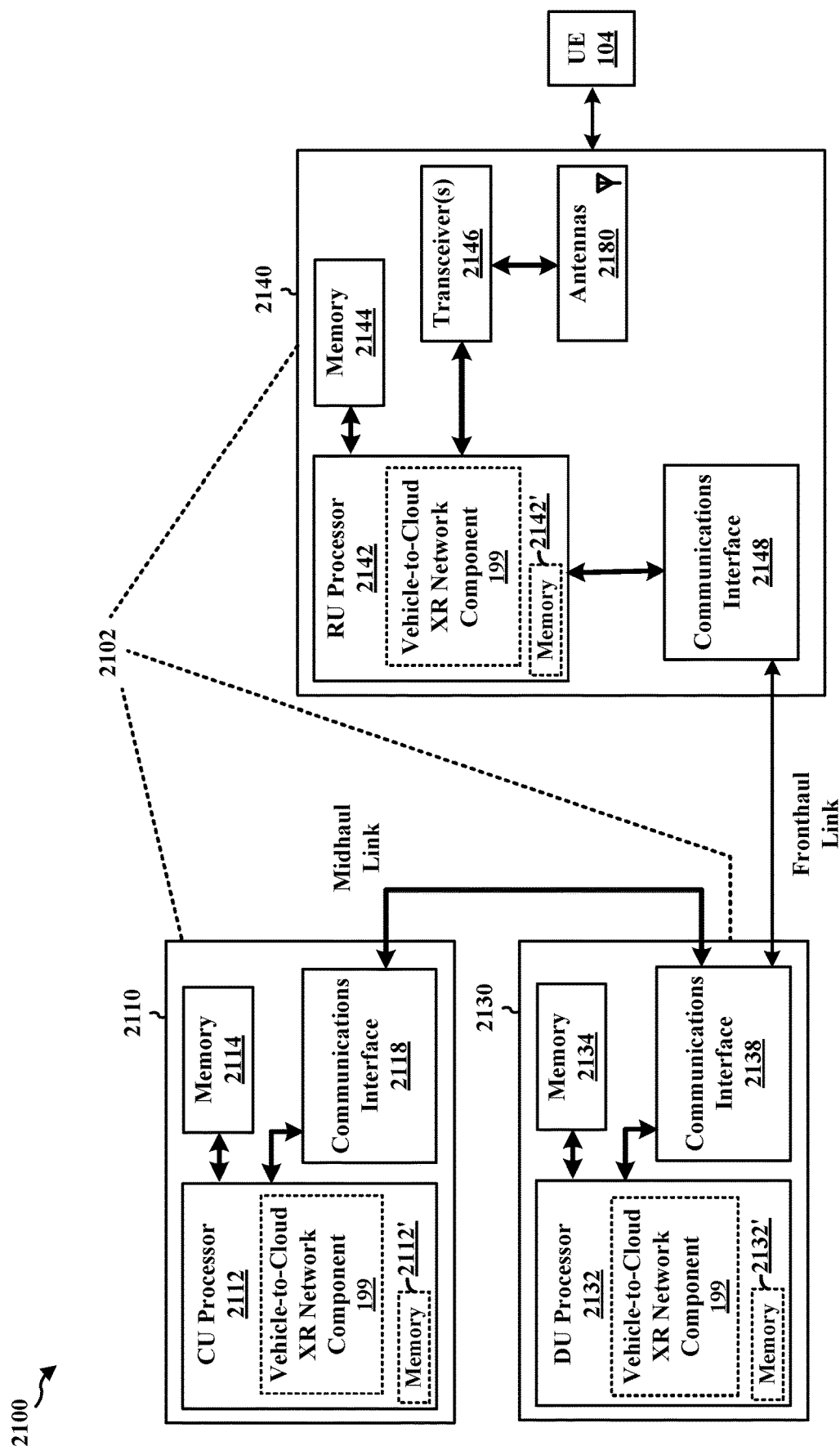
FIG. 21 is a diagram illustrating an example of a hardware implementation for an example network entity.

FIG. 21 is a diagram 2100 illustrating an example of a hardware implementation for a network entity 2102. The network entity 2102 may be a BS, a component of a BS, or may implement BS functionality. The network entity 2102 may include at least one of a CU 2110, a DU 2130, or an RU 2140. For example, depending on the layer functionality handled by the vehicle-to-cloud XR network component 199, the network entity 2102 may include the CU 2110; both the CU 2110 and the DU 2130; each of the CU 2110, the DU 2130, and the RU 2140; the DU 2130; both the DU 2130 and the RU 2140; or the RU 2140. The CU 2110 may include a CU processor 2112. The CU processor 2112 may include on-chip memory 2112'. In some aspects, may further include additional memory modules 2114 and a communications interface 2118. The CU 2110 communicates with the DU 2130 through a midhaul link, such as an F1 interface. The DU 2130 may include a DU processor 2132. The DU processor 2132 may include on-chip memory 2132'. In some aspects, the DU 2130 may further include additional memory modules 2134 and a communications interface 2138. The DU 2130 communicates with the RU 2140 through a fronthaul link. The RU 2140 may include an RU processor 2142. The RU processor 2142 may include on-chip memory 2142'. In some aspects, the RU 2140 may further include additional memory modules 2144, one or more transceivers 2146, antennas 2180, and a communications interface 2148. The RU 2140 communicates with one or more of the UEs 104. The on-chip memories (e.g., the on-chip memory 2112', the on-chip memory 2132', and/or the on-chip memory 2142') and/or the additional memory modules (e.g., the additional memory modules 2114, the additional memory modules 2134, and/or the additional memory modules 2144) may each be considered a computer-readable medium/memory. Each computer-readable medium/memory may be non-transitory. Each of the CU processor 2112, the DU processor 2132, the RU processor 2142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the vehicle-to-cloud XR network component 199 is configured to obtain a request for a vehicle XR session. The vehicle-to-cloud XR network component 199 is also configured to authorize the vehicle XR session, the vehicle XR session being based on a first user XR stream including a vehicle XR component associated with a vehicle and a first user XR component associated with a first user, the first user having an association with the vehicle. The vehicle-to-cloud XR network component 199 is also configured to obtain uplink information associated with the first user XR stream. The vehicle-to-cloud XR network component 199 is also configured to output rendering information associated with the first user XR stream, the rendering information being based on the uplink information.

The vehicle-to-cloud XR network component 199 may be within one or more processors of one or more of the CU 2110, DU 2130, and the RU 2140. The vehicle-to-cloud XR network component 199 may be one or more hardware components specifically configured to carry out the stated processes/algorithm, implemented by one or more processors configured to perform the stated processes/algorithm, stored within a computer-readable medium for implementation by one or more processors, or some combination thereof.

The network entity 2102 may include a variety of components configured for various functions. For example, the vehicle-to-cloud XR network component 199 may include one or more hardware components that perform each of the blocks of the algorithm in the flowcharts of FIGS. 19 and/or 20.

In one configuration, the network entity 2102 includes means for obtaining a request for a vehicle extended reality (XR) session. The example network entity 2102 also includes means for authorizing the vehicle XR session, the vehicle XR session being based on a first user XR stream including a vehicle XR component associated with a vehicle and a first user XR component associated with a first user, the first user having an association with the vehicle. The example network entity 2102 also includes means for obtaining uplink information associated with the first user XR stream. The example network entity 2102 also includes means for outputting rendering information associated with the first user XR stream, the rendering information being based on the uplink information.

In another configuration, the example network entity 2102 also includes means for combining the uplink information based on the vehicle XR component and the first user XR component to generate the rendering information.

In another configuration, the example network entity 2102 also includes means for identifying an environmental component via the vehicle XR component of the first user XR stream. The example network entity 2102 also includes means for associating an augmentation component with vehicle-surrounding information based on the environmental component.

In another configuration, the example network entity 2102 also includes means for outputting subsequent rendering information based on user interaction information.

In another configuration, the example network entity 2102 also includes means for identifying a transaction interaction based on the user interaction information, the transaction interaction associated with a service provided by a second network entity. The example network entity 2102 also includes means for outputting transaction information to facilitate a transaction associated with the service.

In another configuration, the example network entity 2102 also includes means for establishing a connection with the second network entity based on the transaction interaction. The example network entity 2102 also includes means for obtaining service information via the connection with the second network entity. The example network entity 2102 also includes means for generating the transaction information based on the uplink information and the service information.

In another configuration, the example network entity 2102 also includes means for obtaining a transaction message in response to the transaction information. The example network entity 2102 also includes means for generating the subsequent rendering information based on the transaction message.

In another configuration, the example network entity 2102 also includes means for correlating multiple attributes of the uplink information based on at least a first timestamp and a second timestamp.

In another configuration, the example network entity 2102 also includes means for outputting a message in response to the request, the message including a configuration associated with the vehicle XR session.

In another configuration, the example network entity 2102 also includes means for outputting a Quality of Experience (QoE) measurement configuration associated with the vehicle XR session. The example network entity 2102 also includes means for obtaining QoE metric information based on the QoE measurement configuration. The example network entity 2102 also includes means for adapting a rendering setting associated with the vehicle XR session based on the QoE metric information. The example network entity 2102 also includes means for outputting subsequent rendering information generated based on the rendering setting.

The means may be the vehicle-to-cloud XR network component 199 of the network entity 2102 configured to perform the functions recited by the means. As described supra, the network entity 2102 may include the TX processor 316, the RX processor 370, and the controller/processor 375. As such, in one configuration, the means may be the TX processor 316, the RX processor 370, and/or the controller/processor 375 configured to perform the functions recited by the means.

Figure 22:
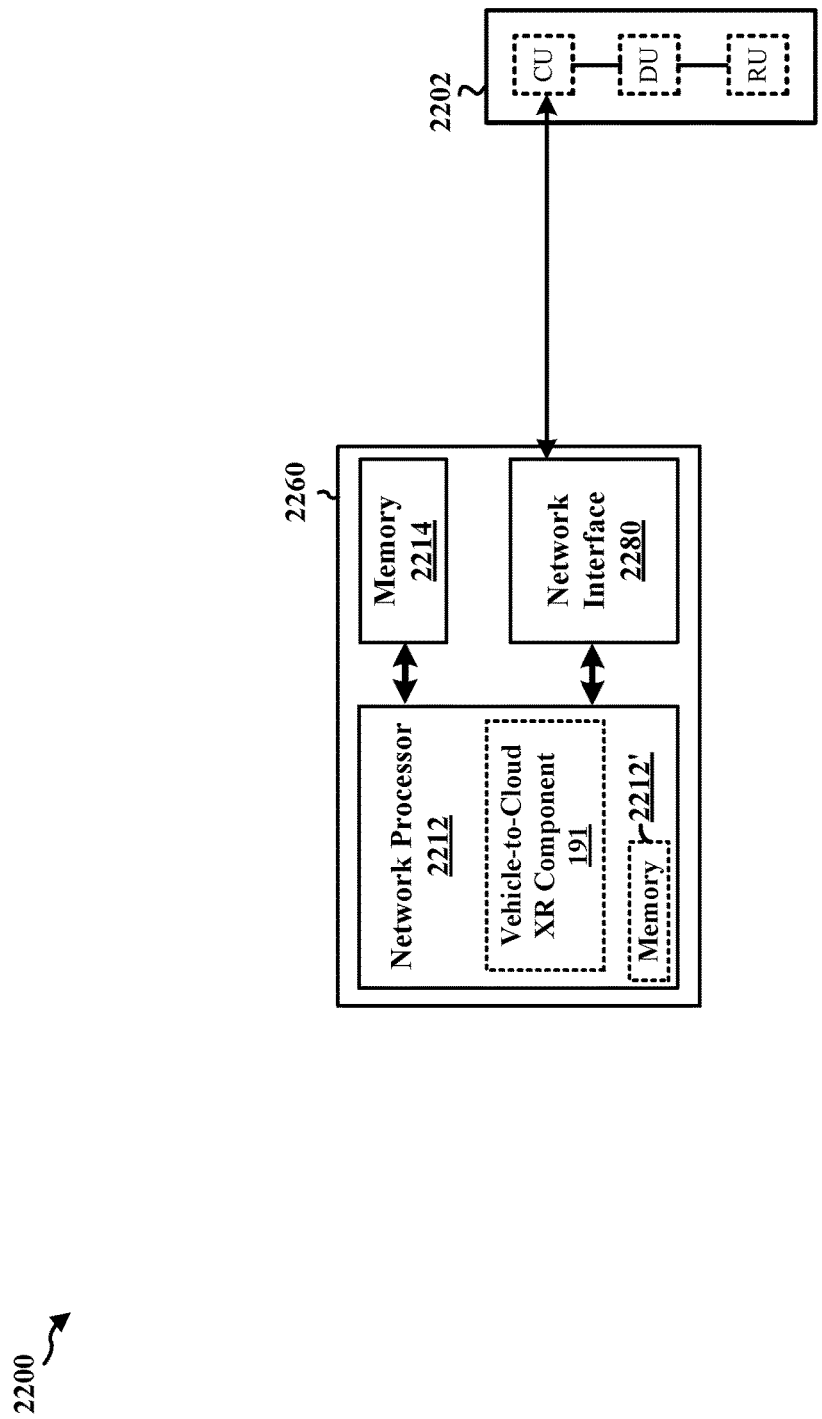
FIG. 22 is a diagram illustrating an example of a hardware implementation for an example network entity.

FIG. 22 is a diagram 2200 illustrating an example of a hardware implementation for a network entity 2260. In one example, the network entity 2260 may be within the core network 190. The network entity 2260 may include a network processor 2212. The network processor 2212 may include on-chip memory 2212'. In some aspects, the network entity 2260 may further include additional memory modules 2214. The network entity 2260 communicates via the network interface 2280 directly (e.g., backhaul link) or indirectly (e.g., through a RIC) with the CU 2202. The on-chip memory 2212' and the additional memory modules 2214 may each be considered a computer-readable medium/memory. Each computer-readable medium/memory may be non-transitory. The network processor 2212 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the vehicle-to-cloud XR component 191 is configured to obtain a request for a vehicle XR session. The vehicle-to-cloud XR component 191 is also configured to authorize the vehicle XR session, the vehicle XR session being based on a first user XR stream including a vehicle XR component associated with a vehicle and a first user XR component associated with a first user, the first user having an association with the vehicle. The vehicle-to-cloud XR component 191 is also configured to obtain uplink information associated with the first user XR stream. The vehicle-to-cloud XR component 191 is also configured to output rendering information associated with the first user XR stream, the rendering information being based on the uplink information.

The vehicle-to-cloud XR component 191 may be within the network processor 2212. The vehicle-to-cloud XR component 191 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2260 may include a variety of components configured for various functions.

In one configuration, the network entity 2260 includes means for obtaining a request for a vehicle extended reality (XR) session. The example network entity 2260 also includes means for authorizing the vehicle XR session, the vehicle XR session being based on a first user XR stream including a vehicle XR component associated with a vehicle and a first user XR component associated with a first user, the first user having an association with the vehicle. The example network entity 2260 also includes means for obtaining uplink information associated with the first user XR stream. The example network entity 2260 also includes means for outputting rendering information associated with the first user XR stream, the rendering information being based on the uplink information.

In another configuration, the example network entity 2260 also includes means for combining the uplink information based on the vehicle XR component and the first user XR component to generate the rendering information.

In another configuration, the example network entity 2260 also includes means for identifying an environmental component via the vehicle XR component of the first user XR stream. The example network entity 2260 also includes means for associating an augmentation component with vehicle-surrounding information based on the environmental component.

In another configuration, the example network entity 2260 also includes means for outputting subsequent rendering information based on user interaction information.

In another configuration, the example network entity 2260 also includes means for identifying a transaction interaction based on the user interaction information, the transaction interaction associated with a service provided by a second network entity. The example network entity 2260 also includes means for outputting transaction information to facilitate a transaction associated with the service.

In another configuration, the example network entity 2260 also includes means for establishing a connection with the second network entity based on the transaction interaction. The example network entity 2260 also includes means for obtaining service information via the connection with the second network entity. The example network entity 2260 also includes means for generating the transaction information based on the uplink information and the service information.

In another configuration, the example network entity 2260 also includes means for obtaining a transaction message in response to the transaction information. The example network entity 2260 also includes means for generating the subsequent rendering information based on the transaction message.

In another configuration, the example network entity 2260 also includes means for correlating multiple attributes of the uplink information based on at least a first timestamp and a second timestamp.

In another configuration, the example network entity 2260 also includes means for outputting a message in response to the request, the message including a configuration associated with the vehicle XR session.

In another configuration, the example network entity 2260 also includes means for outputting a Quality of Experience (QoE) measurement configuration associated with the vehicle XR session. The example network entity 2260 also includes means for obtaining QoE metric information based on the QoE measurement configuration. The example network entity 2260 also includes means for adapting a rendering setting associated with the vehicle XR session based on the QoE metric information. The example network entity 2260 also includes means for outputting subsequent rendering information generated based on the rendering setting.

The means may be the vehicle-to-cloud XR component 191 of the network entity 2260 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: transmitting a request for a vehicle extended reality (XR) session, the vehicle XR session being based on a first user XR stream including a vehicle XR component associated with a vehicle and a first user XR component associated with a first user, the first user having an association with the vehicle; transmitting uplink information associated with the first user XR stream; and receiving rendering information associated with the first user XR stream, the rendering information being based on the uplink information.

Aspect 2 is the method of aspect 1, further including: presenting the rendering information via one or more displays associated with the vehicle XR session.

Aspect 3 is the method of any of aspects 1 and 2, further including that the vehicle XR component includes at least one of vehicle posture information, vehicle information, and vehicle-surrounding information.

Aspect 4 is the method of any of aspects 1 to 3, further including that the first user XR component includes relative user posture information and user input with reference to the vehicle.

Aspect 5 is the method of any of aspects 1 to 4, further including that the request for the vehicle XR session includes a subscription credential, where the subscription credential is associated with a subscription level.

Aspect 6 is the method of any of aspects 1 to 5, further including: collecting the first user XR component associated with the first user XR stream via one or more of an advanced driver assistant system (ADAS) or an in-vehicular sensor, where the uplink information includes the first user XR component.

Aspect 7 is the method of any of aspects 1 to 6, further including: detecting a user interaction with an interactive object associated with rendered information, and where the first user XR component includes user interaction information associated with the user interaction.

Aspect 8 is the method of any of aspects 1 to 7, further including that the interactive object is associated with the vehicle XR component of the vehicle XR session.

Aspect 9 is the method of any of aspects 1 to 8, further including that the uplink information includes at least a first timestamp associated with the vehicle XR component and at least a second timestamp associated with the first user XR component.

Aspect 10 is the method of any of aspects 1 to 9, further including that the rendering information includes an augmentation component associated with vehicle-surrounding information.

Aspect 11 is the method of any of aspects 1 to 10, further including that the vehicle XR session is further based on a second user XR stream including the vehicle XR component and a second user XR component associated with a second user.

Aspect 12 is the method of any of aspects 1 to 11, further including that the rendering information includes a first rendering component associated with the first user XR stream and a second rendering component associated with the second user XR stream.

Aspect 13 is the method of any of aspects 1 to 12, further including that the vehicle XR component is shared between the first user XR stream and the second user XR stream.

Aspect 14 is an apparatus for wireless communication at a UE including at least one processor coupled to a memory and configured to implement any of aspects 1 to 13.

In aspect 15, the apparatus of aspect 14 further includes at least one antenna coupled to the at least one processor.

In aspect 16, the apparatus of aspect 14 or 15 further includes a transceiver coupled to the at least one processor.

Aspect 17 is an apparatus for wireless communication including means for implementing any of aspects 1 to 13.

In aspect 18, the apparatus of aspect 17 further includes at least one antenna coupled to the means to perform the method of any of aspects 1 to 13.

In aspect 19, the apparatus of aspect 17 or 18 further includes a transceiver coupled to the means to perform the method of any of aspects 1 to 13.

Aspect 20 is a non-transitory computer-readable storage medium storing computer executable code, where the code, when executed, causes a processor to implement any of aspects 1 to 13.

Aspect 21 is a method of wireless communication at a network entity, including: obtaining a request for a vehicle extended reality (XR) session; authorizing the vehicle XR session, the vehicle XR session being based on a first user XR stream including a vehicle XR component associated with a vehicle and a first user XR component associated with a first user, the first user having an association with the vehicle; obtaining uplink information associated with the first user XR stream; and outputting rendering information associated with the first user XR stream, the rendering information being based on the uplink information.

Aspect 22 is the method of aspect 21, further including that the vehicle XR component includes at least one of vehicle posture information, vehicle information, and vehicle-surrounding information.

Aspect 23 is the method of any of aspects 21 and 22, further including that the first user XR component includes relative user posture information and user input with reference to the vehicle.

Aspect 24 is the method of any of aspects 21 to 23, further including that the request for the vehicle XR session includes a subscription credential, and where the subscription credential is associated with a subscription level.

Aspect 25 is the method of any of aspects 21 to 24, further including: combining the uplink information based on the vehicle XR component and the first user XR component to generate the rendering information.

Aspect 26 is the method of any of aspects 21 to 25, further including: identifying an environmental component via the vehicle XR component of the first user XR stream; and associating an augmentation component with vehicle-surrounding information based on the environmental component to combine the uplink information.

Aspect 27 is the method of any of aspects 21 to 26, further including that the uplink information includes user interaction information associated with a user interaction, and further including: outputting subsequent rendering information based on the user interaction information.

Aspect 28 is the method of any of aspects 21 to 27, further including that the network entity is a first network entity, and further including: identifying a transaction interaction based on the user interaction information, the transaction interaction associated with a service provided by a second network entity; and outputting transaction information to facilitate a transaction associated with the service.

Aspect 29 is the method of any of aspects 21 to 28, further including: establishing a connection with the second network entity based on the transaction interaction; obtaining service information via the connection with the second network entity; and generating the transaction information based on the uplink information and the service information.

Aspect 30 is the method of any of aspects 21 to 29, further including: obtaining a transaction message in response to the transaction information; and generating the subsequent rendering information based on the transaction message.

Aspect 31 is the method of any of aspects 21 to 30, further including that the uplink information includes at least a first timestamp associated with the vehicle XR component and at least a second timestamp associated with the first user XR component, and further including: correlating multiple attributes of the uplink information based on at least the first timestamp and the second timestamp.

Aspect 32 is the method of any of aspects 21 to 31, further including that the vehicle XR session is further based on a second user XR stream including the vehicle XR component and a second user XR component associated with a second user.

Aspect 33 is the method of any of aspects 21 to 32, further including that the rendering information includes a first rendering component associated with the first user XR stream and a second rendering component associated with the second user XR stream.

Aspect 34 is the method of any of aspects 21 to 33, further including that the uplink information includes the second user XR component associated with the second user, and the second rendering component is based on the vehicle XR component and the second user XR component.

Aspect 35 is the method of any of aspects 21 to 34, further including that the vehicle XR component is shared between the first user XR stream and the second user XR stream.

Aspect 36 is an apparatus for wireless communication at a network entity including at least one processor coupled to a memory and configured to implement any of aspects 21 to 35.

In aspect 37, the apparatus of aspect 36 further includes at least one antenna coupled to the at least one processor.

In aspect 38, the apparatus of aspect 36 or 37 further includes a transceiver coupled to the at least one processor.

Aspect 39 is an apparatus for wireless communication including means for implementing any of aspects 21 to 35.

In aspect 40, the apparatus of aspect 39 further includes at least one antenna coupled to the means to perform the method of any of aspects 21 to 35.

In aspect 41, the apparatus of aspect 39 or 40 further includes a transceiver coupled to the means to perform the method of any of aspects 21 to 35.

Aspect 42 is a non-transitory computer-readable storage medium storing computer executable code, where the code, when executed, causes a processor to implement any of aspects 21 to 35.

Aspect 43 is a method of wireless communication at a UE, including: transmitting a request for a vehicle XR session associated with a vehicle, the vehicle XR session being based on a first user XR stream including a vehicle XR component associated with the vehicle and a first user XR component associated with a first user; transmitting uplink information associated with the first user XR stream; and receiving rendering information associated with the first user XR stream, the rendering information being based on the uplink information.

Aspect 44 is the method of aspect 43, further including: presenting the rendering information via one or more displays associated with the vehicle XR session.

Aspect 45 is the method of any of aspects 43 and 44, further including that the one or more displays includes at least one of a glasses-based display or a glasses-less display.

Aspect 46 is the method of any of aspects 43 to 45, further including that the vehicle XR component includes at least one of vehicle posture information, vehicle information, and vehicle-surrounding information.

Aspect 47 is the method of any of aspects 43 to 46, further including that the first user XR component includes relative user posture information and user input with reference to the vehicle.

Aspect 48 is the method of any of aspects 43 to 47, further including that the request for the vehicle XR session includes a subscription credential, where the subscription credential is associated with a subscription level.

Aspect 49 is the method of any of aspects 43 to 48, further including that the rendering information is based on the subscription level associated with the subscription credential.

Aspect 50 is the method of any of aspects 43 to 49, further including that the request for the vehicle XR session includes a subscription request to create a subscription credential associated with a subscription level.

Aspect 51 is the method of any of aspects 43 to 50, further including that the request for the vehicle XR session includes QoS support information for communication associated with the vehicle XR session.

Aspect 52 is the method of any of aspects 43 to 51, further including that the rendering information is based on the QoS support information.

Aspect 53 is the method of any of aspects 43 to 52, further including: collecting the first user XR component associated with the first user XR stream via one or more of an advanced driver assistant system (ADAS) or an in-vehicular sensor, where the uplink information includes the first user XR component.

Aspect 54 is the method of any of aspects 43 to 53, further including that the first user XR component is collected via one or more of an advanced driver assistant system (ADAS) or an in-vehicular sensor.

Aspect 55 is the method of any of aspects 43 to 54, further including: detecting a user interaction with an interactive object associated with rendered information, and where the first user XR component includes user interaction information associated with the user interaction.

Aspect 56 is the method of any of aspects 43 to 55, further including: receiving subsequent rendering information based on the user interaction information.

Aspect 57 is the method of any of aspects 43 to 56, further including that the interactive object is associated with the vehicle XR component of the vehicle XR session.

Aspect 58 is the method of any of aspects 43 to 47, further including that the uplink information includes at least a first timestamp associated with the vehicle XR component and at least a second timestamp associated with the first user XR component.

Aspect 59 is the method of any of aspects 43 to 58, further including that the uplink information is transmitted to a network entity based on a periodicity associated with the first user XR stream.

Aspect 60 is the method of any of aspects 43 to 59, further including: receiving a message in response to the request, the message including a configuration associated with the vehicle XR session.

Aspect 61 is the method of any of aspects 43 to 60, further including that the configuration includes one or more of: a network connection type, an update frequency associated with the first user XR stream, an XR session level, and a QoE measurement configuration.

Aspect 62 is the method of any of aspects 43 to 61, further including that the rendering information is based on one or more of: a subscription level, a QoS profile, a user identifier, and privacy controls.

Aspect 63 is the method of any of aspects 43 to 62, further including that the rendering information includes an augmentation component associated with vehicle-surrounding information.

Aspect 64 is the method of any of aspects 43 to 63, further including that the augmentation component includes one or more of: a landmark identifier along a path plan of the vehicle, and an interactive object.

Aspect 65 is the method of any of aspects 43 to 64, further including that the vehicle XR session is further based on a second user XR stream including the vehicle XR component and a second user XR component associated with a second user.

Aspect 66 is the method of any of aspects 43 to 65, further including: collecting the second user XR component associated with the second user, where the uplink information includes the second user XR component.

Aspect 67 is the method of any of aspects 43 to 66, further including that the rendering information includes a first rendering component associated with the first user XR stream and a second rendering component associated with the second user XR stream.

Aspect 68 is the method of any of aspects 43 to 67, further including: presenting the first rendering component via a first display of one or more displays associated with the vehicle XR session; and presenting the second rendering component via a second display of the one or more displays.

Aspect 69 is the method of any of aspects 43 to 68, further including that the vehicle XR component is shared between the first user XR stream and the second user XR stream.

Aspect 70 is an apparatus for wireless communication at a UE including at least one processor coupled to a memory and configured to implement any of aspects 43 to 69.

In aspect 71, the apparatus of aspect 70 further includes at least one antenna coupled to the at least one processor.

In aspect 72, the apparatus of aspect 70 or 71 further includes a transceiver coupled to the at least one processor.

Aspect 73 is an apparatus for wireless communication including means for implementing any of aspects 43 to 69.

In aspect 74, the apparatus of aspect 73 further includes at least one antenna coupled to the means to perform the method of any of aspects 43 to 69.

In aspect 75, the apparatus of aspect 73 or 74 further includes a transceiver coupled to the means to perform the method of any of aspects 43 to 69.

Aspect 76 is a non-transitory computer-readable storage medium storing computer executable code, where the code, when executed, causes a processor to implement any of aspects 43 to 69.

Aspect 77 is a method of wireless communication at a network entity, including: obtaining a request for a vehicle XR session associated with a vehicle, the vehicle XR session being based on a first user XR stream including a vehicle XR component associated with the vehicle and a first user XR component associated with a first user; obtaining uplink information associated with the first user XR stream; and outputting rendering information associated with the first user XR stream, the rendering information being based on the uplink information.

Aspect 78 is the method of aspect 77, further including that the vehicle XR component includes at least one of vehicle posture information, vehicle information, and vehicle-surrounding information.

Aspect 79 is the method of any of aspects 77 and 78, further including that the first user XR component includes relative user posture information and user input with reference to the vehicle.

Aspect 80 is the method of any of aspects 77 to 79, further including that the request for the vehicle XR session includes a subscription credential, and where the subscription credential is associated with a subscription level.

Aspect 81 is the method of any of aspects 77 to 80, further including that the rendering information is based on the subscription level associated with the subscription credential.

Aspect 82 is the method of any of aspects 77 to 81, further including that the request for the vehicle XR session includes a subscription request to create a subscription credential associated with a subscription level.

Aspect 83 is the method of any of aspects 77 to 82, further including that the request for the vehicle XR session includes QoS support information for communications associated with the vehicle XR session.

Aspect 84 is the method of any of aspects 77 to 83, further including that the rendering information is based on the QoS support information.

Aspect 85 is the method of any of aspects 77 to 84, further including: combining the uplink information based on the vehicle XR component and the first user XR component to generate the rendering information.

Aspect 86 is the method of any of aspects 77 to 85, further including combining the uplink information includes: identifying an environmental component via the vehicle XR component of the first user XR stream; and associating an augmentation component with vehicle-surrounding information based on the environmental component.

Aspect 87 is the method of any of aspects 77 to 86, further including that the augmentation component includes one or more of: a landmark identifier along a path plan of the vehicle, and an interactive object.

Aspect 88 is the method of any of aspects 77 to 87, further including that the uplink information includes user interaction information associated with a user interaction, and further including: outputting subsequent rendering information based on the user interaction information.

Aspect 89 is the method of any of aspects 77 to 88, further including that the network entity is a first network entity, and further including: identifying a transaction interaction based on the user interaction information, the transaction interaction associated with a service provided by a second network entity; and outputting transaction information to facilitate a transaction associated with the service.

Aspect 90 is the method of any of aspects 77 to 89, further including: establishing a connection with the second network entity based on the transaction interaction; obtaining service information via the connection with the second network entity; and generating the transaction information based on the uplink information and the service information.

Aspect 91 is the method of any of aspects 77 to 90, further including: obtaining a transaction message in response to the transaction information; and generating the subsequent rendering information based on the transaction message.

Aspect 92 is the method of any of aspects 77 to 91, further including that the uplink information includes at least a first timestamp associated with the vehicle XR component and at least a second timestamp associated with the first user XR component, and further including: correlating multiple attributes of the uplink information based on at least the first timestamp and the second timestamp.

Aspect 93 is the method of any of aspects 77 to 92, further including that the uplink information is obtained based on a periodicity associated with the first user XR stream.

Aspect 94 is the method of any of aspects 77 to 93, further including: outputting a message in response to the request, the message including a configuration associated with the vehicle XR session.

Aspect 95 is the method of any of aspects 77 to 94, further including that the configuration includes one or more of: a network connection type, an update frequency associated with the first user XR stream, an XR session level, and a QoE measurement configuration.

Aspect 96 is the method of any of aspects 77 to 95, further including that the rendering information is based on one or more of: a subscription level, a QoS profile, a user identifier, and privacy controls.

Aspect 97 is the method of any of aspects 77 to 96, further including: outputting a QoE measurement configuration associated with the vehicle XR session; obtaining QoE metric information based on the QoE measurement configuration; adapting a rendering setting associated with the vehicle XR session based on the QoE metric information; and outputting subsequent rendering information generated based on the rendering setting.

Aspect 98 is the method of any of aspects 77 to 97, further including that the vehicle XR session is further based on a second user XR stream including the vehicle XR component and a second user XR component associated with a second user.

Aspect 99 is the method of any of aspects 77 to 98, further including that the rendering information includes a first rendering component associated with the first user XR stream and a second rendering component associated with the second user XR stream.

Aspect 100 is the method of any of aspects 77 to 99, further including that the uplink information includes the second user XR component associated with the second user, and the second rendering component is based on the vehicle XR component and the second user XR component.

Aspect 101 is the method of any of aspects 77 to 100, further including: presenting the first rendering component via a first display of one or more displays associated with the vehicle XR session; and presenting the second rendering component via a second display of the one or more displays.

Aspect 102 is the method of any of aspects 77 to 101, further including that the vehicle XR component is shared between the first user XR stream and the second user XR stream.

Aspect 103 is the method of any of aspects 77 to 102, further including that the first rendering component includes a first augmentation component associated with the first user XR stream, and the second rendering component includes a second augmentation component associated with the second user XR stream.

Aspect 104 is an apparatus for wireless communication at a network entity including at least one processor coupled to a memory and configured to implement any of aspects 77 to 103.

In aspect 105, the apparatus of aspect 104 further includes at least one antenna coupled to the at least one processor.

In aspect 106, the apparatus of aspect 104 or 105 further includes a transceiver coupled to the at least one processor.

Aspect 107 is an apparatus for wireless communication including means for implementing any of aspects 77 to 103.

In aspect 108, the apparatus of aspect 107 further includes at least one antenna coupled to the means to perform the method of any of aspects 77 to 103.

In aspect 109, the apparatus of aspect 107 or 108 further includes a transceiver coupled to the means to perform the method of any of aspects 77 to 103.

Aspect 110 is a non-transitory computer-readable storage medium storing computer executable code, where the code, when executed, causes a processor to implement any of aspects 77 to 103.

What is claimed is:

1. An apparatus for wireless communication at a user equipment (UE), comprising:
    memory; and
    one or more processors coupled to the memory and configured to cause the UE to:
        transmit a request for a vehicle extended reality (XR) session, wherein the vehicle XR session is based on a first user XR stream that includes a vehicle XR component associated with a vehicle and a first user XR component associated with a first user, wherein the first user has an association with the vehicle and the first user XR component includes relative user pose information with reference to the vehicle;
        transmit, via wireless communication, information associated with the first user XR stream, wherein the information associated with the first user XR stream includes vehicle position information and first user XR information, and wherein the first user XR information comprises the relative user pose information that indicates an orientation of the first user relative to an XR space; and
        receive, via a wireless connection, rendering information associated with the first user XR stream, wherein the rendering information is based at least in part on the information associated with the first user XR stream, which includes the relative user pose information.

2. The apparatus of claim 1, further comprising:
    at least one antenna coupled to the one or more processors, wherein the one or more processors are further configured to cause the UE to:
        present the rendering information via one or more displays associated with the vehicle XR session.

3. The apparatus of claim 1, wherein the vehicle XR component includes at least one of vehicle posture information, vehicle information, and vehicle-surrounding information, and wherein the relative user pose information is based on the orientation of the first user as an absolute orientation separate from a vehicle coordinate system or as a relative orientation with respect to the vehicle coordinate system.

4. The apparatus of claim 1, wherein the first user XR component further includes user input with reference to the vehicle.

5. The apparatus of claim 1, wherein the request for the vehicle XR session includes a subscription credential, wherein the subscription credential is associated with a subscription level.

6. The apparatus of claim 1, wherein the one or more processors are further configured to cause the UE to:
    collect the first user XR component associated with the first user XR stream via one or more of an advanced driver assistant system (ADAS) or an in-vehicular sensor, wherein the information associated with the first user XR stream comprises the first user XR component.

7. The apparatus of claim 1, wherein the one or more processors are further configured to cause the UE to:
    detect a user interaction with an interactive object associated with rendered information, and wherein the first user XR component includes user interaction information associated with the user interaction.

8. The apparatus of claim 7, wherein the interactive object is associated with the vehicle XR component of the vehicle XR session.

9. The apparatus of claim 1, wherein the information associated with the first user XR stream includes at least a first timestamp associated with the vehicle XR component and at least a second timestamp associated with the first user XR component.

10. The apparatus of claim 1, wherein the rendering information includes an augmentation component associated with vehicle-surrounding information.

11. The apparatus of claim 1, wherein the vehicle XR session is further based on a second user XR stream that includes the vehicle XR component and a second user XR component associated with a second user.

12. The apparatus of claim 11, wherein the rendering information includes a first rendering component associated with the first user XR stream and a second rendering component associated with the second user XR stream.

13. The apparatus of claim 11, wherein the vehicle XR component is shared between the first user XR stream and the second user XR stream.

14. The apparatus of claim 1, wherein the vehicle position information is in a first transmission, and the relative user pose information is in a second transmission.

15. The apparatus of claim 1, wherein the vehicle position information and the relative user pose information are transmitted together.

16. A method of wireless communication at a user equipment (UE), comprising:
    transmitting a request for a vehicle extended reality (XR) session, wherein the vehicle XR session is based on a first user XR stream including a vehicle XR component associated with a vehicle and a first user XR component associated with a first user, wherein the first user has an association with the vehicle and the first user XR component includes relative user pose information with reference to the vehicle;
    transmitting, via wireless communication, information associated with the first user XR stream, wherein the information associated with the first user XR stream includes vehicle position information and first user XR information, and wherein the first user XR information comprises the relative user pose information that indicates an orientation of the first user relative to an XR space; and
    receiving, via a wireless connection, rendering information associated with the first user XR stream, wherein the rendering information is based on the information associated with the first user XR stream, which includes the relative user pose information.

17. The method of claim 16, wherein the vehicle XR component includes at least one of vehicle posture information, vehicle information, and vehicle-surrounding information, wherein the relative user pose information is based on the orientation of the first user as an absolute orientation separate from a vehicle coordinate system or as a relative orientation with respect to the vehicle coordinate system, and wherein the first user XR component further includes user input with reference to the vehicle.

18. The method of claim 16, wherein the request for the vehicle XR session includes a subscription credential, wherein the subscription credential is associated with a subscription level.

19. The method of claim 16, further comprising:
detecting a user interaction with an interactive object associated with rendered information, and wherein the first user XR component includes user interaction information associated with the user interaction.

20. The method of claim 16, wherein the vehicle XR session is further based on a second user XR stream including the vehicle XR component and a second user XR component associated with a second user, wherein the rendering information includes a first rendering component associated with the first user XR stream and a second rendering component associated with the second user XR stream.

21. The method of claim 16, wherein the vehicle position information is in a first transmission, and the relative user pose information is in a second transmission.

22. The method of claim 16, wherein the vehicle position information and the relative user pose information are transmitted together.

23. An apparatus for wireless communication at a network entity, comprising:
memory; and
one or more processors coupled to the memory and configured to cause the network entity to:
obtain a request for a vehicle extended reality (XR) session;
authorize the vehicle XR session, wherein the vehicle XR session is based on a first user XR stream that includes a vehicle XR component associated with a vehicle and a first user XR component associated with a first user, wherein the first user has an association with the vehicle and the first user XR component includes relative user pose information with reference to the vehicle;
obtain information associated with the first user XR stream, wherein the information associated with the first user XR stream includes vehicle position information and first user XR information, and wherein the first user XR information comprises the relative user pose information that indicates an orientation of the first user relative to an XR space; and
output rendering information associated with the first user XR stream, wherein the rendering information is based on the information associated with the first user XR stream, which includes the relative user pose information.

24. The apparatus of claim 23, wherein the vehicle XR component includes at least one of vehicle posture information, vehicle information, and vehicle-surrounding information, and wherein the relative user pose information is based on the orientation of the first user as an absolute orientation separate from a vehicle coordinate system or as a relative orientation with respect to the vehicle coordinate system.

25. The apparatus of claim 23, wherein the first user XR component further includes user input with reference to the vehicle.

26. The apparatus of claim 23, wherein the request for the vehicle XR session includes a subscription credential, and wherein the subscription credential is associated with a subscription level.

27. The apparatus of claim 23, further comprising:
at least one antenna coupled to the one or more processors, wherein the one or more processors are further configured to cause the network entity to:
combine the information associated with the first user XR stream based on the vehicle XR component and the first user XR component to generate the rendering information.

28. The apparatus of claim 27, wherein to combine the information associated with the first user XR stream, the one or more processors are further configured to cause the network entity to:
identify an environmental component via the vehicle XR component of the first user XR stream; and
associate an augmentation component with vehicle-surrounding information based on the environmental component.

29. The apparatus of claim 27, wherein the information associated with the first user XR stream includes user interaction information associated with a user interaction, and the one or more processors are further configured to cause the network entity to:
output subsequent rendering information based on the user interaction information.

30. The apparatus of claim 29, wherein the network entity is a first network entity, and the one or more processors are further configured to cause the network entity to:
identify a transaction interaction based on the user interaction information, the transaction interaction associated with a service provided by a second network entity; and
output transaction information to facilitate a transaction associated with the service.

31. The apparatus of claim 30, wherein the one or more processors are further configured to cause the network entity to:
establish a connection with the second network entity based on the transaction interaction;
obtain service information via the connection with the second network entity; and
generate the transaction information based on the information associated with the first user XR stream and the service information.

32. The apparatus of claim 30, wherein the one or more processors are further configured to cause the network entity to:
obtain a transaction message in response to the transaction information; and
generate the subsequent rendering information based on the transaction message.

33. The apparatus of claim 23, wherein the information associated with the first user XR stream includes at least a first timestamp associated with the vehicle XR component and at least a second timestamp associated with the first user XR component, and the one or more processors are further configured to cause the network entity to:
correlate multiple attributes of the information based on at least the first timestamp and the second timestamp.

34. The apparatus of claim 23, wherein the vehicle XR session is further based on a second user XR stream that includes the vehicle XR component and a second user XR component associated with a second user.

35. The apparatus of claim 34, wherein the rendering information includes a first rendering component associated with the first user XR stream and a second rendering component associated with the second user XR stream.

36. The apparatus of claim 35, wherein the one or more processors are further configured to cause the network entity to obtain second user XR information that includes the second user XR component associated with the second user, and the second rendering component is based on the vehicle XR component and the second user XR component.

37. The apparatus of claim 34, wherein the vehicle XR component is shared between the first user XR stream and the second user XR stream.

38. The apparatus of claim 23, wherein the vehicle position information is in a first transmission, and the relative user pose information is in a second transmission.

39. The apparatus of claim 23, wherein the vehicle position information and the relative user pose information are transmitted together.

40. A method of wireless communication at a network entity, comprising:
  obtaining a request for a vehicle extended reality (XR) session;
  authorizing the vehicle XR session, wherein the vehicle XR session is based on a first user XR stream including a vehicle XR component associated with a vehicle and a first user XR component associated with a first user, wherein the first user has an association with the vehicle and the first user XR component includes relative user pose information with reference to the vehicle;
  obtaining information associated with the first user XR stream, wherein the information associated with the first user XR stream includes vehicle position information and first user XR information, and wherein the first user XR information comprises the relative user pose information that indicates an orientation of the first user relative to an XR space; and
  outputting rendering information associated with the first user XR stream, wherein the rendering information is based on the information associated with the first user XR stream, which includes the relative user pose information.

41. The method of claim 40, further comprising:
  combining the information associated with the first user XR stream based on the vehicle XR component and the first user XR component to generate the rendering information, wherein the information associated with the first user XR stream includes user interaction information associated with a user interaction; and
  outputting subsequent rendering information based on the user interaction information.

42. The method of claim 41, wherein the network entity is a first network entity, and the method further comprises:
  identifying a transaction interaction based on the user interaction information, the transaction interaction associated with a service provided by a second network entity; and
  outputting transaction information to facilitate a transaction associated with the service.

43. The method of claim 42, further comprising:
  establishing a connection with the second network entity based on the transaction interaction;
  obtaining service information via the connection with the second network entity; and
  generating the transaction information based on the information associated with the first user XR stream and the service information.

44. The method of claim 42, further comprising:
  obtaining a transaction message in response to the transaction information; and
  generating the subsequent rendering information based on the transaction message.

45. The method of claim 40, wherein the vehicle XR session is further based on a second user XR stream including the vehicle XR component and a second user XR component associated with a second user, wherein the rendering information includes a first rendering component associated with the first user XR stream and a second rendering component associated with the second user XR stream.

46. The method of claim 40, wherein the vehicle position information is in a first transmission, and the relative user pose information is in a second transmission.

47. The method of claim 40, wherein the vehicle position information and the relative user pose information are transmitted together.

48. A non-transitory computer-readable storage medium, comprising code for a network entity, wherein the code when executed by one or more processors causes the network entity to:
  obtain a request for a vehicle extended reality (XR) session;
  authorize the vehicle XR session, wherein the vehicle XR session is based on a first user XR stream that includes a vehicle XR component associated with a vehicle and a first user XR component associated with a first user, wherein the first user has an association with the vehicle and the first user XR component includes relative user pose information with reference to the vehicle;
  obtain information associated with the first user XR stream, wherein the information associated with the first user XR stream includes vehicle position information and first user XR information, and wherein the first user XR information comprises the relative user pose information that indicates an orientation of the first user relative to an XR space; and
  output rendering information associated with the first user XR stream, wherein the rendering information is based on the information associated with the first user XR stream, which includes the relative user pose information.

49. A non-transitory computer-readable storage medium, comprising code for a user equipment (UE), wherein the code when executed by one or more processors causes the UE to:
  transmit a request for a vehicle extended reality (XR) session, wherein the vehicle XR session is based on a first user XR stream that includes a vehicle XR component associated with a vehicle and a first user XR component associated with a first user, wherein the first user has an association with the vehicle and the first user XR component includes relative user pose information with reference to the vehicle;
  transmit, via wireless communication, information associated with the first user XR stream, wherein the information associated with the first user XR stream includes vehicle position information and first user XR information, and wherein the first user XR information comprises the relative user pose information that indicates an orientation of the first user relative to an XR space; and receive, via a wireless connection, rendering information associated with the first user XR stream, wherein the rendering information is based on the information associated with the first user XR stream, which includes the relative user pose information.

\* \* \* \* \*